(12) United States Patent
Taguchi et al.

(10) Patent No.: US 8,143,835 B2
(45) Date of Patent: Mar. 27, 2012

(54) METHOD OF DRIVING DC/DC CONVERTER, METHOD OF CONTROLLING DC/DC CONVERTER APPARATUS, METHOD OF CONTROLLING DRIVING OPERATION OF VEHICLE, AND METHOD OF DRIVING FUEL CELL SYSTEM

(75) Inventors: Satoshi Taguchi, Shioya-gun (JP);
Hibiki Saeki, Utsunomiya (JP); Yasushi Kojima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 634 days.

(21) Appl. No.: 12/343,357

(22) Filed: Dec. 23, 2008

(65) Prior Publication Data

US 2009/0166114 A1 Jul. 2, 2009

(30) Foreign Application Priority Data

Dec. 28, 2007 (JP) ................. 2007-338544
Dec. 28, 2007 (JP) ................. 2007-338739

(51) Int. Cl.
*G05B 11/28* (2006.01)
(52) U.S. Cl. ............. 318/599; 318/400.26; 318/400.27; 318/254.1; 318/254.2
(58) Field of Classification Search ............ 318/599, 318/139, 400.26, 400.27, 400.28, 400.29, 318/719, 254.1, 254.2, 440, 442, 722; 180/117, 180/65.1, 65.265, 65.31, 65.8; 363/95, 98, 363/123, 124; 323/207, 265, 271
See application file for complete search history.

(56) References Cited

U.S. PATENT DOCUMENTS

| 4,578,630 | A | 3/1986 | Grosch |
| 4,941,076 | A | 7/1990 | Diaz |
| 5,406,468 | A | 4/1995 | Booth |
| 6,043,634 | A | 3/2000 | Nguyen et al. |
| 7,088,595 | B2 * | 8/2006 | Nino .................. 363/17 |
| 7,116,085 | B2 * | 10/2006 | Ikezawa ............. 323/225 |
| 7,379,313 | B2 * | 5/2008 | Yaguchi ............... 363/98 |
| 7,486,034 | B2 * | 2/2009 | Nakamura et al. ....... 318/139 |

(Continued)

FOREIGN PATENT DOCUMENTS

EP 0883230 A2 12/1998

(Continued)

OTHER PUBLICATIONS

Partial European Search Report for Application No. 08022414.0, dated Apr. 9, 2009.

(Continued)

*Primary Examiner* — Bentsu Ro
*Assistant Examiner* — Thai Dinh
(74) *Attorney, Agent, or Firm* — Nelson Mullins Riley & Scarborough LLP; Anthony A. Laurentano

(57) ABSTRACT

Under the same target voltage, a basic duty ratio depending on a target ON time is set, and prior and subsequent duty ratios before and after upper arm switching devices or lower arm switching devices are driven with the basic duty ratio are set as a basic duty ratio+α and a basic duty ratio−α, respectively. Gate drive signals, having the basic duty ratio and the prior and subsequent duty ratios, are supplied to the upper arm switching devices or to the lower arm switching devices, in order to turn on the upper arm switching devices or the lower arm switching devices.

16 Claims, 32 Drawing Sheets

U.S. PATENT DOCUMENTS

| | | | |
|---|---|---|---|
| 7,715,217 B2* | 5/2010 | Manabe et al. | 363/95 |
| 7,946,365 B2* | 5/2011 | Aoyagi et al. | 180/65.1 |
| 2007/0165432 A1 | 7/2007 | Okamura et al. | |
| 2007/0233920 A1 | 10/2007 | Misawa et al. | |

FOREIGN PATENT DOCUMENTS

| | | |
|---|---|---|
| EP | 0883230 A3 | 12/1998 |
| JP | 6-311736 | 11/1994 |
| JP | 2005-51895 | 2/2005 |
| JP | 2007-159315 | 6/2007 |
| JP | 2007-300599 | 11/2007 |
| WO | WO-98/44622 A2 | 10/1998 |
| WO | WO-98/44622 A3 | 10/1998 |
| WO | WO-02/093730 A1 | 11/2002 |

OTHER PUBLICATIONS

Japanese Office Action for Application No. 2007-338739, dated Nov. 17, 2009.

Japanese Office Action for Application No. 2007-338544, dated Nov. 17, 2009.

* cited by examiner

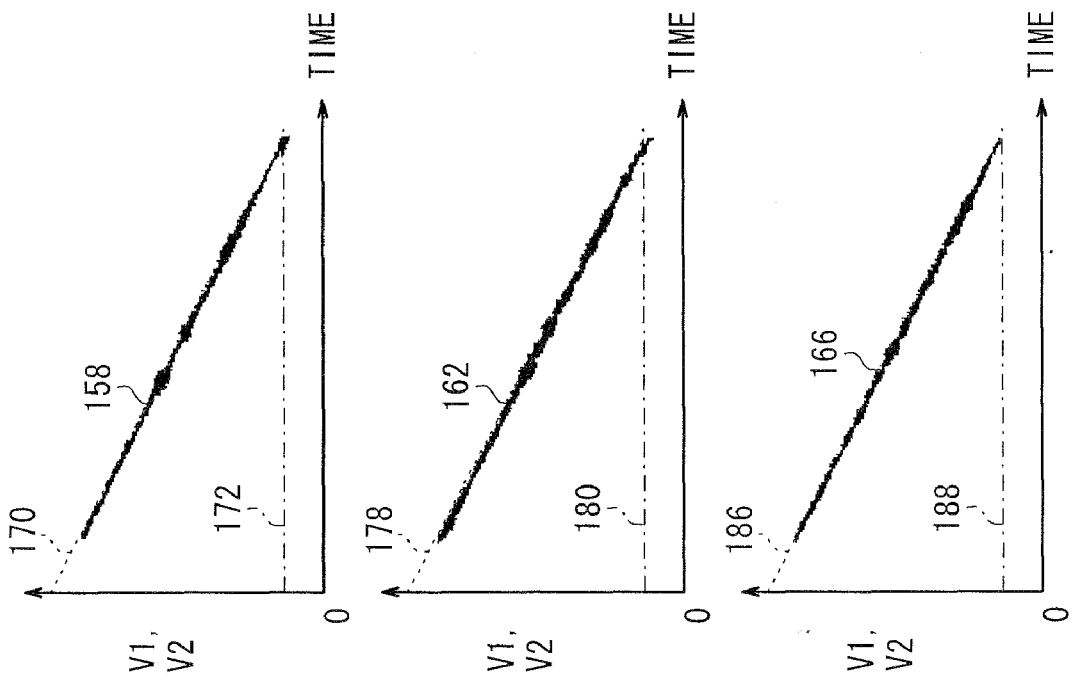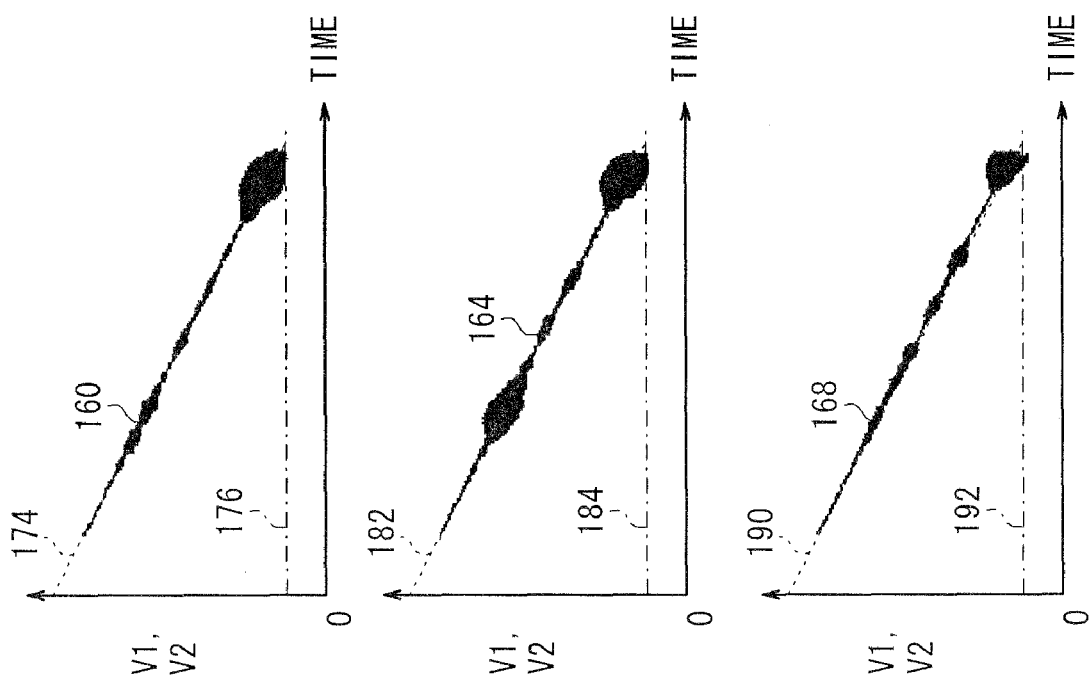

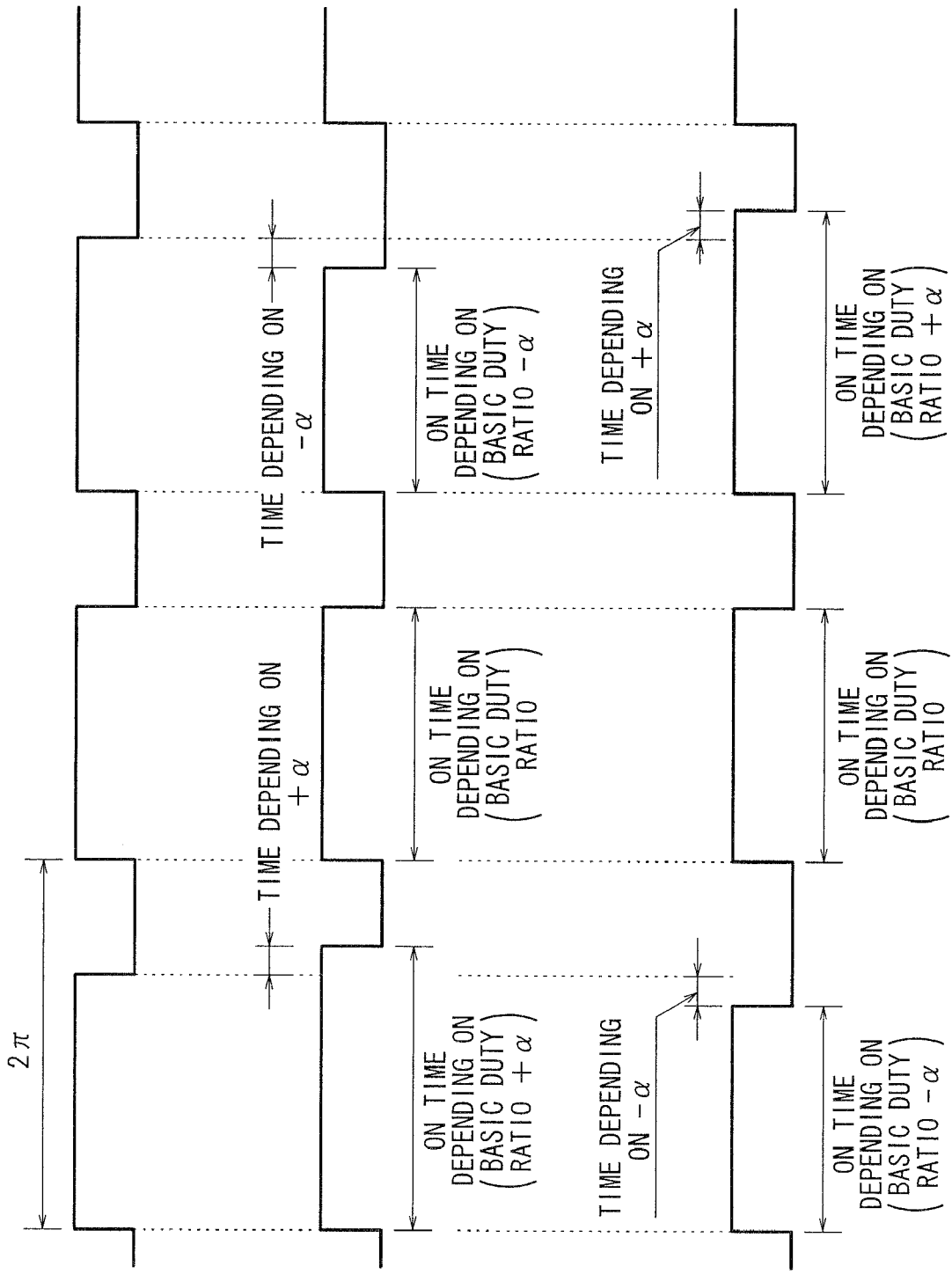

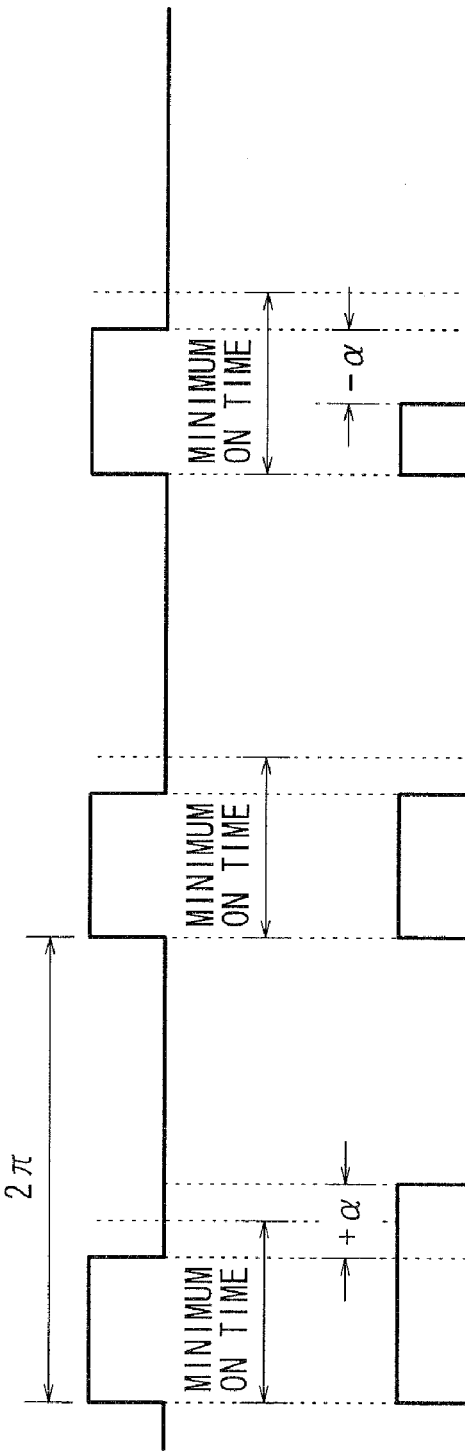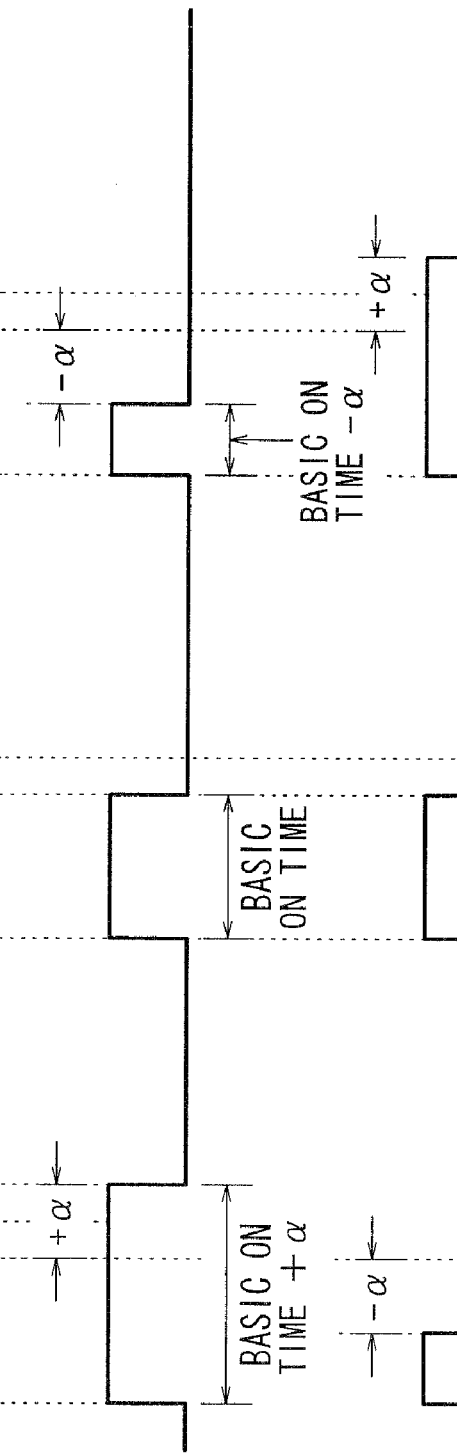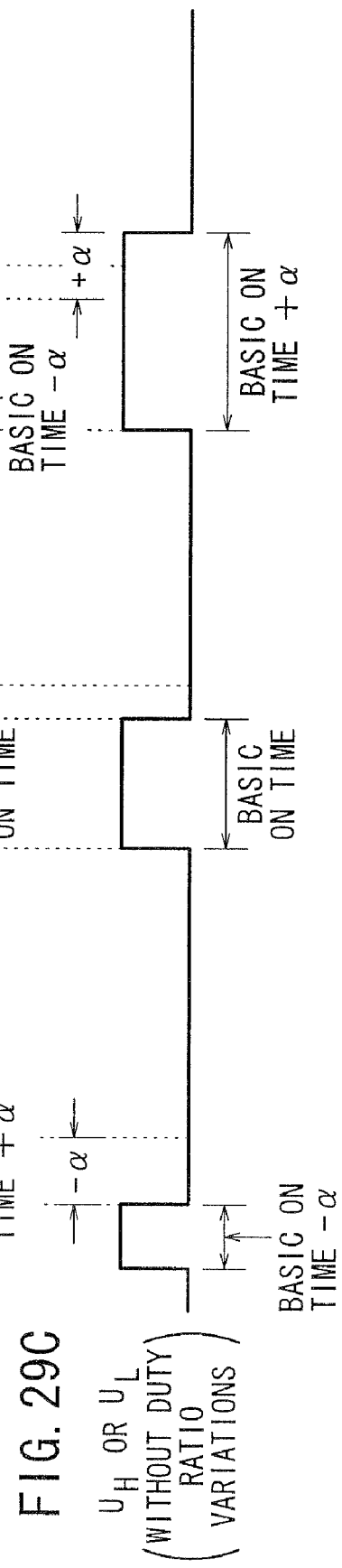
FIG. 29A $U_H$ OR $U_L$ (WITHOUT DUTY RATIO VARIATIONS)
FIG. 29B $U_H$ OR $U_L$ (WITH DUTY RATIO VARIATIONS)
FIG. 29C $U_H$ OR $U_L$ (WITHOUT DUTY RATIO VARIATIONS)

METHOD OF DRIVING DC/DC CONVERTER, METHOD OF CONTROLLING DC/DC CONVERTER APPARATUS, METHOD OF CONTROLLING DRIVING OPERATION OF VEHICLE, AND METHOD OF DRIVING FUEL CELL SYSTEM

BACKGROUND OF THE INVENTION

1. Field of the Invention

The present invention relates to a method of driving a DC/DC converter for increasing and/or reducing a DC voltage, a method of controlling a DC/DC converter apparatus including a DC/DC converter, a method of controlling a driving operation of a vehicle incorporating a DC/DC converter apparatus therein, and a method of controlling a fuel cell system incorporating a DC/DC converter apparatus.

2. Description of the Related Art

There have heretofore been widely used DC/DC converter devices having switching devices therein such as MOSFETs, IGBTs, or the like.

For example, there has been proposed a vehicle (hereinafter referred to as an "electric vehicle") incorporating a DC/DC converter apparatus for increasing and reducing a DC voltage, which is connected between an electricity storage device and a motor that is energized by an inverter. On the electric vehicle, when the motor is energized, the voltage across the electricity storage device is increased by the DC/DC converter apparatus and applied to the inverter. When the motor regenerates electric power, the regenerated voltage from the inverter is lowered by the DC/DC converter apparatus and applied to charge the electricity storage device.

There has also been proposed a vehicle (hereinafter referred to as a "fuel cell vehicle"), which also uses a motor as a propulsive source. The fuel cell vehicle includes a fuel cell directly connected to the motor, which is energized by an inverter. A DC/DC converter apparatus for increasing and reducing a DC voltage is connected between an electricity storage device and the junction between the fuel cell and the motor. The fuel cell is used as a main power supply, while the electricity storage device is used as an auxiliary power supply for assisting the main power supply.

On the fuel cell vehicle, when the motor is energized, the voltage across the fuel cell and the voltage across the electricity storage device, which has been increased by the DC/DC converter apparatus, are added together, and the summed voltage is applied to the inverter. When the motor regenerates electric power, the regenerated voltage from the inverter is lowered by the DC/DC converter apparatus and applied to charge the electricity storage device. If the electric power generated by the fuel cell contains an excessive amount of electric power, then the electric power is lowered in voltage and is applied to charge the electricity storage device.

WO 02/093730 discloses a charging and discharging control apparatus having an AC power supply, a diode bridge connected to the AC power supply, an inverter connected to the diode bridge, an electric motor energizable by the inverter, a voltage increasing and reducing circuit connected to the inverter, and a secondary battery connected to the voltage increasing and reducing circuit. The disclosed charging and discharging control apparatus operates such that, when a current flowing from the AC power supply through the diode bridge into the inverter is cut off, the secondary battery supplies the electric motor with all the electric power required to energize the electric motor through the voltage increasing and reducing circuit and the inverter, while the electric motor is in a propulsive power mode. Further, the secondary battery is charged with all the regenerated electric power while the electric motor is in a regenerative mode. In the voltage increasing and reducing circuit, voltage increasing switching devices and voltage reducing switching devices are alternately turned on and off, with dead times being interposed therebetween, regardless of the propulsive power mode and the regenerative mode of the electric motor. In this manner, the current flowing through the reactor is made continuously active, making it unnecessary to detect interruptions of the current or to determine the propulsive power mode and the regenerative mode.

In the DC/DC converter including the voltage increasing and reducing circuit, a drive signal having a predetermined duty ratio is supplied to the switching devices in order to energize the switching devices for increasing and/or reducing the voltage. The duty ratio is PWM-controlled so that the output voltage of the DC/DC converter will become a target voltage, i.e., a target value for the output voltage.

However, when a duty ratio depending on the target voltage (hereinafter referred to as a "target duty ratio") is changed to adjust the output voltage, the output voltage may change non-linearly depending on the change in the duty ratio, and the DC/DC converter may produce an output voltage which deviates from the voltage corresponding to the duty ratio. WO 02/093730 indicates nothing concerning prevention of variations in the output voltage.

Japanese Laid-Open Patent Publication No. 06-311736 discloses a DC/DC converter, wherein when the DC/DC converter produces a low output voltage at the time the voltage is to be reduced, if the pulse duration of output pulses of a pulsed drive signal output from a control means for energizing switching devices is shorter than an ON duration, which has been set by a minimum ON duration setting means, then the switching devices are energized by a pulsed drive signal having the preset ON duration.

According to Japanese Laid-Open Patent Publication No. 06-311736, the pulsed drive signal for energizing the switching devices is controlled such that the ON time of the pulsed drive signal will not be shorter than the minimum ON time of the switching devices, i.e., an ON time threshold value for reliably turning on the switching devices (changing the switching devices from a turned-off state to a turned-on state). However, there is nothing proposed in Japanese Laid-Open Patent Publication No. 06-311736 that deals with energizing the switching devices within a time that is shorter than the minimum ON time.

When the DC/DC converter is connected between the electricity storage device and the fuel cell, the duty ratio of the drive signal in a nearly directly coupled state, in which the voltage of the DC/DC converter across its terminals connected to the electricity storage device and the voltage of the DC/DC converter across its terminals connected to the fuel cell are substantially equal to each other, comprises a duty ratio that depends on an ON time shorter than the minimum ON time. When the target duty ratio is changed to adjust the output voltage, the duty ratio depending on the ON time, which is shorter than the minimum ON time, is unable to reliably turn on the switching devices. As a result, the output voltage does not change continuously (linearly) when the duty ratio changes, and the DC/DC converter produces an output voltage that deviates from the voltage corresponding to the duty ratio.

For reliably turning on the switching devices in an ON time that is shorter than the minimum ON time, to thereby prevent the DC/DC converter from producing an output voltage that deviates from the voltage corresponding to the duty ratio, it may be proposed (1) to lower the switching frequency (to increase the switching period) of the switching devices so as to reduce the proportion of the ON time and the duty ratio, or (2) to secure the ON time and reduce the duty ratio under a PFM control.

According to proposal (1), however, when the switching frequency is lowered to within an audible frequency range, sounds produced by the switching operations of the switching devices are heard as offensive noises by occupants of the electric vehicle or fuel cell vehicle, which incorporates the DC/DC converter therein. Therefore, the commercial value of the DC/DC converter, the DC/DC converter apparatus, the electric vehicle, and the fuel cell vehicle tends to be lowered. Furthermore, since the switching frequency is lowered, the current flowing through the reactor tends to contain larger ripples. If the reactor is increased in size to minimize ripples, then the DC/DC converter including the reactor is liable to become larger in size and weight, as well as cost.

According to proposal (2), if the frequency of the drive signal is increased under a PFM control, then the switching devices suffer from an increased switching loss. Also, if the frequency of the drive signal is reduced under the PFM control, then the same problems that occur with proposal (1) tend to arise.

Consequently, proposals (1) and (2) are unable to reliably turn on the switching devices in an ON time that is shorter than the minimum ON time.

SUMMARY OF THE INVENTION

It is a first object of the present invention to prevent an output voltage from being produced, which deviates from a voltage corresponding to a duty ratio.

A second object of the present invention is to prevent an output voltage from changing discontinuously as a duty ratio changes, and also to prevent an output voltage from being produced, which deviates from a voltage corresponding to a duty ratio.

To achieve the first object, a method of driving a DC/DC converter according to the present invention which is a chopper-type DC/DC converter including at least one reactor and at least one switching device comprises the steps of: setting a target duty ratio; setting a first duty ratio and a second duty ratio based on the target duty ratio; and driving the switching device for ON times corresponding respectively to the target duty ratio, the first duty ratio and the second duty ratio, wherein one of the duty ratios is the maximum duty ratio and another one of the duty ratios is the minimum duty ratio, and the remaining one of the duty ratios is a ratio between the maximum duty ratio and the minimum duty ratio.

Heretofore, since a switching device is turned on exactly for a target ON time (an ON time of the switching device depending on a target voltage) by a drive signal having a target duty ratio depending on the target ON time, it is not possible to prevent voltage fluctuations from being produced by a DC/DC converter, as an output voltage that deviates from the voltage corresponding to the duty ratio.

According to the present invention, in order to achieve the first object, the customary practice of driving the switching device only with the target duty ratio depending on the target ON time is not employed. Rather, even under the same target voltage, two of the target duty ratio, the first duty ratio and the second duty ratio are the maximum duty ratio and the minimum duty ratio, respectively, and the remaining one duty ratio is a ratio between the maximum and minimum duty ratios, for driving the switching device.

For example, the target duty ratio is set depending on the target ON time, and prior and subsequent duty ratios before and after the switching device is driven with the target duty ratio are set intentionally to the first and second duty ratios which are different from the target duty ratio (i.e., depending on intentionally different ON times), and the switching device is driven with the first and second duty ratios as well as with the target duty ratio.

The DC/DC converter thus arranged is prevented from producing an output voltage that suffers from voltage fluctuations, and hence from producing an output voltage that deviates from the voltage corresponding to the duty ratio.

To achieve the second object, there also is provided in accordance with the present invention a method of driving a DC/DC converter for use between an electricity storage device and a fuel cell, the DC/DC converter including at least one switching device, the method comprising the steps of: setting a target duty ratio depending on an ON time shorter than a minimum ON time of the switching device; setting a first duty ratio and a second duty ratio based on the target duty ratio such that at least one of the first and second duty ratios corresponds to an ON time longer than the minimum ON time of the switching device; setting one of the target, first and second duty ratios as the maximum duty ratio and another one of the duty ratios as the minimum duty ratio; setting the remaining one of the duty ratios between the maximum duty ratio and the minimum duty ratio; and driving the switching device for ON times corresponding respectively to the target duty ratio, the first duty ratio and the second duty ratio, in a duty ratio range close to a directly coupled state, in which voltages at one end of the DC/DC converter connected to the electricity storage device and at another end of the DC/DC converter connected to the fuel cell are substantially equal to each other.

According to the present invention, in order to achieve the second object, a target duty ratio is set depending on a target ON time (an ON time of the switching device depending on a target voltage) which is shorter than the minimum ON time. The first duty ratio and the second duty ratio are set such that at least one of the first and second duty ratios corresponds to an ON time longer than the minimum ON time. Two of the target duty ratio, the first duty ratio and the second duty ratio are a maximum duty ratio and another one of the duty ratios, respectively, and the remaining one of the duty ratios is set between the maximum duty ratio and the minimum duty ratio, for driving the switching device.

For example, the target duty ratio is set, and prior and subsequent duty ratios, which are prior and subsequent to the target duty ratio, are set intentionally to the first and second duty ratios which are different from the target duty ratio (i.e., depending on intentionally different ON times), and the switching device is driven with the target duty ratio and the first and second duty ratios.

If at least one of the first and second duty ratios is set to be greater than a duty ratio depending on the minimum ON time, the switching device can be turned on for an ON time depending on at least one of the first and second duty ratios, even when ON times depending on the target duty ratio and the other one of the first and second duty ratios are shorter than the minimum ON time, and the switching device is not turned on for such ON times.

Accordingly, even if at least one of the first and second duty ratios is apparently lowered, due to an increase in OFF times depending on the target duty ratio and the other one of the first and second duty ratios, and the target ON time is shorter than the minimum ON time, the switching device can be turned on with at least one of the first and second duty ratios. As a result, the output voltage of the DC/DC converter can be changed continuously as the duty ratio changes within a duty ratio range that is close to the directly coupled state. The DC/DC converter thus is reliably prevented from producing an output voltage that deviates from the voltage corresponding to the duty ratio.

In the above DC/DC converter and the above methods for driving the DC/DC converter, the switching device may be driven repeatedly with the first duty ratio, the target duty ratio, and the second duty ratio, in this order. Therefore, if the target ON time depending on the target duty ratio is referred to as a target ON time A, then the ON times depending on the first and second duty ratios are referred to as ON times B and C, which differ from the target ON time A by a predetermined value. As a result, the switching device is successively turned on at respective ON times A, B, C, A, B, C, . . . , for example. The output voltage from the DC/DC converter is thus efficiently prevented from fluctuating.

The switching device may be driven with the target duty ratio, the first duty ratio, and the target duty ratio in this order, or with the target duty ratio, the second duty ratio, and the target duty ratio in this order. If the target ON time is referred to as a target ON time A, whereas the ON time depending on one of the first and second duty ratios is referred to as an ON time B, and the ON time depending on the other of the first and second duty ratios is referred to as an ON time C, then the switching device is successively turned on for respective ON times A, B, A, C, A, B, . . . , for example. The output voltage from the DC/DC converter is thus efficiently prevented from fluctuating.

The present invention is applicable to a DC/DC converter apparatus comprising the above DC/DC converter together with a controller for driving the switching device. The controller sets the target duty ratio, sets the first and second duty ratios using the target duty ratio, and drives the switching device for ON times corresponding to the target duty ratio and the first and second duty ratios, respectively, (the method of controlling a DC/DC converter apparatus). Since the controller sets the target duty ratio and the first and second duty ratios, and drives the switching device with the target duty ratio and the first and second duty ratios, the DC/DC converter apparatus offers the same advantages as those described above.

In the DC/DC converter apparatus, the DC/DC converter may be connected between an electricity storage device, which serves as a first electric power device, and a fuel cell, which serves as a second electric power device for driving a propulsive motor and which is energizable by an inverter for producing a regenerative voltage. The DC/DC converter can increase the voltage of the electricity storage device and apply the increased voltage to the inverter, and can reduce the regenerative voltage from the inverter and apply the reduced voltage to the electricity storage device when the propulsive motor is in a regenerative mode.

According to the present invention, a vehicle (a fuel cell vehicle) comprises the DC/DC converter apparatus, the electricity storage device, the propulsive motor, and the fuel cell (a method of controlling a driving operation of a vehicle).

According to the present invention, a vehicle (an electric vehicle or a hybrid vehicle incorporating an internal combustion engine and an electricity storage device) comprises the DC/DC converter apparatus, a propulsive motor energizable by an inverter for producing a regenerative voltage, and an electricity storage device, the propulsive motor and the electricity storage device being connected to the DC/DC converter apparatus (a method of controlling a driving operation of a vehicle).

According to the present invention, a fuel cell system comprises the DC/DC converter apparatus, a fuel cell connected to a load, and an electricity storage device, the fuel cell and the electricity storage device being connected to the DC/DC converter apparatus (a method of controlling a fuel cell system).

In the above method of controlling a driving operation of a vehicle and in the method of controlling a fuel cell system, since the DC/DC converter apparatus prevents the output voltage from fluctuating, the fuel cell or the like connected to output voltage terminals (high voltage terminals) is prevented from suffering due to output voltage fluctuations.

The DC/DC converter comprises a plurality of parallel phase arms connected between the first electric power device and the second electric power device, comprising upper arm switching devices and lower arm switching devices. The controller alternately turns on the phase arms, and when the controller turns on the phase arms, the controller turns on the upper arm switching devices or the lower arm switching devices, or alternately turns on the upper arm switching devices and the lower arm switching devices.

Inasmuch as the different phase arms are not simultaneously turned on, and the upper arm switching devices and the lower arm switching devices are not simultaneously turned on, at most, only one switching device is turned on at a time. Therefore, the DC/DC converter having the phase arms can reliably operate in a voltage increasing mode as well as in a voltage reducing mode.

When the phase arms are successively turned on at respective ON times A, B, A, C, A, B, . . . , the ON times of the phase arms are uniformly distributed. As a result, a temperature distribution of the phase arms is prevented from becoming localized, due to varying ON times of the upper arm switching devices and the lower arm switching devices of the phase arms.

When the controller alternately turns on the phase arms, the controller alternately turns on one of the upper arm switching devices and one of the lower arm switching devices of one of the phase arms at random, and thereafter, alternately turns on one of the upper arm switching devices and one of the lower arm switching devices of a next one of the phase arms at random.

When the controller alternately turns on the phase arms, the controller may turn on one of the upper arm switching devices of one of the phase arms, thereafter turn on one of the lower arm switching devices of one of the phase arms, thereafter turn on one of the upper arm switching devices of a next one of the phase arms, and thereafter turn on one of the lower arm switching devices of the next one of the phase arms.

Even if the ON times of the upper arm switching devices and the lower arm switching devices of the phase arms suffer from variations, the duty ratio may be set in view of such variations, so that the arm switching devices are turned on based on the set duty ratio, for thereby enabling the DC/DC converter to convert voltage in a stable manner.

If the controller alternately turns on the phase arms each in one switching period, then the control process of the controller is made easier. The controller may alternately turn on the phase arms, each within n switching periods (n being an integer of 2 or greater).

When the controller alternately turns on the upper arm switching devices or the lower arm switching devices, the controller may alternately turn on the upper arm switching devices or the lower arm switching devices with a dead time interposed therebetween, as well as alternately turn on the phase arms with a dead time interposed therebetween. In this manner, the upper arm switching devices and the lower arm switching devices are prevented from becoming short-circuited. Similarly, the phase arms are prevented from becoming short-circuited.

The DC/DC converter apparatus may include one reactor, or as many reactors as the number of phases, for thereby increasing and reducing the voltage. Specifically, the phase arms may have respective midpoints connected to each other, wherein the DC/DC converter comprises a reactor, or as many reactors as the number of phases, inserted between the connected midpoints and the first electric power device or the second electric power device, the reactors having respective terminals connected to the midpoints, respectively, and other terminals connected to each other and to the first electric power device or the second electric power device.

The controller may drive one of the phase arms for the ON time corresponding to the target duty ratio, while driving the other phase arms for ON times corresponding to the first and second duty ratios. Thus, when the phase arms are successively turned on at respective ON times A, B, C, A, B, C, . . . , for example, the controller can easily set the phases to be turned on for the ON times A, B, C.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 24A through 24C are graphs showing the manner in which a secondary voltage changes as a target voltage therefor changes;

FIG. 28A is a timing chart of the gate drive signal at a time when the process of setting the duty ratio shown in FIG. 27 is not performed;

FIGS. 28B and 28C are timing charts of the gate drive signal, at a time when the process of setting the duty ratio shown in FIG. 27 is performed;

FIG. 29A is a timing chart of the gate drive signal, at a time when the process of setting the duty ratio shown in FIG. 27 is not performed;

FIGS. 29B and 29C are timing charts of the gate drive signal, at a time when the process of setting the duty ratio shown in FIG. 27 is performed;

DESCRIPTION OF THE PREFERRED EMBODIMENTS

Vehicles incorporating a DC/DC converter apparatus having a DC/DC converter for carrying out a method for energizing the DC/DC converter according to preferred embodiments of the present invention will be described below with reference to the drawings.

The present invention may be applied not only to a DC/DC converter apparatus having a phase arm of a single phase, but also to a DC/DC converter apparatus having phase arms of a plurality of phases, i.e., two or more phases.

First, a DC/DC converter apparatus having a DC/DC converter with phase arms of three phases, and then a DC/DC converter apparatus having a DC/DC converter with a phase arm of a single phase, will be described below.

Figure 1:
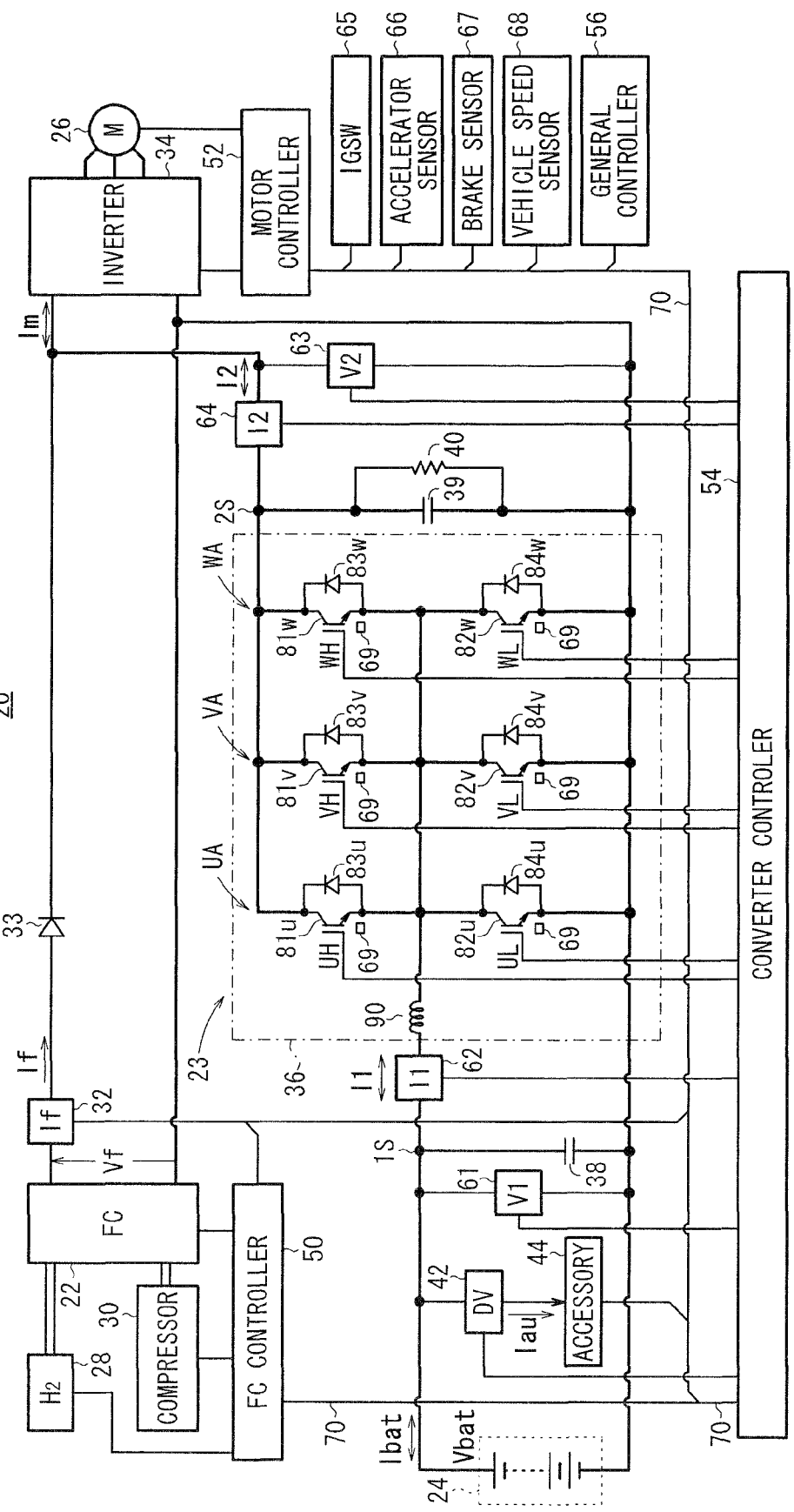
FIG. 1 is a circuit diagram, partly in block form, of a fuel cell vehicle according to an embodiment of the present invention.

FIG. 1 shows a fuel cell vehicle 20 according to an embodiment of the present invention. As shown in FIG. 1, the fuel cell vehicle 20 basically comprises a hybrid power supply device including a fuel cell (FC) 22 and an electricity storage device (referred to as a "battery") 24 serving as an energy storage, a propulsive motor 26 supplied with a current (electric power) from the hybrid power supply device through an inverter 34, and a DC/DC converter apparatus (also referred to as a "VCU (Voltage Control Unit)") 23 for converting voltages between a primary end 1S connected to the battery 24 and a secondary end 2S connected to the fuel cell 22 and the motor 26 (the inverter 34). The motor 26 and the inverter 34 jointly serve as a regenerative power supply.

The VCU 23 comprises a DC/DC converter 36 and a converter controller 54 for controlling the DC/DC converter 36.

The fuel cell 22 comprises a stacked structure made up of cells each comprising an anode electrode, a cathode electrode, and a solid-state polymer electrolytic membrane sandwiched between the anode and cathode electrodes. The fuel cell 22 is connected to a hydrogen tank 28 and an air compressor 30 by pipes. The fuel cell 22 generates a current If due to an electrochemical reaction between a hydrogen reaction gas (fuel gas) and air (oxidizer gas). The generated current If is supplied through a current sensor 32 and a diode (also referred to as "disconnecting diode") 33 to the inverter 34 and/or the DC/DC converter 36.

The inverter 34 converts the direct current If into an alternating motor current that is supplied to the motor 26, which operates in a propulsive power mode. The inverter 34 also converts an alternating motor current, which is generated by the motor 26 in a regenerative mode, into a direct motor current Im, which is supplied from the secondary end 2S to the primary end 1S through the DC/DC converter 36.

A secondary voltage V2, which may be a regenerated voltage in the regenerative mode or a generated voltage Vf across the fuel cell 22, is converted into a low primary voltage V1 by the DC/DC converter 36. The low primary voltage V1 is further converted into a lower voltage by a downverter 42. The downverter 42 supplies, under the lower voltage, an accessory current Iau to accessories 44 such as lamps, etc., and also supplies any excess current as a battery current Ibat in order to charge the battery 24.

The battery 24, which is connected to the primary end 1S, may comprise a lithium ion secondary battery or a capacitor. In the present embodiment, the battery 24 comprises a lithium ion secondary battery.

The battery 24 supplies the accessory current Iau to accessories 44 through the downverter 42, and also supplies the motor current Im through the DC/DC converter 36 to the inverter 34.

Smoothing capacitors 38, 39 are connected respectively across the primary and secondary ends 1S, 2S. A resistor 40 is connected across the smoothing capacitor 39, i.e., across the fuel cell 22.

The fuel cell 22, the hydrogen tank 28, and the air compressor 30 make up a system controlled by an FC controller 50. The inverter 34 and the motor 26 make up a system controlled by a motor controller 52, which includes an inverter driver. The DC/DC converter 36 makes up a system controlled by the converter controller 54, which includes a converter driver.

The FC controller 50, the motor controller 52, and the converter controller 54 are controlled by a general controller 56, which serves as a higher-level controller for determining a total load Lt on the fuel cell 22, etc.

Each of the general controller 56, the FC controller 50, the motor controller 52, and the converter controller 54 comprises a CPU, a ROM, a RAM, a timer, input and output interfaces including an A/D converter, a D/A converter and, if necessary, a DSP (Digital Signal Processor), etc.

The general controller 56, the FC controller 50, the motor controller 52, and the converter controller 54 are connected to each other by communication lines 70, which serve to define a CAN (Controller Area Network) as an intravehicular LAN, and perform various functions by sharing input and output information from various switches and various sensors, and by executing programs stored in ROMs under the control of CPUs based on the input and output information from the various switches and various sensors.

The switches and the sensors for detecting vehicle states include, in addition to the current sensor 32 for detecting the generated current If, a voltage sensor 61 for detecting a primary voltage V1, which is equal to a battery voltage Vbat across the battery 24, a current sensor 62 for detecting a primary current I1, a voltage sensor 63 for detecting a secondary voltage V2, which is equal to the generated voltage Vf across the fuel cell 22 when the disconnecting diode 33 is rendered conductive, a current sensor 64 for detecting a secondary current I2, an ignition switch 65, an accelerator sensor 66, a brake sensor 67, and a vehicle speed sensor 68, each of which are connected to the communication lines 70.

The general controller 56 determines a total demand load Lt on the fuel cell vehicle 20 based on the state of the fuel cell 22, the state of the battery 24, the state of the motor 26, the state of the accessories 44, and the input signals from the switches and the sensors (load demands), and determines the shares of a fuel cell allocated load (demand output) Lf to be allocated to the fuel cell 22, a battery allocated load (demand output) Lb to be allocated to the battery 24, and a regenerative power supply allocated load Lr to be allocated to the regenerative power supply, such shares being determined through an arbitration process based on the total demand load Lt, and sends commands indicative of the determined shares to the FC controller 50, the motor controller 52, and the converter controller 54.

The DC/DC converter 36 comprises three phase arms connected parallel to each other between a first power device in the form of the battery 24 and a second power device in the form of the fuel cell 22 or the regenerative power supply (the inverter 34 and the motor 26). The three phase arms include a U-phase arm UA (81*u*, 82*u*), a V-phase arm VA (81*v*, 82*v*), and a W-phase arm WA (81*w*, 82*w*), which are made up of upper arm switching devices 81 (81*u*, 81*v*, 81*w*) and lower arm switching devices 82 (82*u*, 82*v*, 82*w*) such as IGBTs or the like.

Diodes 83*u*, 83*v*, 83*w*, 84*u*, 84*v*, 84*w* are connected inversely across the respective arm switching devices 81*u*, 81*v*, 81*w*, 82*u*, 82*v*, 82*w*.

A single reactor 90, for discharging and storing energy at a time when the DC/DC converter 36 converts between the primary voltage V1 and the secondary voltage V2, is inserted between the battery 24 and the commonly connected midpoints of the U-phase arm UA, the V-phase arm VA, and the W-phase arm WA.

The upper arm switching devices 81 (81*u*, 81*v*, 81*w*) are turned on by gate drive signals (drive voltages) UH, VH, WH output from the converter controller 54 when the gate drive signals UH, VH, WH are high in level. The lower arm switching devices 82 (82*u*, 82*v*, 82*w*) are turned on by gate drive signals (drive voltages) UL, VL, WL output from the converter controller 54 when the gate drive signals UL, VL, WL are high in level.

Figure 2:
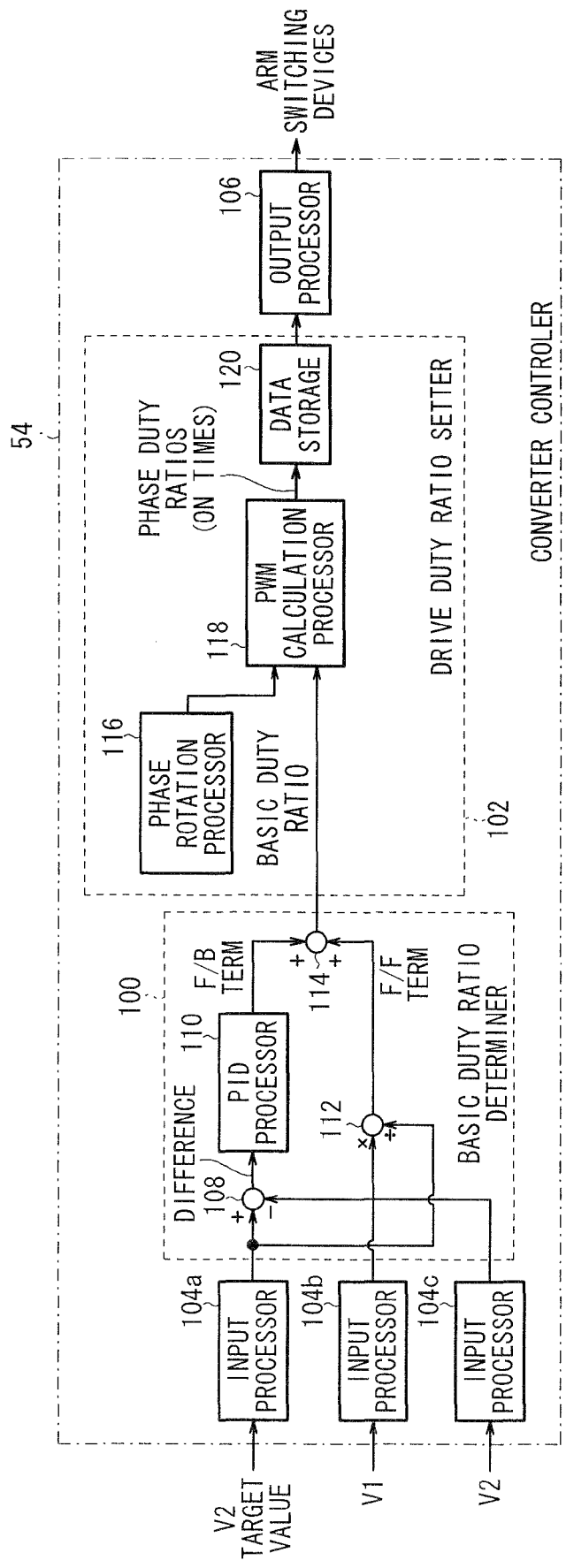
FIG. 2 is a block diagram of a converter controller shown in FIG. 1.

As shown in FIG. 2, the converter controller 54 comprises a basic duty ratio determiner 100, a drive duty ratio setter 102, a plurality of input signal processors 104a, 104b, 104c, and an output signal processor 106, in order to generate the gate drive signals UH, VH, WH, UL, VL, WL. The basic duty ratio determiner 100 comprises a subtractor 108, a PID processor 110, a divider 112, and an adder 114. The drive duty ratio setter 102 comprises a phase rotation processor 116, a PWM calculation processor 118, and a data storage 120.

The input signal processor 104a outputs a target value (target voltage) for the secondary voltage V2, which is supplied as a command from the general controller 56 (see FIG. 1) to the subtractor 108. The input signal processor 104b converts the analog primary voltage V1 detected by the voltage sensor 61 into a digital voltage V1 and outputs the digital voltage V1 to the divider 112. The input signal processor 104c converts the analog secondary voltage V2 detected by the voltage sensor 63 into a digital voltage V2 and outputs the digital voltage V2 to the subtractor 108.

The subtractor 108 calculates the difference between the target voltage and the primary voltage V1, and outputs the calculated difference to the PID processor 110. The PID processor 110 performs a PID control process based on the supplied difference in order to calculate a feedback term (F/B term) of a duty ratio depending on the difference (basic duty ratio or target duty ratio), and outputs the calculated F/B term to the adder 114. The divider 112 divides the primary voltage V1 by the target voltage in order to calculate a feed-forward term (F/F term) of the basic duty ratio, and outputs the F/F term to the adder 114. The adder 114 adds the F/B term and the F/F term together into the basic duty ratio, and outputs the basic duty ratio to the PWM calculation processor 118 of the drive duty ratio setter 102.

The phase rotation processor 116 determines an output sequence in which the gate drive signals UH, VH, WH, UL, VL, WL are to be output from the converter controller 54 to the respective arm switching devices 81u, 81v, 81w, 82u, 82v, 82w in a rotation switching process, and outputs the determined output sequence to the PWM calculation processor 118. Based on the output sequence, the PWM calculation processor 118 calculates the duty ratios of the gate drive signals UH, VH, WH, UL, VL, WL from the basic duty ratio, calculates digital data of ON times, i.e., times during which the gate drive signals UH, VH, WH, UL, VL, WL are high, of the respective arm switching devices 81u, 81v, 81w, 82u, 82v, 82w depending on the calculated duty ratios, and outputs the calculated digital data to the data storage 120. The data storage 120 comprises a memory for storing the digital data of the ON times in association with the output sequence.

The output signal processor 106 generates gate drive signals UH, VH, WH, UL, VL, WL based on the digital data stored in the data storage 120, and supplies the generated gate drive signals UH, VH, WH, UL, VL, WL to the respective arm switching devices 81u, 81v, 81w, 82u, 82v, 82w at a given timing, for example, after certain times as measured by a timer.

Figure 3:
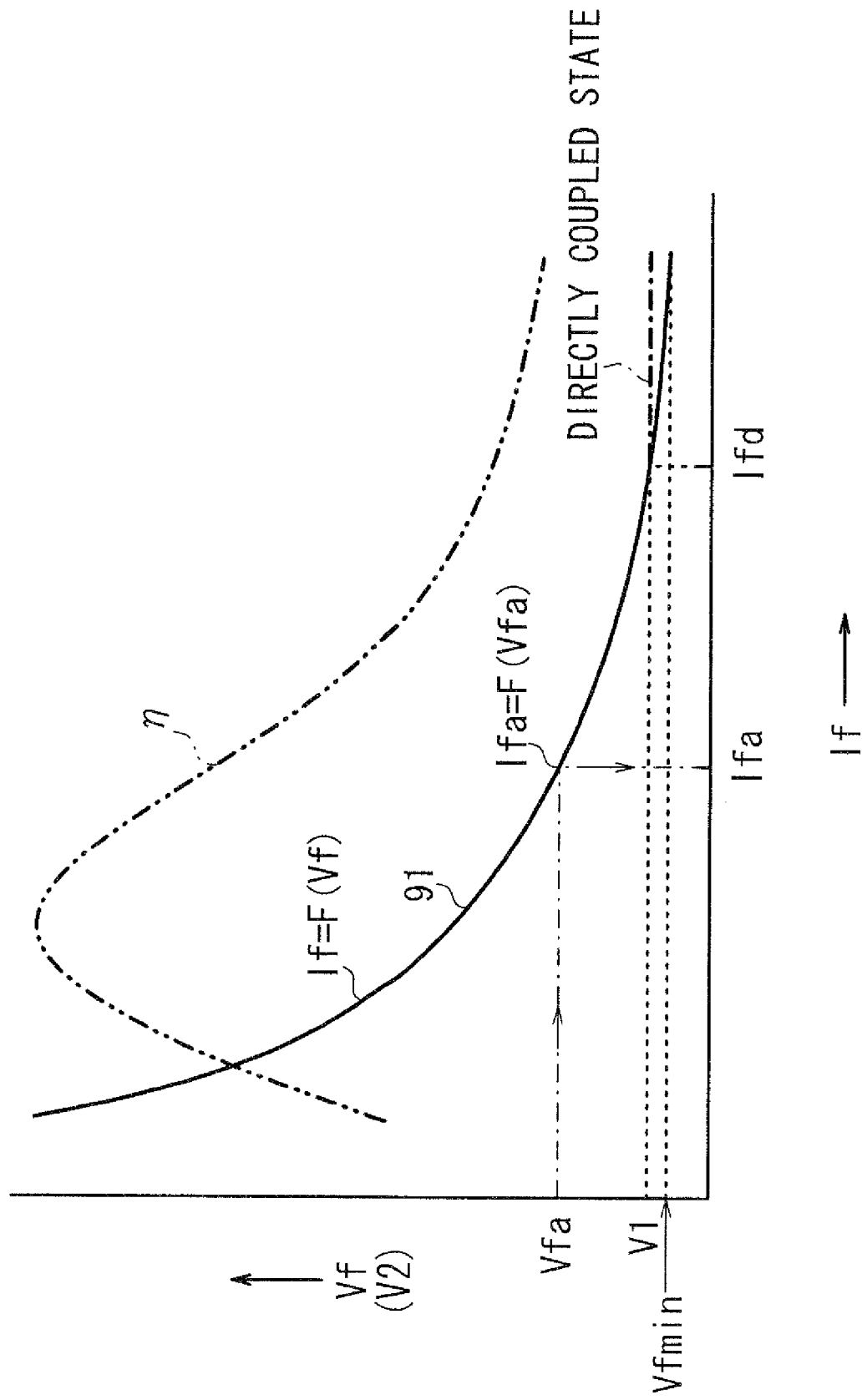
FIG. 3 is a diagram showing current versus voltage characteristics of a fuel cell.

The primary voltage V1, typically the open circuit voltage OCV across the battery 24 at a time when no load is connected to the battery 24, is set to a voltage higher than a minimum voltage Vfmin of the generated voltage Vf of the fuel cell 22, as indicated by the fuel cell output characteristic curve (current vs. voltage characteristic curve) 91 shown in FIG. 3. In FIG. 3, OCV≈V1.

The secondary voltage V2 is equal to the generated voltage Vf of the fuel cell 22 while the fuel cell 22 (see FIG. 1) is generating electric power.

When the generated voltage Vf of the fuel cell 22 becomes equal to the voltage Vbat (=V1) of the battery 24, the fuel cell 22 and the battery 24 are in a directly coupled state, as indicated by the thick dot-and-dash line in FIG. 3.

In the directly coupled state, the duty ratios of the gate drive signals UH, VH, WH supplied to the upper arm switching devices 81 (81u, 81v, 81w) are 100%. When current is to flow from the secondary end 2S to the primary end 1S, the upper arm switching devices 81 (81u, 81v, 81w) are turned on, and current flows through the upper arm switching devices 81 (81u, 81v, 81w). When current is to flow from the primary end 1S to the secondary end 2S, the diodes 83u, 83v, 83w are rendered conductive, and the current flows through the diodes 83u, 83v, 83w.

In a directly coupled state (referred to as "directly coupled state for high output power" or "first directly coupled state"), for supplying or sourcing the secondary current I2 from the secondary end 2S of the DC/DC converter 36 to the inverter 34 in order to produce high output power, the secondary voltage V2 is represented by V2=V1−Vd (Vd is a forward voltage drop across the diodes 83u, 83v, 83w).

The directly coupled state is not limited to a time when high output power is to be produced, but may be employed if necessary for control. For example, when the fuel cell vehicle 20 is stopped at a traffic signal, for better fuel economy, the air compressor 30 is inactivated and the hydrogen tank 28 does not supply the fuel gas. At this time, when the remaining fuel gas in the fuel cell 22 has been used up, the generated voltage Vf (generated current If) of the fuel cell 22 falls to zero as it is discharged by the resistor 40 and supplied to the accessories 44 including an air conditioner. However, the accessory current Iau is continuously supplied from the battery 24 to the accessories 44.

When the fuel cell 22 is to generate electric power, by releasing the brake pedal and pressing the accelerator pedal while the fuel cell vehicle 20 is stopped in an idling state, the voltage at the secondary end 2S of the DC/DC converter 36 is kept at a level in a directly coupled state in order for the VCU 23 to resume its output control on the fuel cell 22 smoothly. In such a directly coupled state (referred to as "idling directly coupled state" or "second directly coupled state"), the resistor 40 serves as the load, and the secondary voltage V2 at the secondary end 2S of the DC/DC converter 36 is held at the level V2=V1−Vd.

The output control performed on the fuel cell 22 by the VCU 23 will be described below.

When the fuel cell 22 generates electric power, while the fuel cell 22 is being supplied with fuel gas from the hydrogen tank 28 and compressed air from the air compressor 30, the generated current If of the fuel cell 22 is determined by the converter controller 54 setting the secondary voltage V2, i.e., the generated voltage Vf, through the converter 36 on the characteristic curve 91, also referred to as "function F(Vf)", as shown in FIG. 3. The generated current If value is determined as a function F(Vf) of the generated voltage Vf. Since If=F(Vf), if the generated voltage Vf is set as Vf=Vfa=V2, a generated current Ifa value is determined as a function of the generated voltage Vfa(V2), according to Ifa=F(Vfa)=F(V2).

Inasmuch as the generated current If of the fuel cell 22 is determined when the secondary voltage V2 (the generated voltage Vf) is determined, the secondary voltage V2 (the generated voltage Vf) is set as a target voltage (target value) when the fuel cell vehicle 20 is controlled for propulsion. In special cases, when the battery 24 (the first power device) is determined to be suffering a failure, such as when the battery 24 is opened due to a wire disconnection between the downverter 42 and the battery 24, the primary voltage V1 is used as the target voltage. FIG. 2 shows the internal structure of the converter controller 54 at the time the secondary voltage V2 is set as the target voltage. If the primary voltage V1 is used as the target voltage, then the basic duty ratio determiner 100 of the converter controller 54 may be appropriately changed in structure.

In a system including the fuel cell 22, such as the fuel cell vehicle 20, the VCU 23 is controlled in order to set the secondary voltage V2 at the secondary end 2S of the DC/DC converter 36 (see FIG. 1) as the target voltage, and the output (the generated current If) of the fuel cell 22 is controlled by the VCU 23. The output control performed on the fuel cell 22 by the VCU 23 has been described above.

A basic operation of the DC/DC converter 36, which is controlled by the converter controller 54, will be described below with reference to FIG. 4.

As described above, the general controller 56 determines a total demand load Lt on the fuel cell vehicle 20 based on the state of the fuel cell 22, the state of the battery 24, the state of the motor 26, the state of the accessories 44, and the input signals from the switches and the sensors (load demands). The general controller 56 also determines, through an arbitration process, shares of a fuel cell allocated load (demand output) Lf to be allocated to the fuel cell 22, a battery allocated load (demand output) to be allocated to the battery 24, and a regenerative power supply allocated load Lr to be allocated to the regenerative power supply, based on the total demand load Lt. The general controller 56 then sends commands indicative of the determined shares to the FC controller 50, the motor controller 52, and the converter controller 54.

Figure 4:
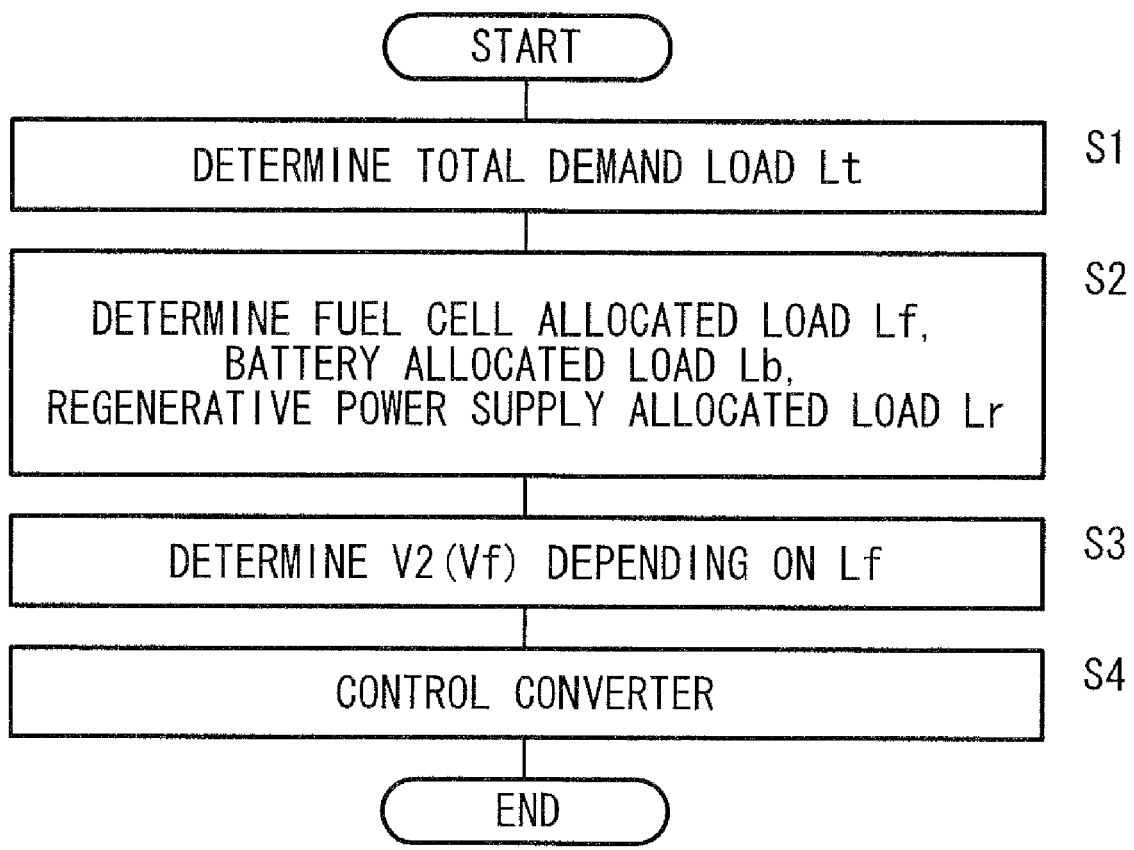
FIG. 4 is a flowchart of a basic control sequence of a DC/DC converter apparatus on the fuel cell vehicle.

In step S1 shown in FIG. 4, the general controller 56 determines (calculates) a total demand load Lt from the power demand of the motor 26, the power demand of the accessories 44, and the power demand of the air compressor 30, all of which represent load demands. In step S2, the general controller 56 determines the shares of a fuel cell allocated load Lf, a battery allocated load Lb, and a regenerative power supply allocated load Lr for outputting the determined total demand load Lt. When the general controller 56 determines the fuel cell allocated load Lf, the general controller 56 takes the efficiency η of the fuel cell 22 into account.

Then, in step S3, the converter controller 54 determines a generated voltage Vf of the fuel cell 22, i.e., the secondary voltage V2, depending on the fuel cell allocated load Lf.

After the generated voltage Vf is determined, the converter controller 54 controls the DC/DC converter 36 in order to achieve the determined secondary voltage V2 in step S4.

Specifically, the converter controller 54 energizes the DC/DC converter 36 in a voltage increasing mode, a voltage reducing mode, or a directly coupled mode, depending on the determined secondary voltage V2.

In the voltage increasing mode for sourcing the secondary current I2 from the secondary end 2S of the DC/DC converter 36 to the inverter 34, in step S4, the converter controller 54 controls the DC/DC converter 36 in a rotation switching process by turning on the lower arm switching device 82u (thus storing energy in the reactor 90 with the primary current I1 produced by subtracting the accessory current Iau from the battery current Ibat, and at the same time sourcing the secondary current I2 from the capacitor 39 to the inverter 34), then rendering the diodes 83u, 83v, 83w conductive (discharging energy from the reactor 90, storing the energy in the capacitor 39, and sourcing the secondary current I2 to the inverter 34), thereafter turning on the lower arm switching device 82v, then rendering the diodes 83u, 83v, 83w conductive, then turning on the lower arm switching device 82w, then rendering the diodes 83u, 83v, 83w conductive, thereafter turning on the lower arm switching device 82u, and so on.

The ON duty ratios of the upper arm switching devices 81u, 81v, 81w and the lower arm switching devices 82u, 82v, 82w are determined to maintain the output voltage V2.

In the directly coupled mode for high output power, wherein the secondary current I2 is sourced from the secondary end 2S of the DC/DC converter 36 to the inverter 34 in step S4, the diodes 83u, 83v, 83w are rendered conductive, and the secondary voltage V2 is represented by V2=V1−Vd.

In the voltage reducing mode for supplying or sinking the secondary current I2 from the secondary end 2S of the DC/DC converter 36 to the accessories 44 and the battery 24 at the primary end 1S, in step S4, the converter controller 54 controls the DC/DC converter 36 in a rotation switching process by turning on the upper arm switching device 81u (thus storing energy in the reactor 90 with the secondary current I2 output from the capacitor 39, and at the same time supplying the primary current I1 from the capacitor 38 to the accessories 44 and, if necessary, the battery 24), then rendering the diodes 84u, 84v, 84w conductive (operating as flywheel diodes discharging the energy from the reactor 90, storing the energy in the capacitor 39, and supplying the primary current I1 to the accessories 44 and, if necessary, the battery 24), thereafter turning on the upper arm switching device 81v, then rendering the diodes 84u, 84v, 84w conductive, then turning on the upper arm switching device 81w, then rendering the diodes 84u, 84v, 84w conductive, thereafter turning on the upper arm switching device 81u, and so on.

If a regenerated voltage exists, then the regenerative power supply allocated load Lr is added to the secondary current, which is sunk in the voltage reducing mode. In the voltage reducing mode, the ON duty ratios of the upper arm switching devices 81u, 81v, 81w and the lower arm switching devices 82u, 82v, 82w also are controlled depending on the determined output voltage V2.

The secondary voltage V2 and the primary voltage V1 are controlled by the duty ratios (or ON times) of the gate drive signals UH, VH, WH, UL, VL, WL that are set by the basic duty ratio determiner 100 and the drive duty ratio setter 102 of the converter controller 54, and the switching operation of the arm switching devices 81u, 81v, 81w, 82u, 82v, 82w, based on the supplied gate drive signals UH, VH, WH, UL, VL, WL.

The basic operation of the DC/DC converter 86 under the control by the converter controller 54 has been described above.

The arm switching devices 81u, 81v, 81w, 82u, 82v, 82w are assembled as a so-called 6-in-1 module, which is fixedly mounted on a heat spreader made of metal, not shown.

The rotating switching process controlled by the VCU 23 including the DC/DC converter 36 will be described in detail below.

Figure 5:
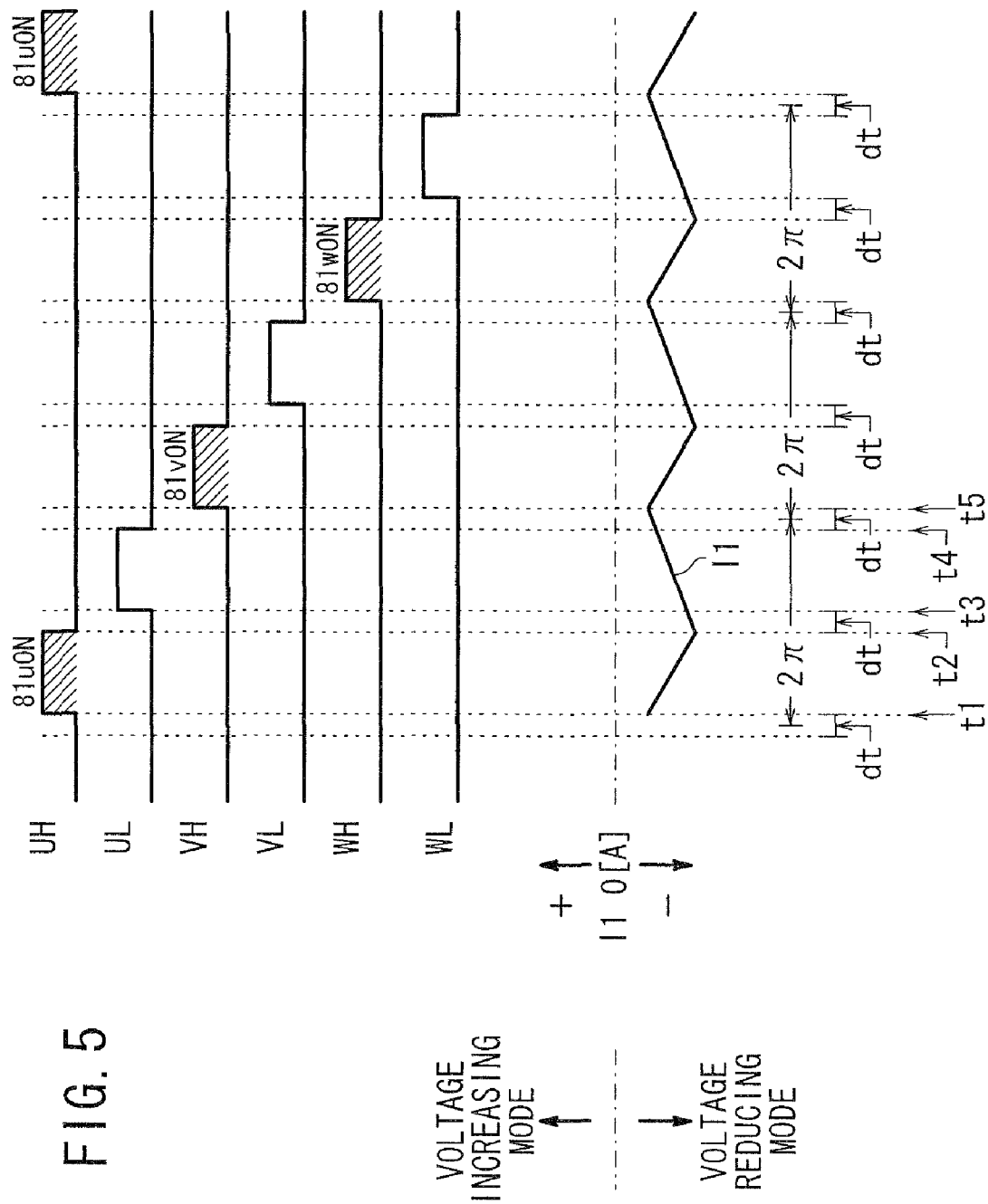
FIG. 5 is a timing chart of a voltage reducing mode of the DC/DC converter apparatus.
Figure 6:
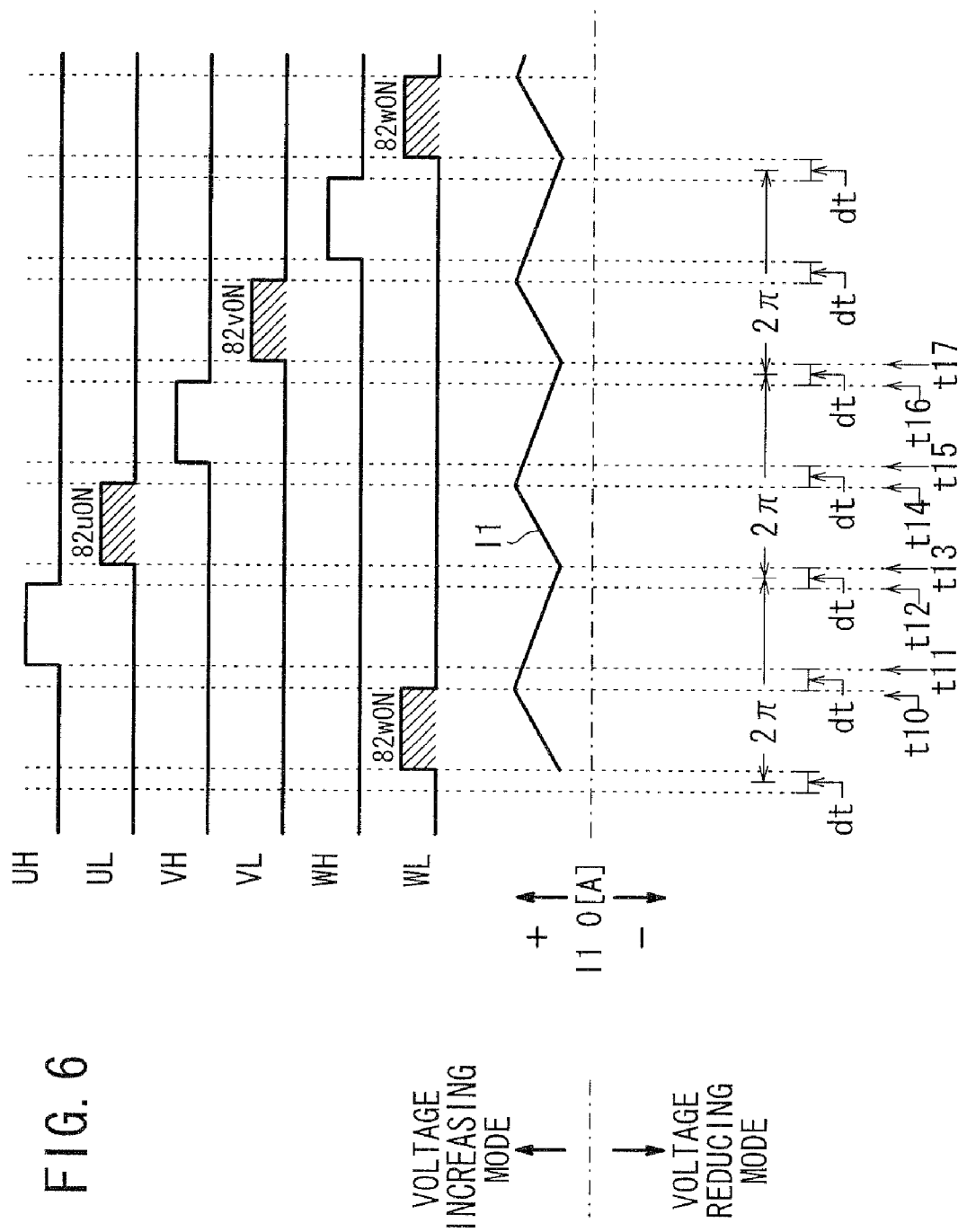
FIG. 6 is a timing chart of a voltage increasing mode of the DC/DC converter apparatus.

FIG. 5 shows a timing chart of a voltage reducing mode (for sinking the secondary current I2) of the VCU 23, and FIG. 6 shows a timing chart of a voltage increasing mode (for sourcing the secondary current I2) of the VCU 23.

In FIGS. 5 and 6, the primary current I1 flowing through the reactor 90 has a positive (+) sign when the primary current I1 flows from the primary end 1S to the secondary end 2S in the voltage increasing mode (wherein a source current flows from the secondary end 2S of the DC/DC converter 36 to the inverter 34). The primary current I1 has a negative sign (−) when the primary current I1 flows from the secondary end 2S to the primary end 1S in the voltage reducing mode (wherein a sink current flows from the fuel cell 22 or the inverter 34 to the secondary end 2S of the DC/DC converter 36).

Among the waveforms of the gate drive signals UH, UL, VH, VL, WH, WL output from the converter controller 54, periods that are shown in hatching represent periods in which the arm switching devices, which are supplied with the gate drive signals UH, UL, VH, VL, WH, WL (e.g., the upper arm switching device 81u is supplied with the gate drive signal UH), are actually turned on, i.e., when currents are flowing through the arm switching devices. It should be noted that even when the arm switching devices are supplied with the gate drive signals UH, UL, VH, VL, WH, WL, currents do not flow through the arm switching devices unless the corresponding parallel diodes 83u, 83v, 83w, 84u, 84v, 84w are turned off.

As shown in FIGS. 5 and 6, in either of the voltage reducing mode and the voltage increasing mode of the DC/DC converter 36, as can be understood from the waveforms of the gate drive signals UH, UL, VH, VL, WH, WL output from the converter controller 54, the U-, V-, W-phase arms UA, VA, WA are alternately turned on by the gate drive signals UH, UL, VH, VL, WH, WL during the rotation switching process. When the U-, V-, W-phase arms UA, VA, WA are turned on, the upper arm switching devices 81u, 81v, 81w of the U-, V-, W-phase arms UA, VA, WA are turned on by the gate drive signals UH, VH, WH (see FIG. 5), or the lower arm switching devices 82u, 82v, 82w of the U-, V-, W-phase arms UA, VA, WA are turned on by the gate drive signals UL, VL, WL (see FIG. 6).

Figure 7:
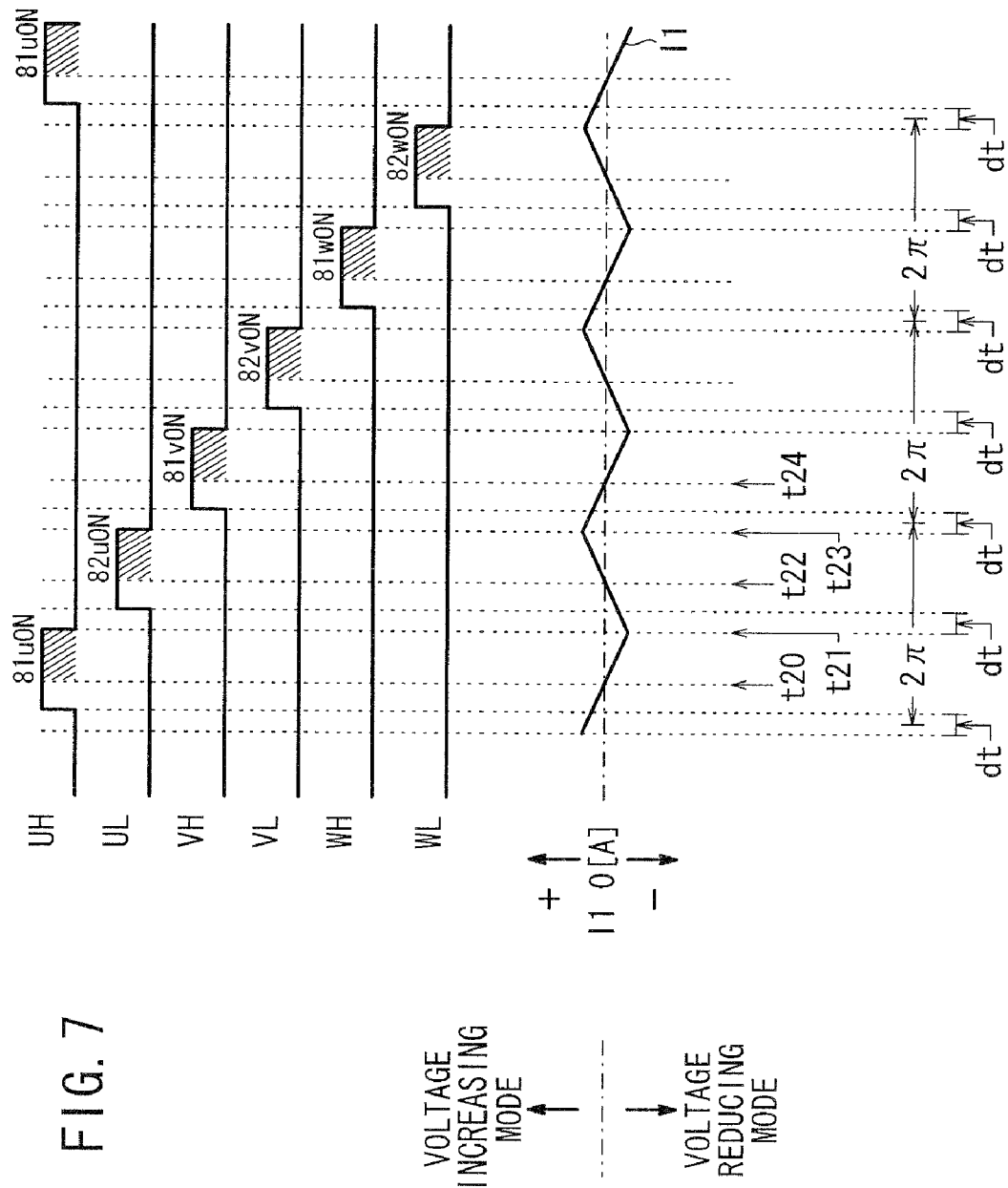
FIG. 7 is a timing chart showing transitions of the voltage increasing mode and the voltage reducing mode of the DC/DC converter apparatus.

As shown in FIGS. 5, 6, and 7, in order to prevent the upper and lower arm switching devices 81, 82 from being turned on simultaneously, and hence to prevent the secondary voltage V2 from becoming short-circuited, dead times dt are inserted between the gate drive signals UH, UL, the gate drive signals VH, VL, and the gate drive signals WH, WL, for thereby alternately turning on the upper arm switching devices 81u, 81v, 81w or the lower arm switching devices 82u, 82v, 82w. Also, when the U-, V-, W-phase arms UA, VA, WA are turned on, dead times dt are inserted between the gate drive signals UL, VH, the gate drive signals VL, WH, and the gate drive signals WL, UH. In other words, so-called synchronous switching is performed, with dead times dt being inserted between the ON times.

In the voltage reducing mode shown in FIG. 5, while the upper arm switching device 81u is being turned on by the gate drive signal UH during the period between time t1 and time t2, energy is stored in the reactor 90 through the upper arm switching device 81u by the secondary current I2 from the fuel cell 22 and/or the regenerative power supply. During the period from time t2 to time t5, which includes a dead time d5, an ON time of the gate drive signal UL (with no current flowing through the lower arm switching device 82u), and another dead time dt, the energy stored in the reactor 90 is discharged as a primary current I1 to the primary end 1S through the diodes 84u, 84v, 84w, which function as flywheel diodes and are rendered conductive. From time t5, the upper arm switching devices 81v, 81w, 81u, . . . are successively and repeatedly turned on.

In the voltage increasing mode shown in FIG. 6, while the lower arm switching device 82u is being turned on by the gate drive signal UL, during a period between time t13 and time t14, energy is stored in the reactor 90 by the primary current I1 from the battery 24. In the period from time t14 to time t17, which includes a dead time d5, an ON time of the gate drive signal VH (with no current flowing through the upper arm switching device 81v), and another dead time dt, the energy stored in the reactor 90 is discharged to the secondary end 2S through the diodes 83u, 83v, 83w, which function as rectifying diodes and are rendered conductive. From time t17, the lower arm switching devices 82v, 82w, 82u, . . . are successively and repeatedly turned on.

FIG. 7 shows transitions occurring during the voltage increasing mode and the voltage reducing mode. In FIG. 7, during a period (shown in hatching) between time t20 and time t21, during which the upper arm switching device 81u is turned on by the gate drive signal UH, energy is stored in the reactor 90 through the upper arm switching device 81u, by the secondary current I2 from the fuel cell 22 and/or the regenerative power supply.

In the period from time t21 to time t22, when the direction of current is inverted (the sign of the current changes from negative to positive), the energy stored in the reactor 90 is discharged to the primary end 1S through the diodes 84u, 84v, 84w, which function as flywheel diodes and are rendered conductive.

In the period between time t22 and time t23, while the lower arm switching device 82u is turned on by the gate drive signal UL, energy is stored in the reactor 90 by the primary current I1 from the battery 24. In the period from time t23 to time t24, when the direction of current is inverted (the sign of the current changes from positive to negative), the energy stored in the reactor 90 is discharged to the secondary end 2S through the diodes 83u, 83v, 83w, which function as flywheel diodes and are rendered conductive. The above-described operations are subsequently repeated. During the three-phase rotation switching process according to the present embodiment, as described above, smooth switching is conducted between the voltage increasing mode and the voltage reducing mode.

In the above rotation switching process, when the converter controller 54 supplies the gate drive signals UH, VH, WH having the same duty ratio as a target duty ratio to the upper arm switching devices 81u, 81v, 81w, and also supplies the gate drive signals UL, VL, WL having the same duty ratio as a target duty ratio to the lower arm switching devices 82u, 82v, 82w, the secondary voltage V2 may not change linearly as the target duty ratio changes, with the result that a secondary voltage V2, which deviates from the voltage corresponding to the duty ratio, is output from the DC/DC converter 36.

Figure 8:
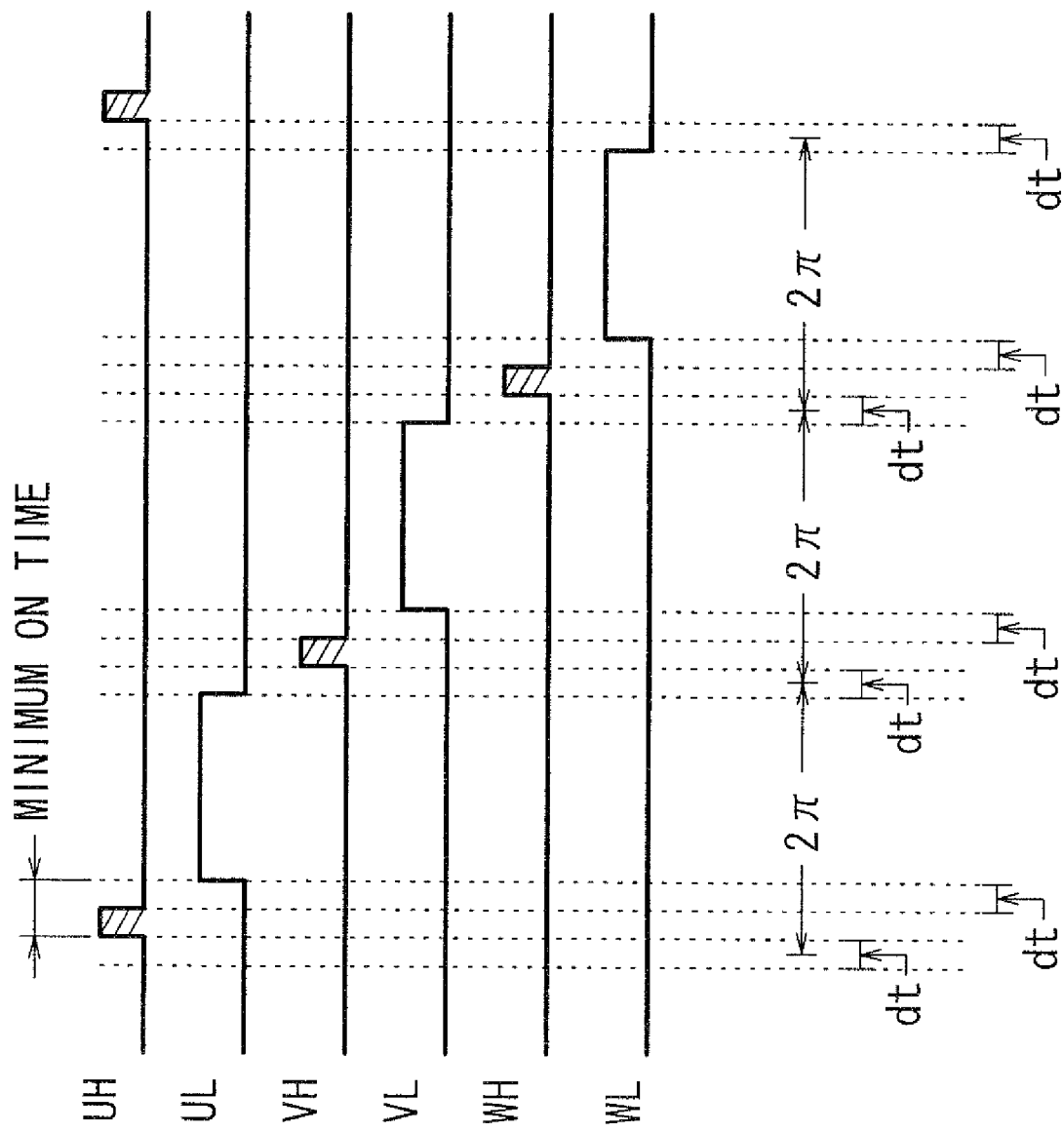
FIG. 8 is a timing chart of the voltage reducing mode of the DC/DC converter apparatus.
Figure 9:
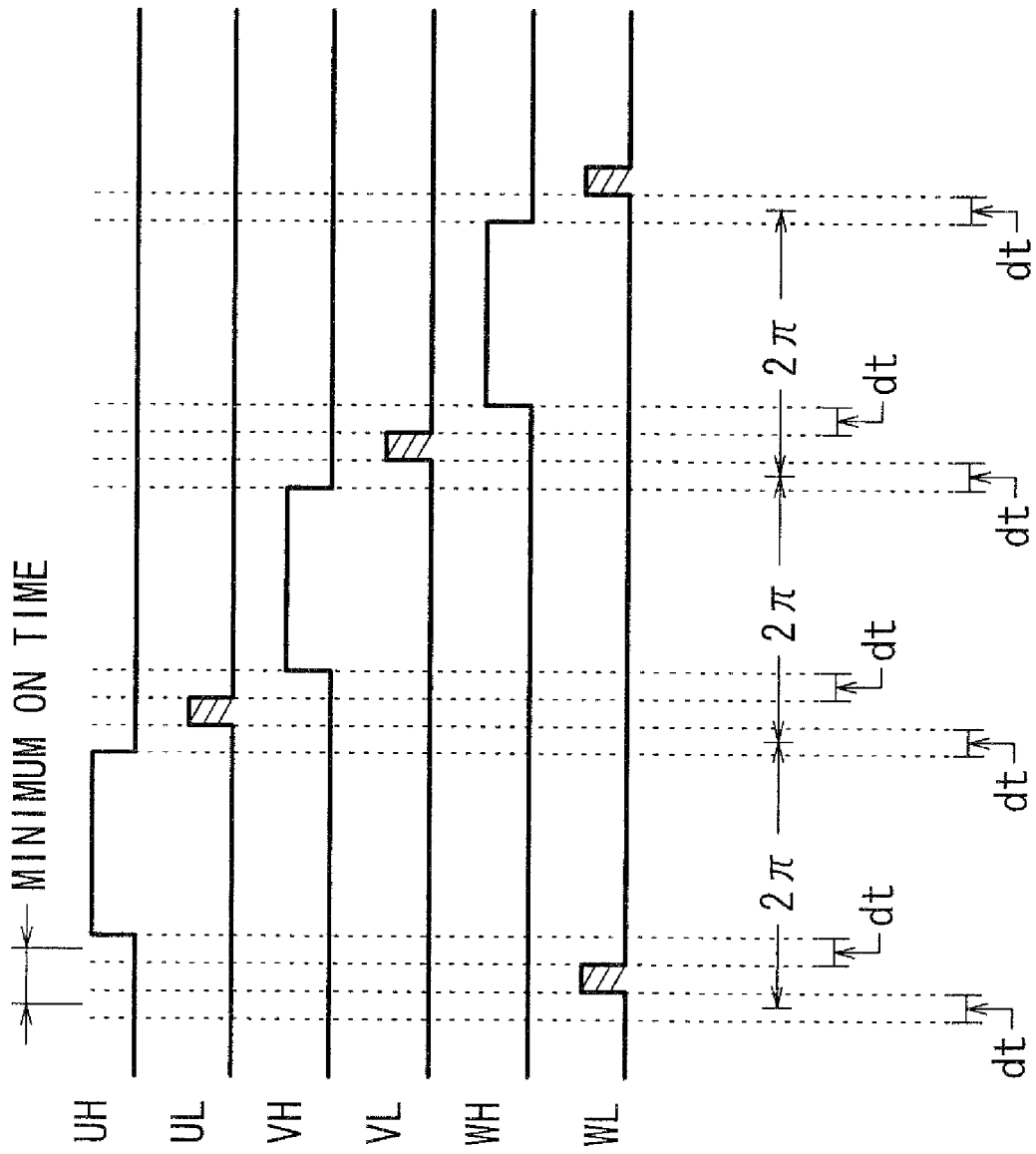
FIG. 9 is a timing chart of the voltage increasing mode of the DC/DC converter apparatus.

Such fluctuations of the secondary voltage V2 manifest themselves particularly in the voltage reducing mode shown in FIG. 8, as well as in the voltage increasing mode shown in FIG. 9.

Fluctuations of the secondary voltage V2 against the target voltage during the voltage reducing mode shown in FIG. 8 and during the voltage increasing mode shown in FIG. 9 will be described in greater detail below, with reference to FIGS. 8 through 11.

In the voltage reducing mode shown in FIG. 8, if gate drive signals UH, VH, WH, which have a duty ratio depending on an ON time that is shorter than the minimum ON time of the upper arm switching devices 81u, 81v, 81w, i.e., an ON time threshold value for reliably turning on the upper arm switching devices 81u, 81v, 81w (thus changing the upper arm switching devices 81u, 81v, 81w from a turned-off state to a turned-on state), are supplied to the upper arm switching devices 81u, 81v, 81w, and also in the voltage increasing mode shown in FIG. 9, if the gate drive signals UL, VL, WL, which have a duty ratio depending on an ON time that is shorter than the minimum ON time of the lower arm switching devices 82u, 82v, 82w, i.e., an ON time threshold value for reliably turning on the lower arm switching devices 82u, 82v, 82w, are supplied to the lower arm switching devices 82u, 82v, 82w, then the upper arm switching devices 81u, 81v, 81w and the lower arm switching devices 82u, 82v, 82w cannot be turned on reliably.

FIGS. 10A through 10D are graphs showing how the secondary voltage V2 changes in the voltage increasing mode, when the duty ratios of the gate drive signals UH, VH, WH, UL, VL, WL are changed while the primary voltage V1 is kept constant.

Figure 10A:
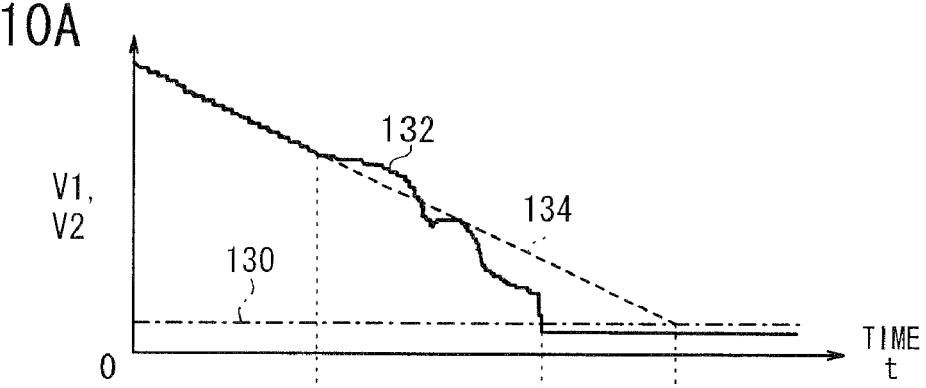
FIGS. 10A and 10C are graphs showing how a secondary voltage changes in the voltage increasing mode.
Figure 10B:
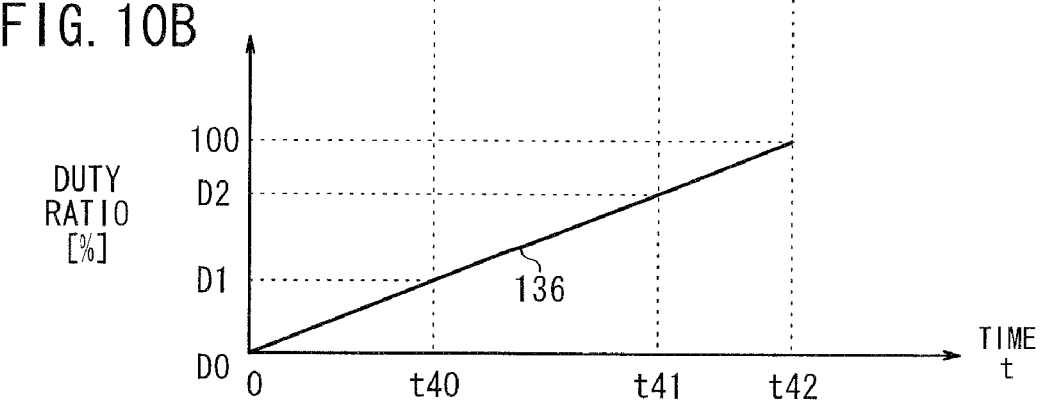
FIGS. 10B and 10D are graphs showing how a duty ratio changes in the voltage increasing mode.
Figure 10C:
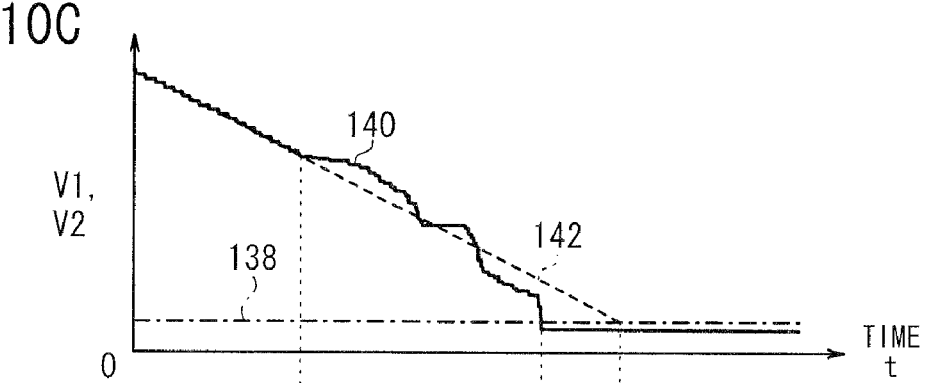
Figure 10D:
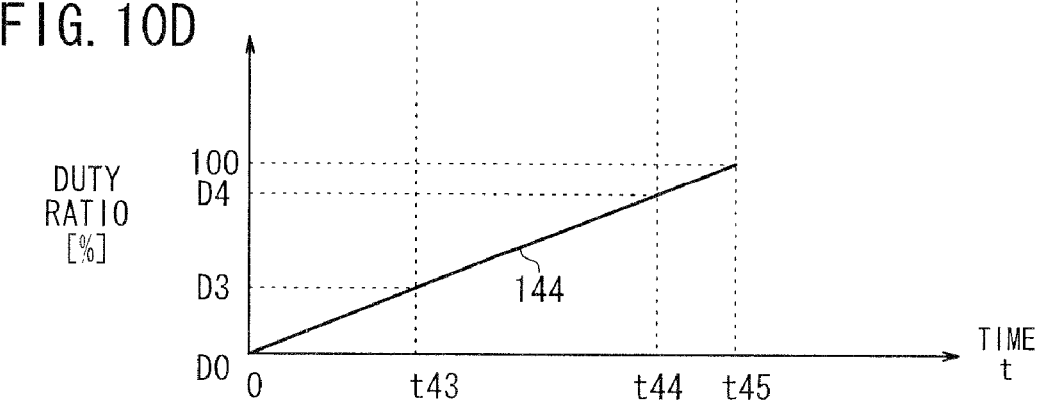

Specifically, FIGS. 10A and 10C are graphs showing how the secondary voltage v2 changes in the voltage increasing mode, and FIGS. 10B and 10D are graphs showing how the duty ratio changes in the voltage increasing mode.

FIGS. 10A and 10B show how the secondary voltage v2 and the duty ratio change when the secondary current I2 is relatively low, whereas FIGS. 10C and 10D show how the secondary voltage v2 and the duty ratio change when the secondary current I2 is relatively high.

In FIGS. 10A through 10D, the gate drive signals UH, VH, WH have the same duty ratio, and the gate drive signals UL, VL, WL have the same duty ratio.

In FIGS. 10B and 10D, the vertical axis represents the duty ratio of the gate drive signals UH, VH, WH. In the switching operation according to the present embodiment, therefore, if the duty ratio of the gate drive signals UH, VH, WH is represented by D, then the duty ratio of the gate drive signals UL, VL, WL is represented by (100–D).

In FIGS. 10B and 10D, the duty ratio linearly increases with time t, as indicated by duty ratio characteristic curves 136, 144. When the duty ratio increases linearly in such a manner, the secondary voltage V2 becomes linearly reduced as the duty ratio increases from the duty ratio value D0 (t=0) to the duty ratio values D1, D3 (time t40, time t43), as indicated by solid-line secondary voltage characteristic curves 132, 140. When the duty ratio exceeds the duty ratio values D1, D3, the secondary voltage V2 does not change linearly as the duty ratio changes, but rather fluctuates independently of the duty ratio, which is indicated by (1–V1/V2) in the voltage increasing mode and V1/V2 in the voltage reducing mode. When the duty ratio exceeds the duty ratio values D2, D4, the fuel cell 22 and the battery 24 are held in a directly coupled state (directly coupled region) where V1≈V2, although the duty ratio is not 100%.

In FIGS. 10A and 10C, the broken-line characteristic curves 134, 142 represent ideal characteristic curves of the secondary voltage V2, which is free of fluctuations, while the dot-and-dash-line characteristic curves 130, 138 represent the primary voltage V1. The directly coupled state shown in FIGS. 10A and 10C is the same as the directly coupled state indicated by the thick dot-and-dash line shown in FIG. 3.

Figure 11:
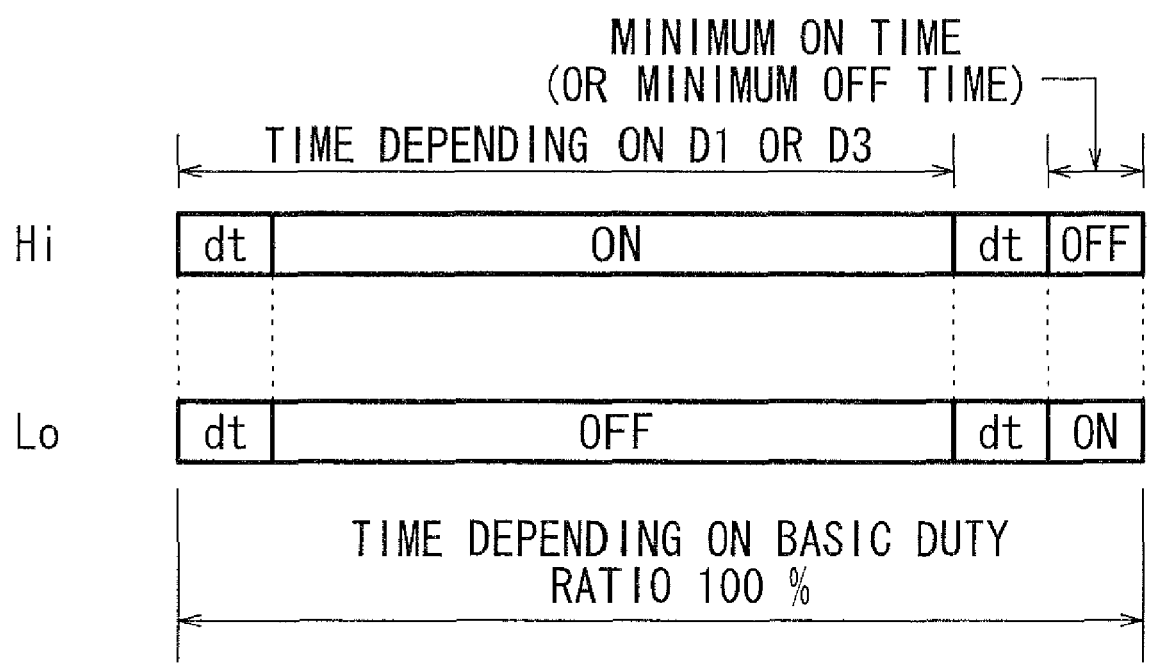
FIG. 11 is a diagram showing a minimum ON time and a minimum OFF time of an arm switching device.

The fluctuations of the secondary voltage V2 occur for the following reasons. As shown in FIG. 11, even when the gate drive signals UL, VL, WL, which have a duty ratio of (100–D1)~0 or (100–D3)~0, are supplied from the converter controller 54 to the lower arm switching devices 82u, 82v, 82w (see FIG. 1), the lower arm switching devices 82u, 82v, 82w cannot reliably be turned on. As a result, because the lower arm switching devices 82u, 82v, 82w tend to suffer from unstable switching within such a duty ratio range, the secondary voltage V2 cannot be continuously (linearly) controlled as the duty ratio ranges, i.e., the DC/DC converter 36 tends to convert voltage unstably, and also may produce a secondary voltage V2 that deviates from the voltage corresponding to the duty ratio.

If different secondary currents I2 (FIGS. 10A and 10C) flow, as shown in FIGS. 10A through 10D, then even though patterns of voltage variations according to the secondary voltage characteristic curves 132, 140 are different from each other, the voltage variations occur within the same duty ratio at a range higher than the duty ratio values D1, D3.

Problems that occur when the gate drive signals UL, VL, WL, which have a duty ratio depending on an ON time that is shorter than the minimum ON time of the lower arm switching devices 82u, 82v, 82w, are supplied to the lower arm switching devices 82u, 82v, 82w in the voltage increasing mode have been described above with reference to FIGS. 10A through 11.

Actually, however, the same problems also occur when the gate drive signals UH, VH, WH, which have a duty ratio depending on an ON time that is shorter than the minimum ON time of the upper arm switching devices 81u, 81v, 81w, are supplied to the upper arm switching devices 81u, 81v, 81w in the voltage reducing mode.

Furthermore, when the gate drive signals UH, VH, WH, UL, VL, WL, which have a duty ratio depending on a time that is shorter than the minimum OFF time of the arm switching devices 81u, 81v, 81w, 82u, 82v, 82w, i.e., an OFF time threshold value for reliably turning off the arm switching devices 81u, 81v, 81w, 82u, 82v, 82w (thus changing the arm switching devices 81u, 81v, 81w, 82u, 82v, 82w from a turned-on state to a turned-off state), are supplied to the arm switching devices 81u, 81v, 81w, 82u, 82v, 82w, then the arm switching devices 81u, 81v, 81w, 82u, 82v, 82w cannot reliably be turned on after elapse of the ON time, and the DC/DC converter 36 tends to convert voltage in an unstable manner.

In addition, in duty ranges other than the above duty ratio range, due to ON time variations between the arm switching devices 81u, 81v, 81w, 82u, 82v, 82w, the secondary voltage V2 may not change linearly as the target duty ratio changes, with the result that a secondary voltage V2, which deviates from the voltage corresponding to the duty ratio, may be output from the DC/DC converter 36.

According to the present embodiment, the converter controller 54 performs a process for varying the duty ratios of the gate drive signals UH, VH, WH from each other, and also for varying the duty ratios of the gate drive signals UL, VL, WL from each other within all duty ratio ranges, including the above duty ratio range in which the DC/DC converter 36 tends to convert voltage unstably, i.e., at a duty ratio range higher than the duty ratio values D1, D3, (a first process for achieving the first object of the present invention). According to the present embodiment, furthermore, the converter controller 54 performs a process for varying the duty ratios of the gate drive signals UH, VH, WH from each other, and also varying the duty ratios of the gate drive signals UL, VL, WL from each other, within a duty ratio range that is close to the directly coupled state in which the DC/DC converter 36 tends to convert the voltage unstably (a second process for achieving the second object of the present invention).

Figure 12:
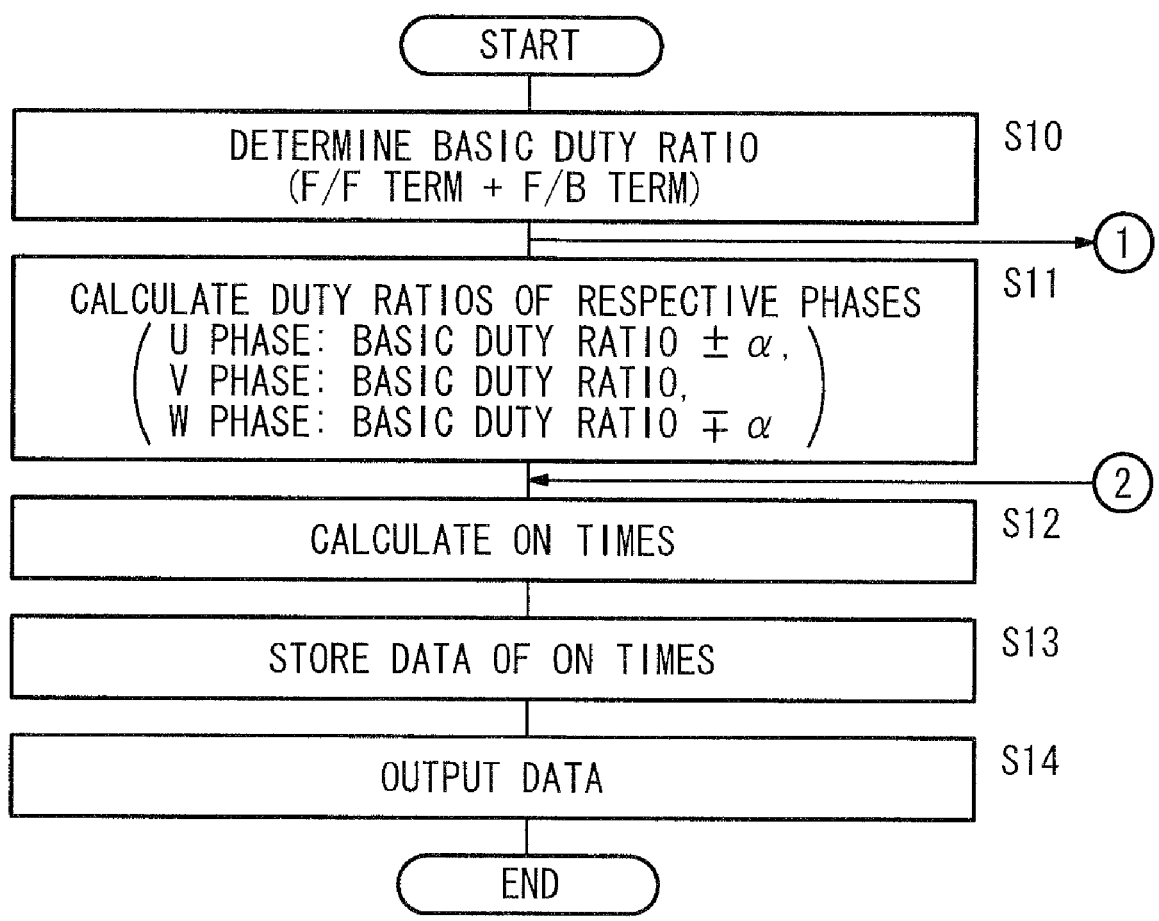
FIG. 12 is a flowchart of a process for setting the duty ratios of gate drive signals in the converter controller shown in FIG. 1.

FIG. 12 is a flowchart of a process for setting the duty ratios of the gate drive signals UH, VH, WH, UL, VL, WL in the converter controller 54 within the above duty ratio range.

In step S10, as shown in FIG. 12, the basic duty ratio determiner 100 (see FIG. 2) calculates a basic duty ratio based on the target value (target voltage) for the secondary voltage V2, which is input from the general controller 56 through the input signal processor 104a, the primary voltage V1, which is input from the voltage sensor 61 through the input signal processor 104b, and the secondary voltage V2, which is input from the voltage sensor 63 through the input signal processor 104c, and the basic duty ratio determiner 100 outputs the calculated basic duty ratio to the PWM calculation processor 118. The process for calculating the basic duty ratio in the basic duty ratio determiner 100 has already been described above, and will not be described again in detail.

In step S11, the PWM calculation processor 118 calculates (sets) the duty ratios of the gate drive signals UH, VH, WH, UL, VL, WL, using the output sequence of the gate drive signals UH, VH, WH, UL, VL, WL from the phase rotation processor 116, and the basic duty ratio from the basic duty ratio determiner 100.

The first process referred to above will be described below with reference to FIGS. 13A through 18.

Figure 13A:
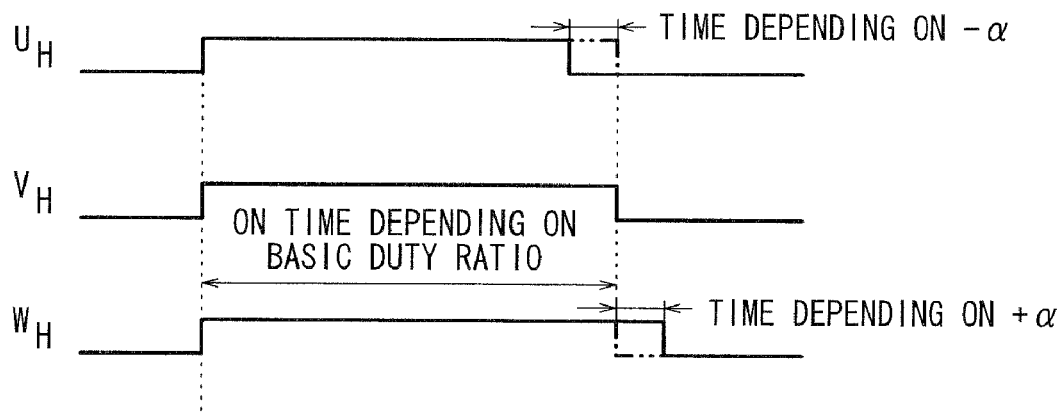
FIGS. 13A and 13B are diagrams showing the manner in which the duty ratios of the gate drive signals are set in the voltage reducing mode.
Figure 13B:
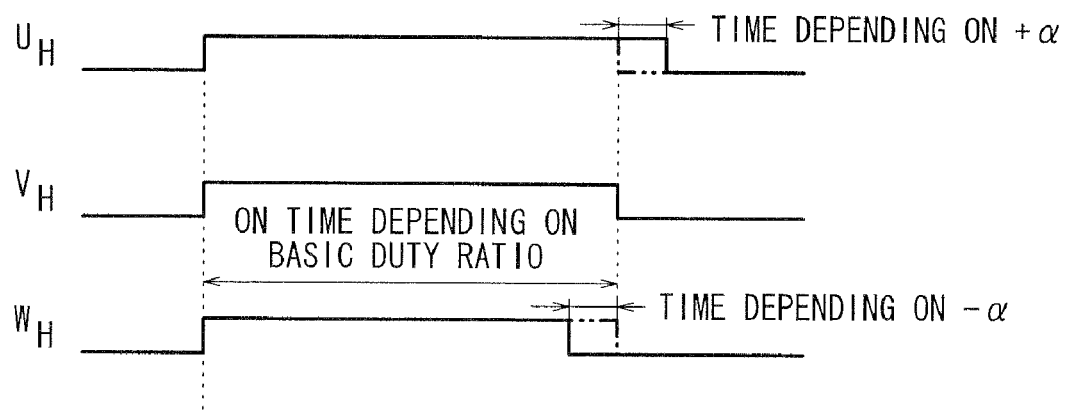

FIGS. 13A and 13B illustrate schematically, by way of example, the manner in which the duty ratios of the three gate drive signals UH, VH, WH are set in the voltage reducing mode, in the processing of step S11. It is assumed that the gate drive signals UH, VH, WH are successively supplied from the converter controller 54 to the upper arm switching devices 81u, 81v, 81w in this order.

In step S11, the PWM calculation processor 118 sets the basic duty ratio as a duty ratio (target duty ratio) of the gate drive signal VH. The PWM calculation processor 118 then sets the duty ratio (first duty ratio) of the gate drive signal UH prior to the gate drive signal VH as the minimum duty ratio (the basic duty ratio−α) (α: a predetermined value) while also setting the duty ratio (second duty ratio) of the gate drive signal WH subsequent to the gate drive signal VH as the maximum duty ratio (the basic duty ratio+α) as shown in FIG. 13A.

Alternatively, in step S11, the PWM calculation processor 118 sets the basic duty ratio as a duty ratio (target duty ratio) of the gate drive signal VH. The PWM calculation processor 118 then sets the duty ratio (first duty ratio) of the gate drive signal UH as the maximum duty ratio (the basic duty ratio+α) while also setting the duty ratio (second duty ratio) of the gate drive signal WH as the minimum duty ratio (the basic duty ratio−α) as shown in FIG. 13B.

In step S12, the PWM calculation processor 118 calculates ON times depending on the duty ratios of the gate drive signals UH, VH, WH (i.e., times in which the gate drive signals UH, VH, WH are high in level), and outputs digital data of the calculated ON times to the data storage 120. In step S13, the data storage 120 stores the digital data of the calculated ON times in association with the output sequence described above, i.e., the output sequence of the gate drive signals UH, VH, WH.

In step S14, the output processor 106 generates gate drive signals UH, VH, WH based on the digital data stored in the data storage 120, and supplies the generated gate drive signals UH, VH, WH to the upper arm switching devices 81u, 81v, 81w at a predetermined timing, for example, after a timer has measured a processing period (3×2π), which is three times a switching period 2π.

Figure 14A:
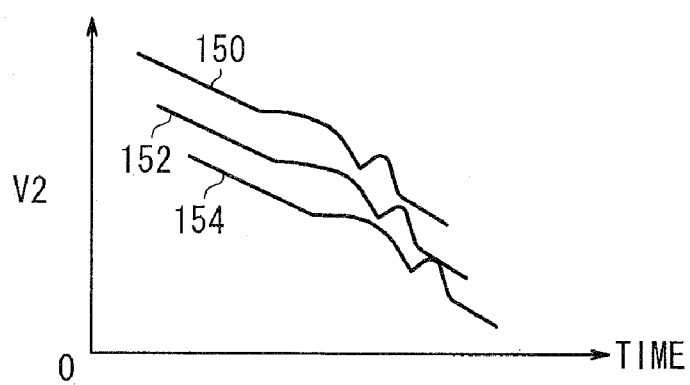
FIG. 14A is a graph showing how the secondary voltages of respective phase arms change after the duty ratios have been set.
Figure 14B:
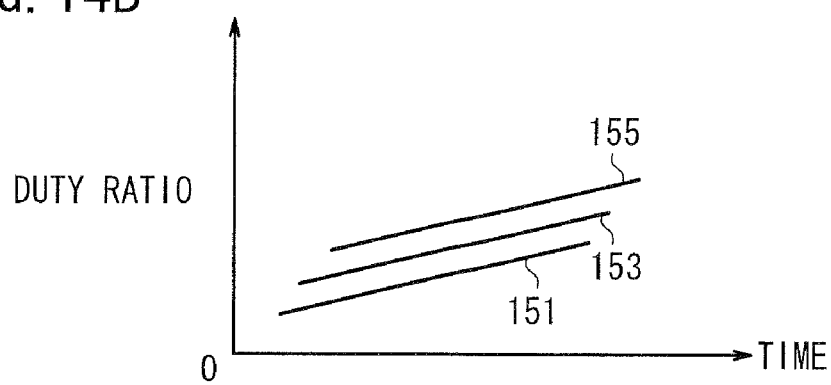
FIG. 14B is a graph showing the manner in which the duty ratios change with respect to target voltages for the secondary voltages shown in FIG. 14A.
Figure 14C:
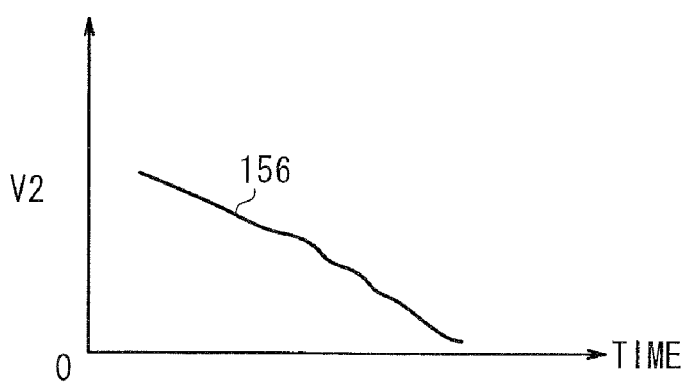
FIG. 14C is a graph showing how the overall secondary voltage of the DC/DC converter changes.
Figure 14D:
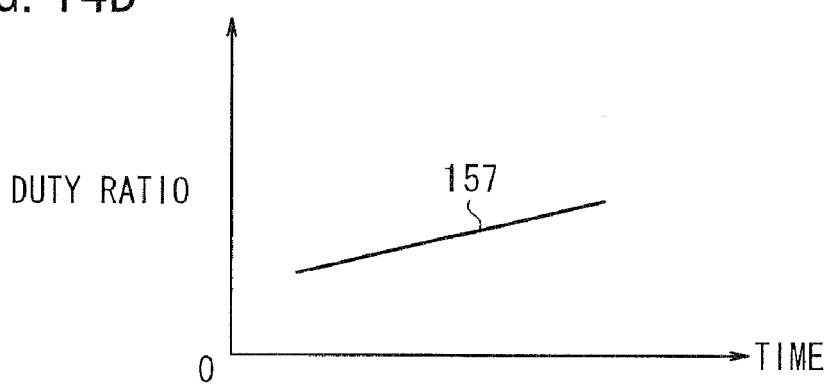
FIG. 14D is a graph showing the manner in which the duty ratio changes with respect to a target voltage for the secondary voltage shown in FIG. 14C.

When the gate drive signals UH, VH, WH, with the duty ratios thereof thus set (e.g., the gate drive signals shown in FIG. 13A), are supplied to the upper arm switching devices 81u, 81v, 81w, the characteristic curves 150, 152, 154 (see FIG. 14A) of the secondary voltages V2 of the U-phase arm UA (the upper arm switching device 81u), the V-phase arm VA (the upper arm switching device 81v), and the W-phase arm WA (the upper arm switching device 81w) exhibit voltage fluctuations as the duty ratios change, according to the characteristic curves 151, 153, 154 (see FIG. 14B). However, the characteristic curve 156 of the overall secondary voltage V2 of the DC/DC converter 36 (see FIG. 1), which represents a combination of the characteristic curves 150, 152, 154, exhibits a relatively smooth voltage, which changes linearly as the duty ratio changes, according to the characteristic curve 157 (see FIG. 14D). The relatively smooth voltage exhibited by the characteristic curve 156 is achieved due to averaging of the voltage fluctuations exhibited by the characteristic curves 150, 152, 154.

FIGS. 13A and 13B show the gate drive signals UH, VH, WH as processed in step S11 shown in FIG. 12. According to the present embodiment, as described above, the gate drive signal UH and the gate drive signal UL, the gate drive signal VH and the gate drive signal VL, and the gate drive signal WH and the gate drive signal WL, are generated during the switching period 2π. If the PWM calculation processor 118 sets the duty ratios of the gate drive signals UH, VH, WH respectively as (the basic duty ratio−α), the basic duty ratio, and (the basic duty ratio+α), then the PWM calculation processor 118 also sets the duty ratios of the gate drive signals UL, VL, WL depending on the duty ratios of the gate drive signals UH, VH, WH. In this case, the duty ratios of the gate drive signals UL, VL, WL are set respectively as {100−(the basic duty ratio−α)}, (100−the basic duty ratio), and {100−(the basic duty ratio+α)}. If the PWM calculation processor 118 sets the duty ratios of the gate drive signals UH, VH, WH respectively as (the basic duty ratio+α), the basic duty ratio, and (the basic duty ratio−α), then the PWM calculation processor 118 also sets the duty ratios of the gate drive signals UL, VL, WL respectively as {100−(the basic duty ratio+α)}, (100−the basic duty ratio), and {100−(the basic duty ratio−α)}.

Figure 15:
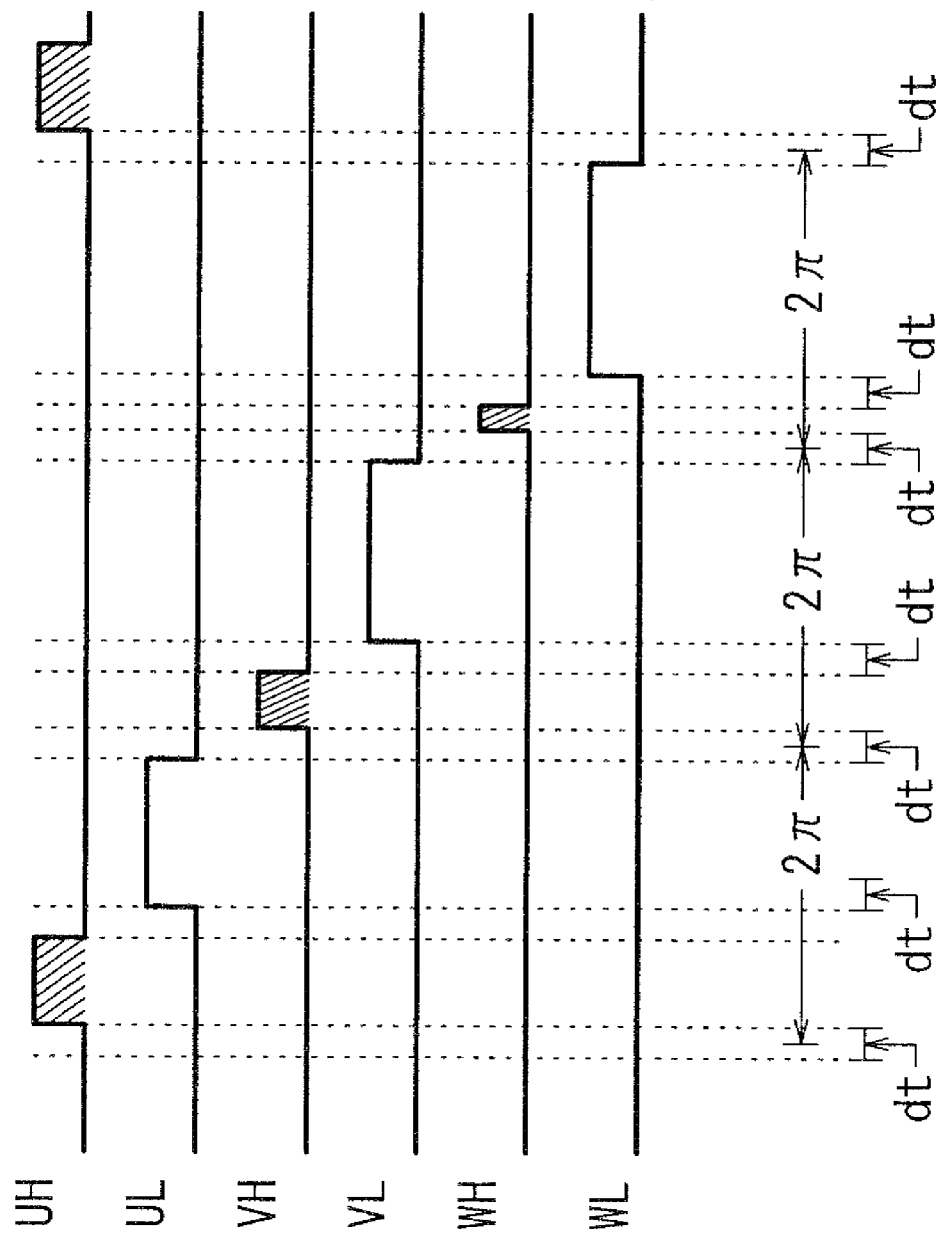
FIG. 15 is a timing chart of a voltage reducing mode of the DC/DC converter apparatus.
Figure 16:
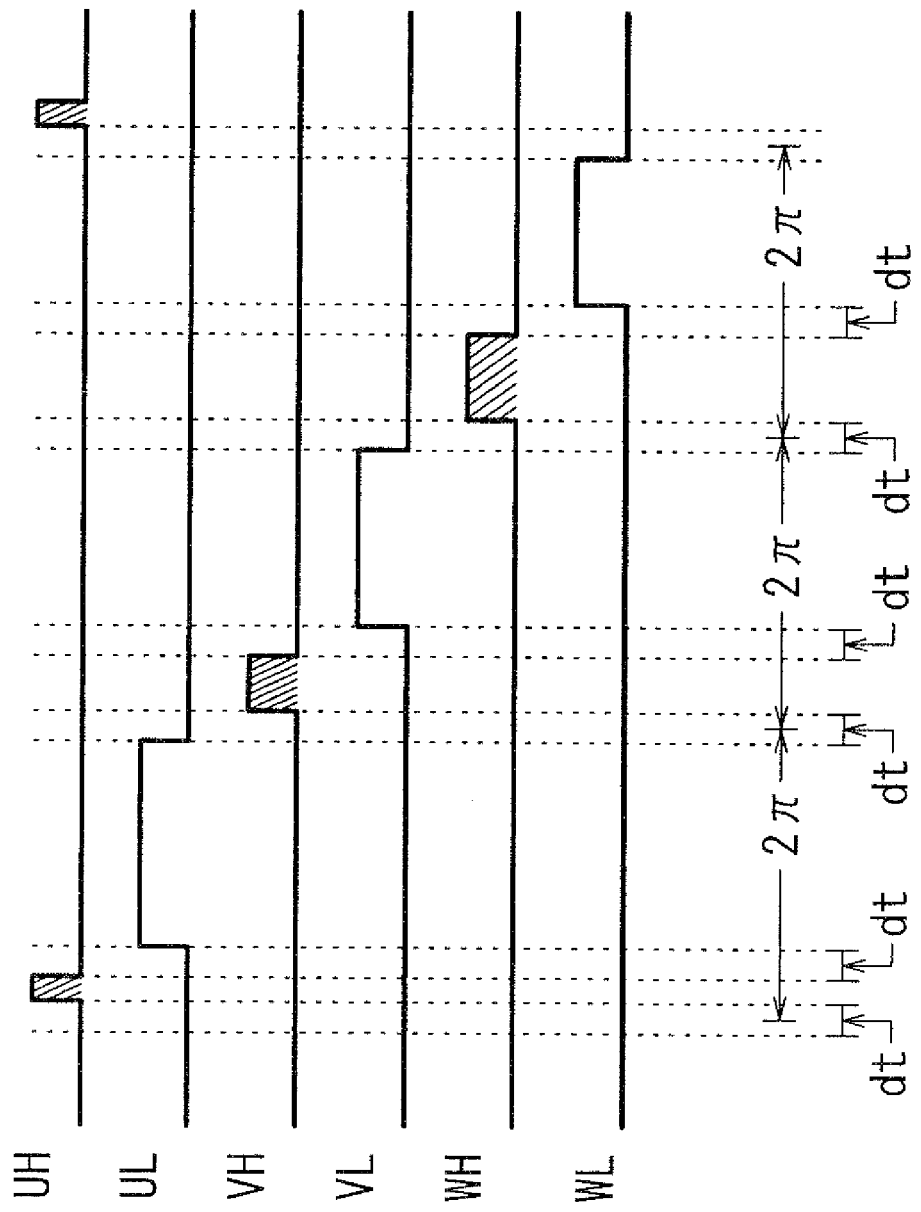
FIG. 16 is a timing chart of a voltage reducing mode of the DC/DC converter apparatus.
Figure 17:
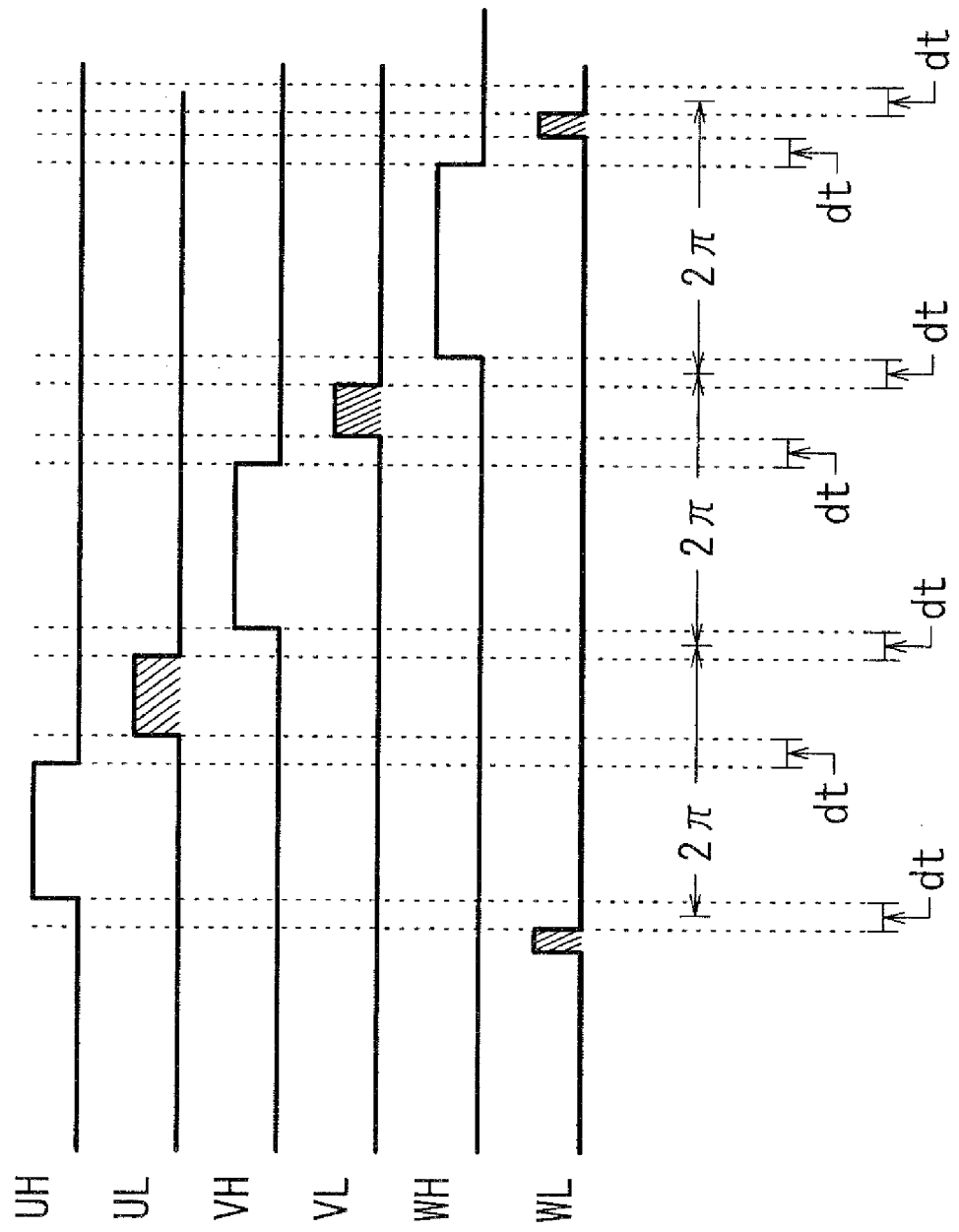
FIG. 17 is a timing chart of a voltage increasing mode of the DC/DC converter apparatus.
Figure 18:
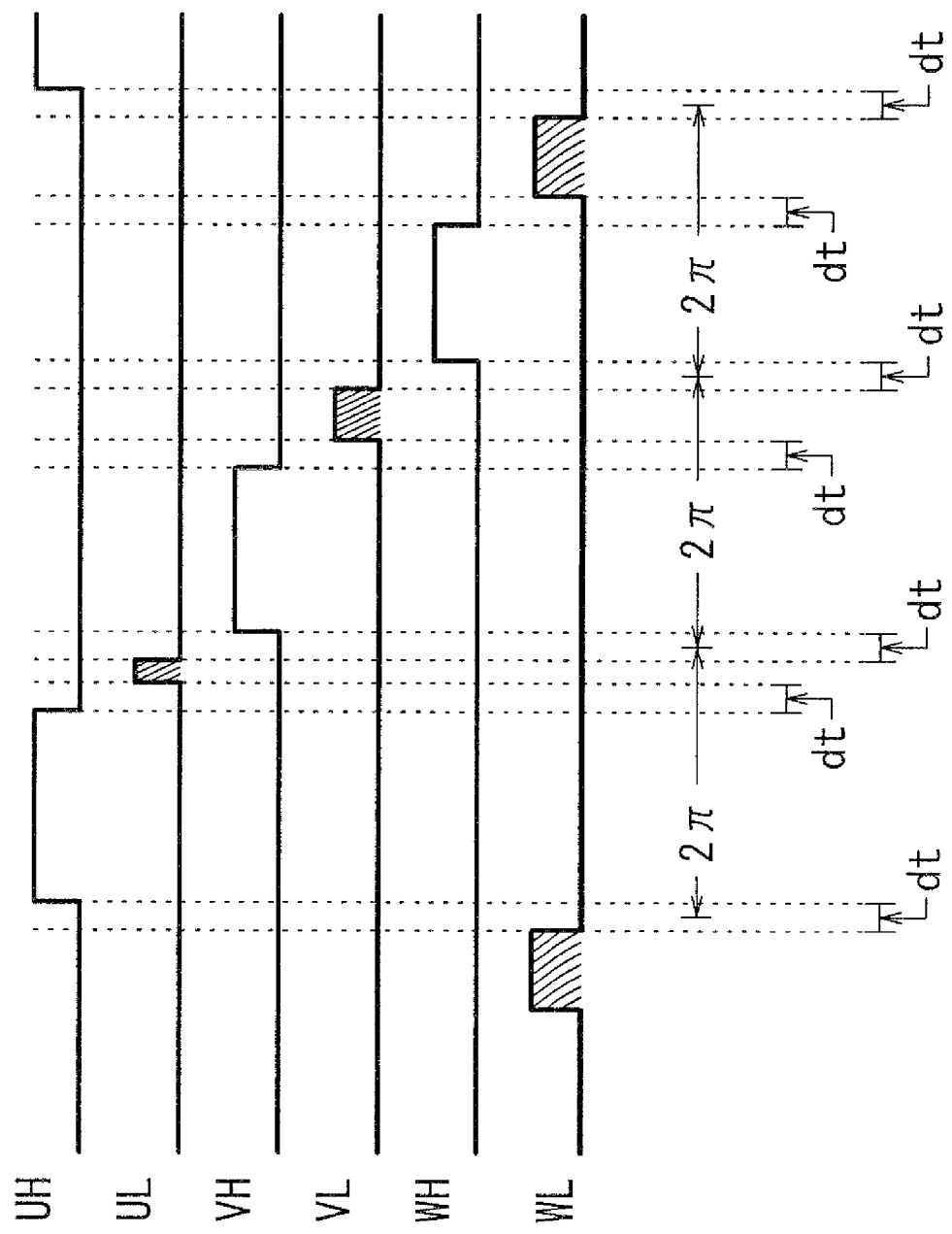
FIG. 18 is a timing chart of a voltage increasing mode of the DC/DC converter apparatus.
Figure 19:
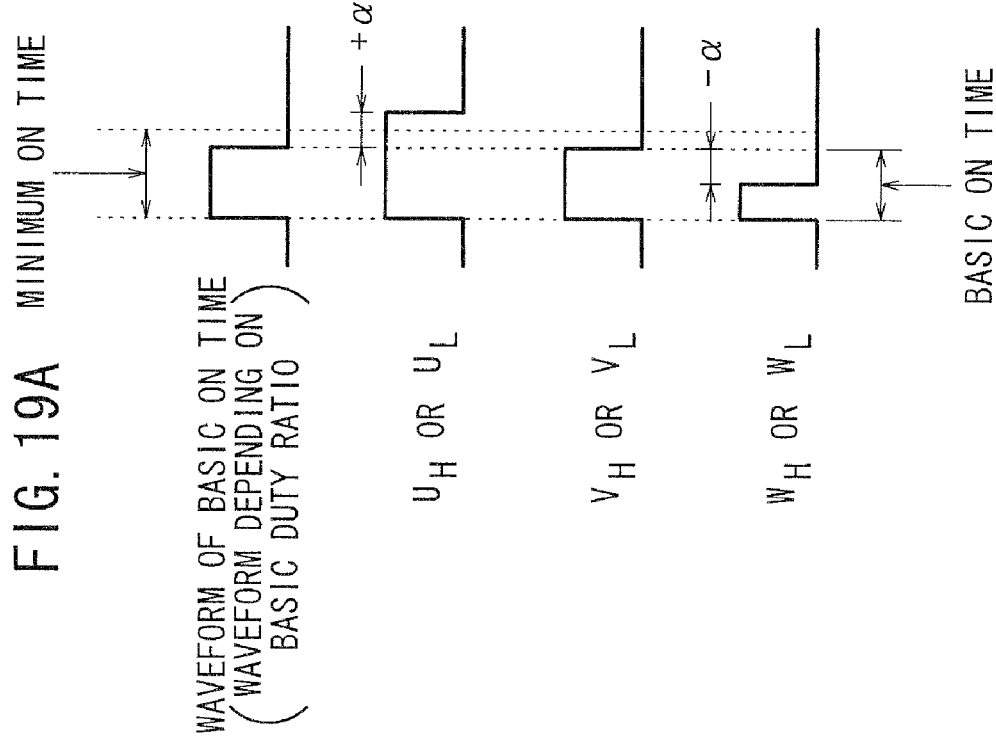
FIGS. 19A and 19B are diagrams showing the manner in which the duty ratios of gate drive signals are set.

Specifically, in the voltage reducing mode, the gate drive signals UH, VH, WH, UL, VL, WL shown in FIG. 15 or 16 are repeatedly supplied to the arm switching devices 81u, 81v, 81w, 82u, 82v, 82w in order to drive the arm switching devices. Further, in the voltage increasing mode, the gate drive signals UH, VH, WH, UL, VL, WL shown in FIG. 17 or 18 are repeatedly supplied to the arm switching devices 81u, 81v, 81w, 82u, 82v, 82w in order to drive the arm switching devices.

The first process has been described above.

The second process will be described below with reference to FIGS. 19A through 23.

FIGS. 19A and 19B schematically illustrate, by way of example, the manner in which the duty ratios of the three gate drive signals UH, VH, WH are set in the voltage reducing mode, or the manner in which the duty ratios of the three gate drive signals UL, VL, WL are set in the voltage increasing mode, during the process of step S11. It is assumed that the gate drive signals UH, VH, WH or the gate drive signals UL, VL, WL are successively supplied from the converter controller 54 to the upper arm switching devices 81u, 81v, 81w in this order, or that the gate drive signals UH, VH, WH or the gate drive signals UL, VL, WL are successively supplied from the converter controller 54 to the lower arm switching devices 82u, 82v, 82w in this order.

In step S11, the PWM calculation processor 118 sets the basic duty ratio as a duty ratio (target duty ratio) of the gate drive signal VH or VL, and then sets the duty ratio (first duty ratio) of the gate drive signal UH or UL prior to the gate drive signal VH or VL as the maximum duty ratio (the basic duty ratio+α) (α: a predetermined value), and also sets the duty ratio (second duty ratio) of the gate drive signal WH or WL subsequent to the gate drive signal VH or VL as the minimum duty ratio (the basic duty ratio−α) as shown in FIG. 19A.

Alternatively, in step S11, the PWM calculation processor 118 sets the basic duty ratio as a duty ratio (target duty ratio) of the gate drive signal VH or VL, and then sets the duty ratio (first duty ratio) of the gate drive signal UH or UL as the minimum duty ratio (the basic duty ratio−α), and also sets the duty ratio (second duty ratio) of the gate drive signal WH or WL as the maximum duty ratio (the basic duty ratio+α) as shown in FIG. 19B.

In FIGS. 19A and 19B, the duty ratio set as (the basic duty ratio+α) is a duty ratio depending on an ON time that is longer than the minimum ON time, and each of the duty ratios set as the basic duty ratio and (the basic duty ratio−α) is a duty ratio depending on an ON time that is shorter than the minimum ON time.

In step S12, the PWM calculation processor 118 calculates ON times depending on the duty ratios of the gate drive signals UH, VH, WH or the gate drive signals UL, VL, WL (i.e., times in which the gate drive signals UH, VH, WH or the gate drive signals UL, VL, WL are high in level), and outputs digital data of the calculated ON times to the data storage 120. In step S13, the data storage 120 stores the digital data of the calculated ON times in association with the output sequence described above, i.e., the output sequence of the gate drive signals UH, VH, WH or the output sequence of the gate drive signals UL, VL, WL.

In step S14, the output processor 106 generates gate drive signals UH, VH, WH or gate drive signals UL, VL, WL based on the digital data stored in the data storage 120, and supplies the generated gate drive signals UH, VH, WH or the generated gate drive signals UL, VL, WL to the upper arm switching devices 81u, 81v, 81w or to the lower arm switching devices 82u, 82v, 82w at a predetermined timing, for example, after a timer has measured a processing period (3×2π), which is three times the switching period 2π.

The gate drive signals UH, VH, WH or the gate drive signals UL, VL, WL, with the duty ratios thereof thus set, are repeatedly supplied to the upper arm switching devices 81u, 81v, 81w or the lower arm switching devices 82u, 82v, 82w. In FIG. 19A, the V-phase arm VA (the arm switching device 81v or 82v) and the W-phase arm WA (the arm switching device 81w or 82w) may not be turned on, as the V-phase arm VA and the W-phase are WA are supplied with the gate drive signals VH, WH or VL, WL having an ON time that is shorter than the minimum ON time. However, the U-phase arm UA (the arm switching device 81u or 82u) is reliably turned on, since it is supplied with the gate drive signal UH or UL having an ON time that is longer than the minimum ON time. In FIG. 19B, the U-phase arm UA (the arm switching device 81u or 82u) and the V-phase arm VA (the arm switching device 81v or 82v) may not be turned on, as the U-phase arm UA and the V-phase arm VA are supplied with the gate drive signals UH, VH or UL, VL having an ON time that is shorter than the minimum ON time. However, the W-phase arm WA (the arm switching device 81w or 82w) is reliably turned on, since it is supplied with the gate drive signal WH or WL having an ON time that is longer than the minimum ON time.

FIGS. 19A and 19B show the gate drive signals UH, VH, WH or the gate drive signals UL, VL, WL as processed in the voltage reducing mode, in step S11 of FIG. 12. According to the present embodiment, as described above, the gate drive signal UH and the gate drive signal UL, the gate drive signal VH and the gate drive signal VL, and the gate drive signal WH and the gate drive signal WL are generated within the switching period 2π. If the PWM calculation processor 118 sets the duty ratios of the gate drive signals UH, VH, WH in the voltage reducing mode, or sets the gate drive signals UL, VL, WL in the voltage increasing mode, respectively, as (the basic duty ratio+α), the basic duty ratio, and (the basic duty ratio−α), then the PWM calculation processor 118 also sets the duty ratios of the gate drive signals UL, VL, WL or the gate drive signals UL, VL, WL, depending on the duty ratios of the gate drive signals UL, VL, WL in the voltage reducing mode or the duty ratios of the gate drive signals UH, VH, WH in the voltage increasing mode.

In the voltage reducing mode, the duty ratios of the gate drive signals UL, VL, WL are set respectively as {100−(the basic duty ratio+α)}, (100−the basic duty ratio), and {100−(the basic duty ratio−α)}, or as {100−(the basic duty ratio−α)}, (100−the basic duty ratio), and {100−(the basic duty ratio+α)}. In the voltage increasing mode, the duty ratios of the gate drive signals UH, VH, WH are set respectively as {100−(the basic duty ratio+α)}, (100−the basic duty ratio), and {100−(the basic duty ratio−α)}, or as {100−(the basic duty ratio−α)}, (100−the basic duty ratio), and {100−(the basic duty ratio+α)}.

Figure 20:
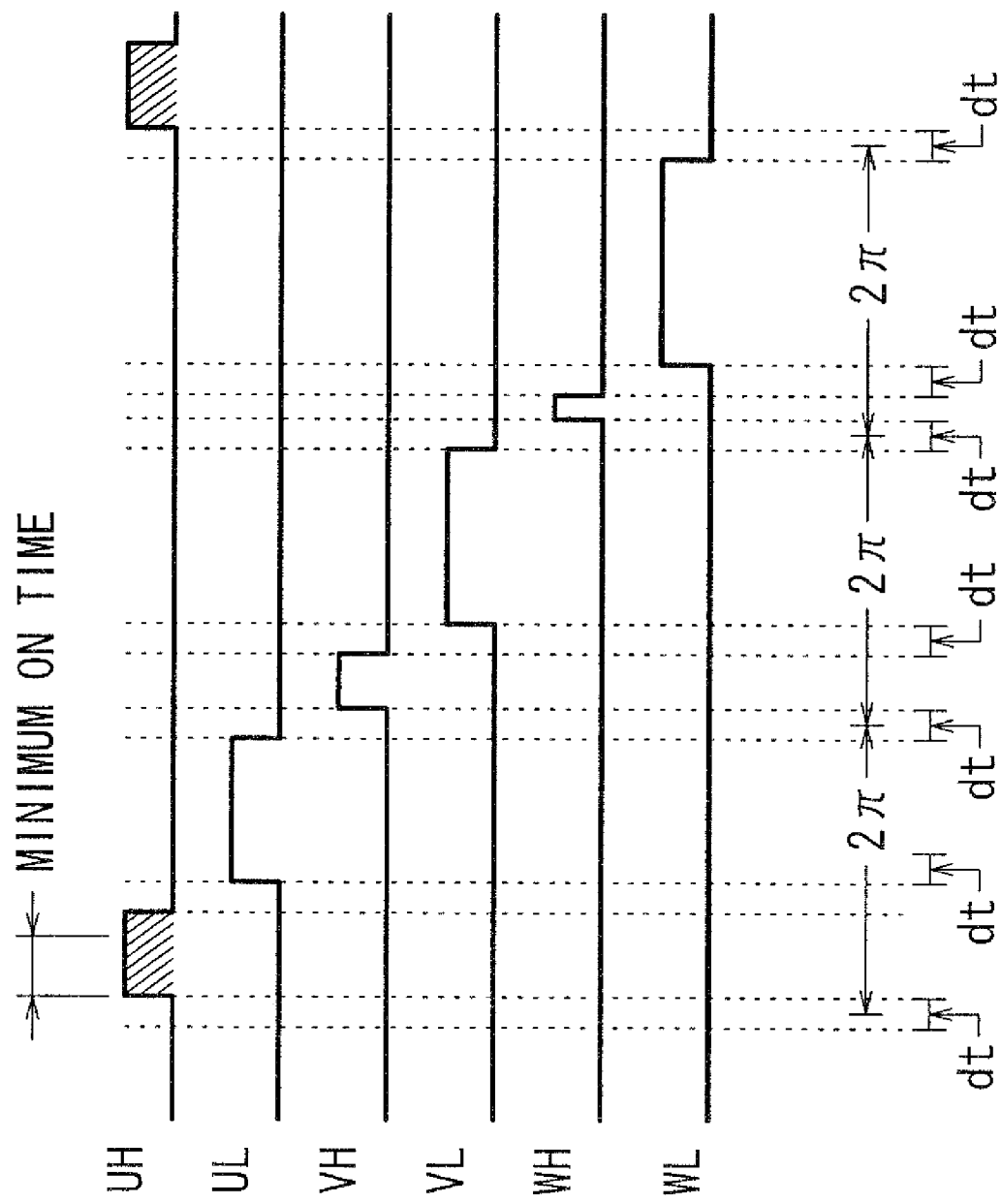
FIG. 20 is a timing chart of a voltage reducing mode of the DC/DC converter apparatus.
Figure 21:
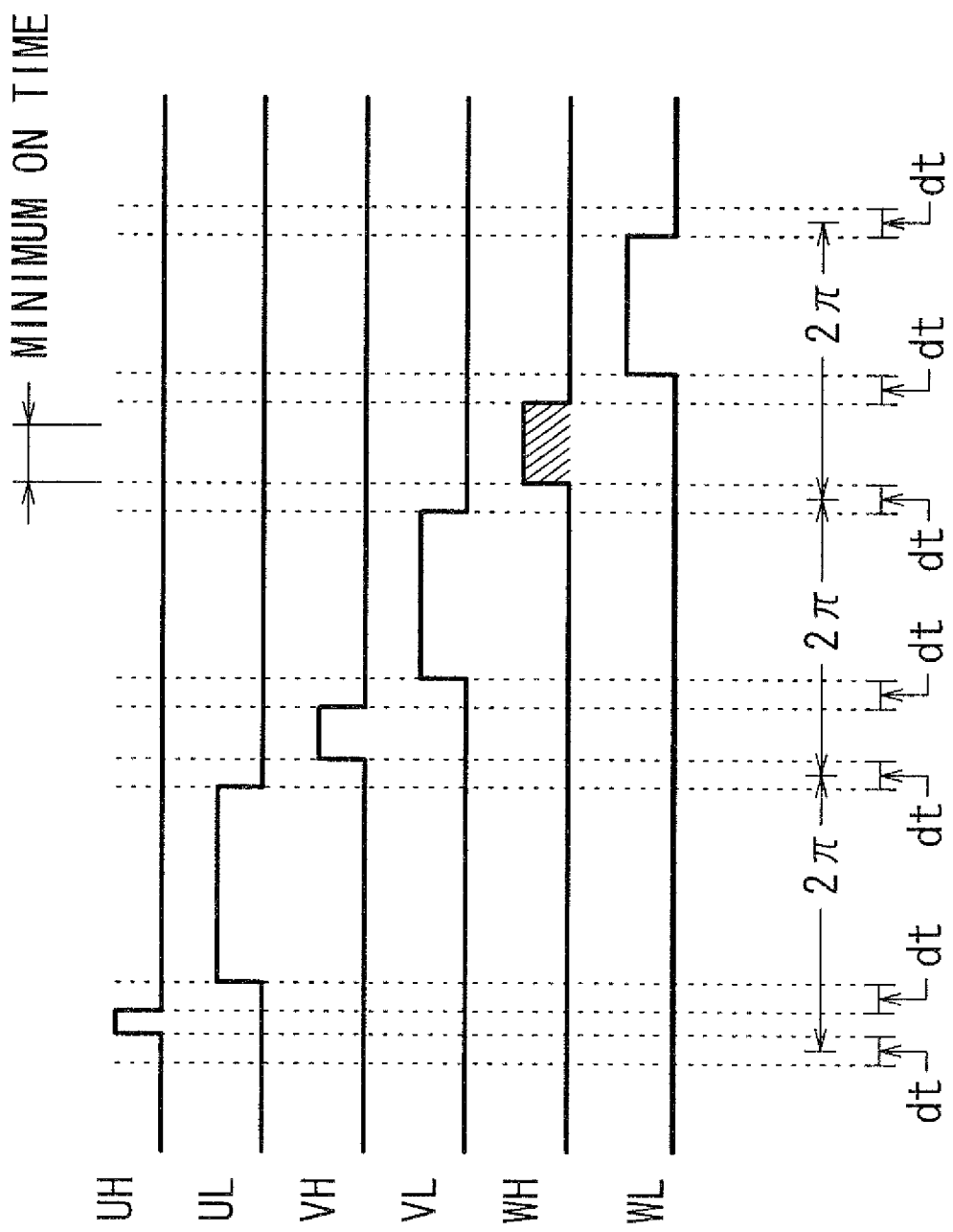
FIG. 21 is a timing chart of a voltage reducing mode of the DC/DC converter apparatus.

Specifically, in the voltage reducing mode, the gate drive signals UH, VH, WH, UL, VL, WL, as shown in FIG. 20 or 21, are repeatedly supplied to the arm switching devices 81u, 81v, 81w, 82u, 82v, 82w in order to drive the arm switching devices. Further, in the voltage increasing mode, the gate drive signals UH, VH, WH, UL, VL, WL, as shown in FIG. 22 or 23, are repeatedly supplied to the arm switching devices 81u, 81v, 81w, 82u, 82v, 82w in order to drive the arm switching devices.

In FIG. 20, since the upper arm switching device 81u is turned on by the gate drive signal UH, while the upper arm switching devices 81v, 81w are turned off by the gate drive signals VH, WH, the duty ratio of the gate drive signal UH is lowered apparently. Specifically, the duty ratio of the gate drive signal UH for the switching period 2π is regarded as a duty ratio for a switching period 6π, because the upper arm switching devices 81v, 81w are turned off. Therefore, the duty ratio of the gate drive signal UH is caused to apparently fall outside of the duty ratio range, so that the DC/DC converter 36 can operate stably in the voltage reducing mode, and therefore can convert voltage in a stable manner.

In FIG. 21, since the upper arm switching device 81w is turned on by the gate drive signal WH, and the upper arm switching devices 81u, 81v are turned off by the gate drive signals UH, VH, the duty ratio of the gate drive signal WH is lowered apparently, and falls outside of the duty ratio range, similar to the case of FIG. 20.

Figure 22:
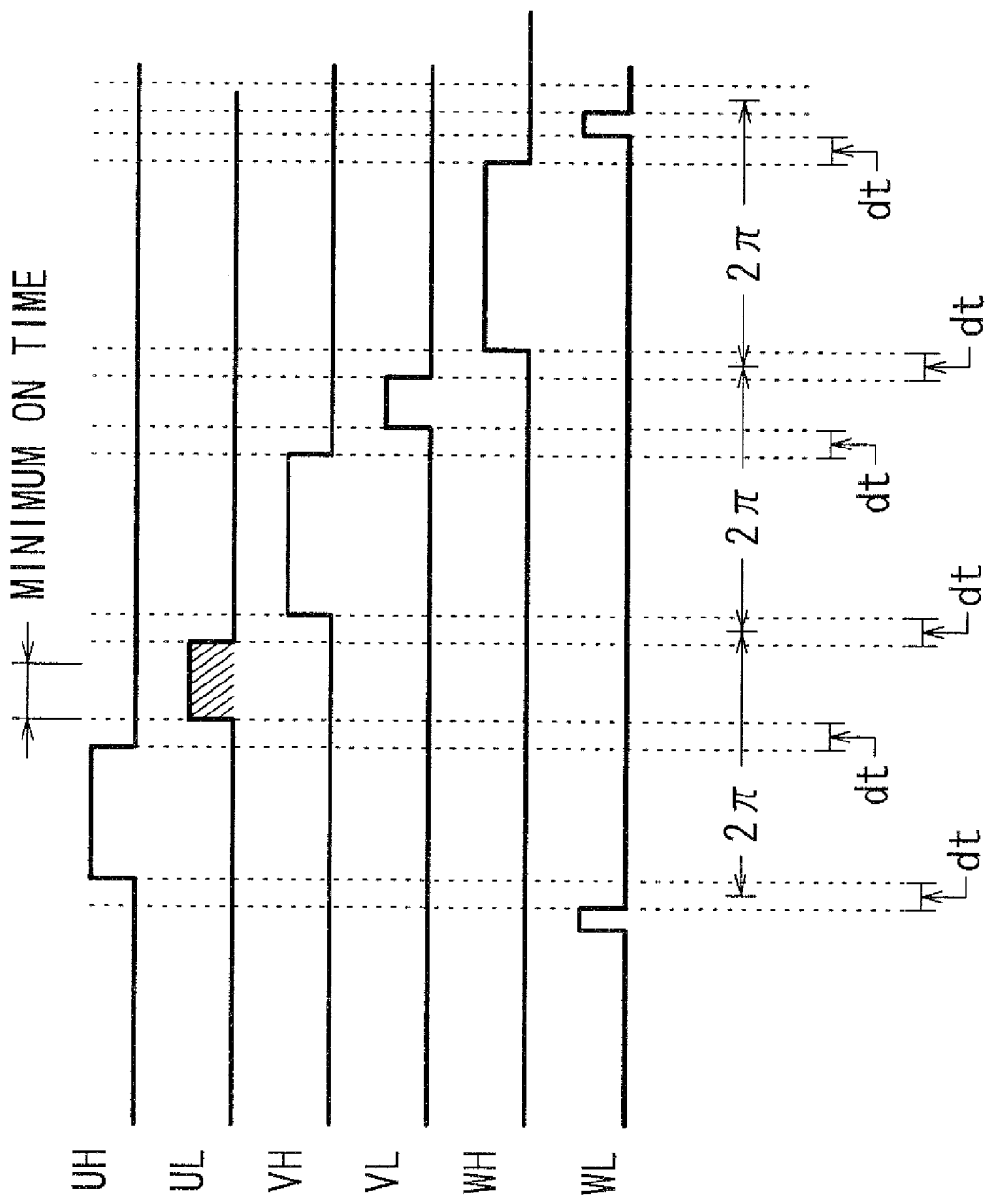
FIG. 22 is a timing chart of a voltage increasing mode of the DC/DC converter apparatus.
Figure 23:
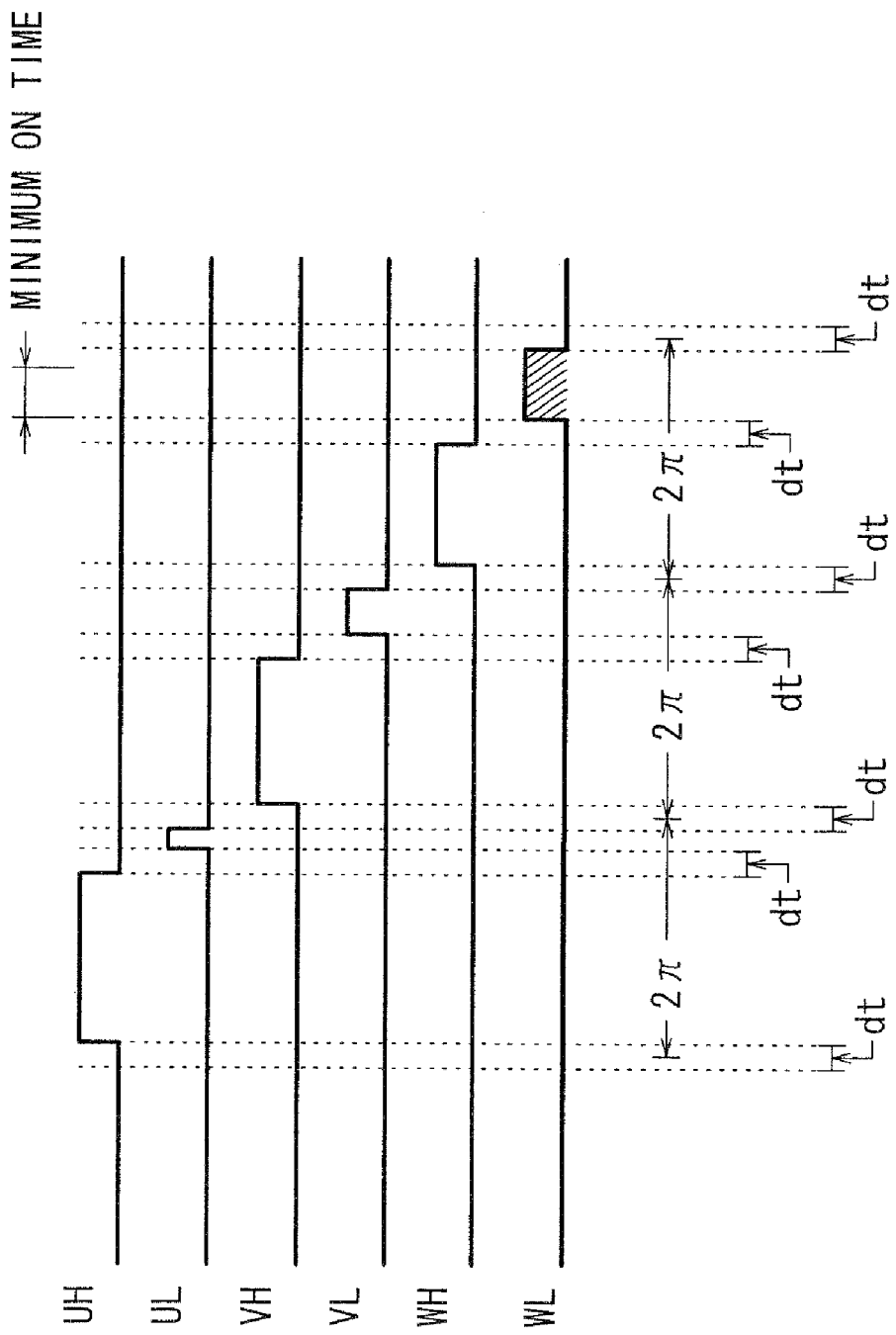
FIG. 23 is a timing chart of a voltage increasing mode of the DC/DC converter apparatus.

In FIG. 22, since the lower arm switching device 82u is turned on by the gate drive signal UL, and the lower arm switching devices 82v, 82w are turned off by the gate drive signals VL, WL, the duty ratio of the gate drive signal UL is regarded apparently as a duty ratio for a switching period 6π. Therefore, the duty ratio of the gate drive signal UL is caused to fall apparently outside of the duty ratio range, so that the DC/DC converter 36 can operate stably in the voltage reducing mode, and therefore can convert voltage in a stable manner.

In FIG. 23, since the lower arm switching device 82w is turned on by the gate drive signal WL, and the lower arm switching devices 82u, 82v are turned off by the gate drive signals UL, VL, the duty ratio of the gate drive signal WL is lowered apparently, and falls outside of the duty ratio range, similar to the case of FIG. 22.

The second process has been described above.

Advantages of the first process and the second process will be described below with reference to FIGS. 24A through 25.

FIGS. 24A through 24C are graphs showing the manner in which the secondary voltage V2 changes as the target voltage for the secondary voltage V2 changes with time toward the primary voltage V1. FIG. 25 is a graph which further explains the graphs of FIGS. 24A through 24C.

The graphs shown on the left sides of FIGS. 24A through 24C illustrate the secondary voltage V2, at a time when the process shown in FIG. 12 is not applied in the duty ratio range, i.e., at the time when the gate drive signals UH, VH, WH, UL, VL, WL in the timing chart shown in FIG. 8 are supplied to the arm switching devices 81u, 81v, 81w, 82u, 82v, 82w. The graphs shown on the right sides of FIGS. 24A through 24C illustrate the secondary voltage V2 at a time when the process shown in FIG. 12 is applied in the duty ratio range, i.e., at the time when the gate drive signals UH, VH, WH, UL, VL, WL shown in FIGS. 13A through 23 are supplied to the arm switching devices 81u, 81v, 81w, 82u, 82v, 82w. FIG. 24A shows the secondary voltage V2 at a time when the secondary current I2 (=I2A) is relatively small, FIG. 24B shows the secondary voltage V2 at a time when the secondary current I2 (=I2B) is greater than I2A (I2A<I2B), and FIG. 24C shows the secondary voltage V2 at a time when the secondary current I2 (=I2C) is relatively great (I2A<I2B<I2C). FIG. 25 is a graph which further explains the lefthand graphs of FIGS. 24A through 24C.

Figure 25:
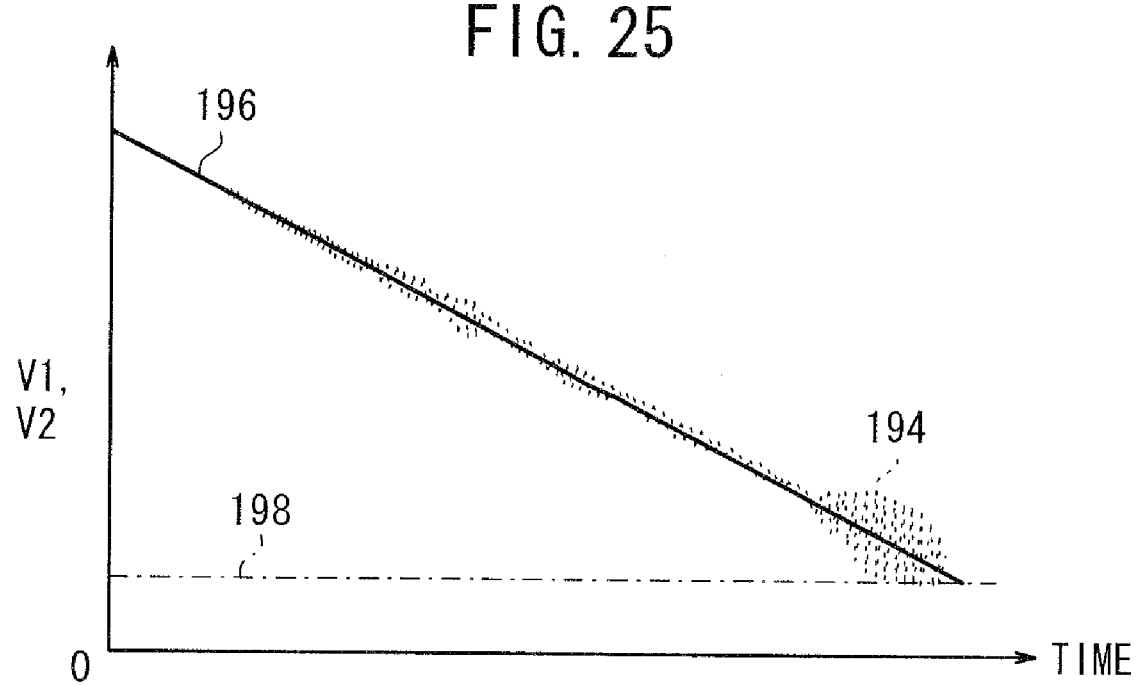
FIG. 25 is a graph which further explains the graphs of FIGS. 24A through 24C.

As shown in FIG. 25, if the process shown in FIG. 12 is not applied within the duty ratio range, the gate drive signals UH, VH, WH having the same duty ratio are repeatedly supplied to the upper arm switching devices 81u, 81v, 81w, and the gate drive signals UL, VL, WL having the same duty ratio are repeatedly supplied to the lower arm switching devices 82u, 82v, 82w. Then, when the characteristic curve 196 representing the target voltage for the secondary voltage V2 changes with time toward the dot-and-dash-line characteristic curve 198 representing the primary voltage V1, the characteristic curve 194 representing the secondary voltage V2 fluctuates, indicating that the secondary voltage V2 has changed discontinuously.

Specifically, as shown in the lefthand graphs of FIGS. 24A through 24C, if the process shown in FIG. 12 is not applied within the duty ratio range, the gate drive signals UH, VH, WH having the same duty ratio are repeatedly supplied to the upper arm switching devices 81u, 81v, 81w, and the gate drive signals UL, VL, WL having the same duty ratio are repeatedly supplied to the lower arm switching devices 82u, 82v, 82w. Then, when the characteristic curves 174, 182, 190 representing the target voltage change with time toward the dot-and-dash-line characteristic curves 174, 182, 190 representing the primary voltage V1, the characteristic curves 160, 164, 168 representing the secondary voltage V2 fluctuate as the characteristic curves 174, 182, 190 undergo change, i.e., the secondary voltage V2 does not change linearly.

In contrast, as shown in the righthand graphs of FIGS. 24A through 24C, if the process shown in FIG. 12 is applied within the duty ratio range, gate drive signals UH, VH, WH having different duty ratios are repeatedly supplied to the upper arm switching devices 81u, 81v, 81w, and gate drive signals UL, VL, WL having the different duty ratios are repeatedly supplied to the lower arm switching devices 82u, 82v, 82w. Then, when the characteristic curves 170, 178, 186 representing the target voltage change with time toward the dot-and-dash-line characteristic curves 172, 180, 188 representing the primary voltage V1, fluctuations of the characteristic curves 158, 162, 166 representing the secondary voltage V2 are reliably suppressed as the characteristic curves 170, 178, 188 undergo change, i.e., the secondary voltage V2 changes linearly.

Consequently, in all duty ratio ranges including the above duty ratio range in which the DC/DC converter 36 tends to convert voltage unstably, i.e., when the first process is applied, or in the duty ratio range close to the directly coupled state in which the DC/DC converter 36 tends to convert voltage unstably, i.e., when the second process is applied, the process shown in FIG. 12 is applied to the gate drive signals UH, VH, WH, UL, VL, WL in order to reliably turn on the arm switching devices 81u, 81v, 81w, 82u, 82v, 82w, for thereby enabling the DC/DC converter 36 to convert voltage stably.

In the above description, the converter controller 54 applies the process shown in FIG. 12 to the gate drive signals UH, VH, WH, UL, VL, WL, in all duty ratio ranges including the above duty ratio range according to the first process. However, if unstable voltage conversion of the DC/DC converter 36 poses no problems within a duty ratio range other than the above duty ratio range, e.g., a duty ratio range at which the ON time is longer than the minimum ON time or the OFF time is longer than the minimum ON time, then the converter controller 54 can drive the arm switching devices 81u, 81v, 81w, 82u, 82v, 82w based on the process shown in FIG. 12, only within the above duty ratio range, and can drive the upper arm switching devices 81u, 81v, 81w with the gate drive signals UH, VH, WH having the same duty ratio and the lower arm switching devices 82u, 82v, 82w with the gate drive signals UL, VL, WL in a duty ratio range other than the above duty ratio range.

In this case, it is determined whether the basic duty ratio is a duty ratio residing within the duty ratio range or not, and if the basic duty ratio is judged as being a duty ratio residing within the duty ratio range, then the different duty ratios are set in step S11, as shown in FIG. 12. If the basic duty ratio is judged as not being a duty ratio residing within the duty ratio range, i.e., as being a duty ratio outside the duty ratio range, then the arm switching devices 81u, 81v, 81w, 82u, 82v, 82w are driven with the basic duty ratio.

According to the present embodiment, as described above, in order to achieve the first object of the present invention, the first process is performed so that, within all duty ratio ranges including the above duty ratio range, the basic duty ratio (target duty ratio) is set depending on the target ON time (the ON time for the arm switching devices 81u, 81v, 81w, 82u, 82v, 82w depending on the target voltage). Also, prior and subsequent duty ratios (first and second duty ratios) are set before and after the arm switching devices 81u, 81v, 81w, 82u, 82v, 82w are driven (i.e., turned on) with the basic duty ratio, as duty ratios that are different from the basic duty ratio by α, so as to intentionally differentiate the ON times, and to drive (i.e., turn on) the arm switching devices 81u, 81v, 81w, 82u, 82v, 82w with the basic duty ratio and the prior and subsequent duty ratios thus set {(the basic duty ratio+α), (the basic duty ratio−α)}.

In this manner, the output voltage of the DC/DC converter 36, e.g., the secondary voltage V2, is prevented from fluctuating, and the arm switching devices 81u, 81v, 81w, 82u, 82v, 82w are turned on and off reliably. As a result, the DC/DC converter 36 is reliably prevented from producing an output voltage that deviates from the voltage corresponding to the duty ratio, i.e., the target voltage for the secondary voltage V2. Therefore, the present embodiment is effective to suppress fluctuations in the secondary voltage V2 within the above duty ratio range, wherein the ON time or OFF time of the arm switching devices 81u, 81v, 81w, 82u, 82v, 82w is shorter than the minimum ON time or the minimum OFF time.

According to the present embodiment, furthermore, in order to achieve the second object of the present invention, the second process is performed so that, in the duty ratio range close to the directly coupled state, the basic duty ratio (target duty) is set depending on the target ON time (the ON time for the arm switching devices 81u, 81v, 81w, 82u, 82v, 82w depending on the target voltage). Also, prior and subsequent duty ratios (first and second duty ratios) are set before and after the arm switching devices 81u, 81v, 81w, 82u, 82v, 82w are driven (i.e., turned on) with the basic duty, as duty ratios (the basic duty ratio+α), (the basic duty ratio−α) that are different from the basic duty ratio by α, so as to intentionally differentiate the ON times, and to drive (i.e., turn on) the arm switching devices 81u, 81v, 81w, 82u, 82v, 82w with the basic duty ratio and the prior and subsequent duty ratios thus set {(the basic duty ratio+α), (the basic duty ratio−α)}.

At least one of the prior and subsequent duty ratios (the basic duty ratio+α) is set so as to be greater than the duty ratio depending on the minimum ON time. Consequently, the arm switching devices can be turned on within the ON time, depending on at least one of the above-noted prior and subsequent duty ratios, even if the target ON time and the ON time depending on the other of the prior and subsequent duty ratios (the basic duty ratio−α) is lower than the minimum ON time, or if the arm switching devices are not turned ON by the aforementioned ON times.

Even though, as mentioned above, at least one of the prior and subsequent duty ratios is apparently lowered, e.g., the duty ratio (the basic duty ratio+α) changes from the switching period 2π to the switching period 6π, since the OFF times depending on the basic duty ratio and the other duty ratio increase, and the target ON time is shorter than the minimum ON time, the arm switching devices are reliably turned on by at least one of the above prior and subsequent duty ratios. As a result, closely to the directly coupled state, the output voltage, e.g., the secondary voltage V2, can continuously be changed as the duty ratio changes, thereby reliably preventing the DC/DC converter 36 from producing an output voltage that deviates from the voltage corresponding to the duty ratio, e.g., the target voltage for the secondary voltage V2. Accordingly, the present embodiment is effective to suppress fluctuations in the secondary voltage V2 within the above duty ratio range, wherein the ON time or OFF time of the arm switching devices $81u, 81v, 81w, 82u, 82v, 82w$ is shorter than the minimum ON time.

According to the present invention, moreover, even if the minimum ON time and/or the minimum OFF time of the arm switching devices $81u, 81v, 81w, 82u, 82v, 82w$ suffer from variations, a duty ratio may be set in view of such variations according to the first process and the second process, and the arm switching devices $81u, 81v, 81w, 82u, 82v, 82w$ are turned on or off based on the set duty ratio, for thereby enabling the DC/DC converter 36 to convert voltage in a stable manner.

According to the present invention, consequently, the secondary voltage V2 is reliably prevented from fluctuating and changing discontinuously within the duty ratio range close to the directly coupled state (V1≈V2), as indicated by the thick dot-and-dash line in FIG. 3. Within the duty ratio range close to the directly coupled state, as described above, the secondary current I2 based on the battery current Ibat from the battery 24, which is converted by the DC/DC converter 36, is added to the current If, and the sum current thereof is supplied as a motor current Im to the motor 26. Within this duty ratio range, since the generated current If changes greatly as the generated voltage Vf changes slightly, the secondary voltage V2 is prevented from fluctuating and changing discontinuously, by using intentionally different duty ratios for the gate drive signals UH, VH, WH, UL, VL, WL. The present embodiment is thus effective to supply the motor current Im within the duty ratio range close to the directly coupled state, which requires the DC/DC converter 36 to convert the voltage stably and accurately.

Advantages of the present embodiment in relation to the fuel cell vehicle 20 will further be described below. If the generated current If keeps being supplied from only the fuel cell 22 in the duty ratio range close to the directly coupled state, then the current changes greatly as the voltage changes slightly. When the amount of hydrogen supplied to the fuel cell 22 is increased or reduced depending on such a change in current, the fuel cell vehicle 20 tends to have poor fuel economy, and the fuel cell 22 tends to produce a reduced output level and to have a reduced service life. If the DC/DC converter 36 is supplied with only the gate drive signals having the same duty ratio, then the DC/DC converter 36 tends to convert the voltage in an unstable fashion, i.e., to produce voltage fluctuations or discontinuous voltage changes. The DC/DC converter 36 is required to adjust the electric power input to as well as output from the battery 24 depending on the voltage fluctuations, the discontinuous voltage changes, and the current fluctuations (electric power fluctuations), even under such unstable voltage converting conditions. The adjustment made to the electric power by the DC/DC converter 36 is liable to cause the DC/DC converter 36 to produce a loss, and to result in further reductions in the fuel economy of the fuel cell vehicle 20.

According to the present invention, as described above, the duty ratios of the gate drive signals UH, VH, WH, UL, VL, WL are intentionally differentiated, so as to prevent the secondary voltage V2 from fluctuating and changing discontinuously, for thereby enabling the DC/DC converter 36 to convert voltage in a stable manner. It is thus possible to prevent the DC/DC converter 36 from causing a loss, and also to prevent the fuel cell vehicle 20 from suffering a reduction in fuel economy.

According to the present embodiment, when the converter controller 54 repeatedly sets the prior duty ratio, the basic duty ratio, and the subsequent duty ratio in succession, the converter controller 54 sets the prior and subsequent duty ratios respectively to different duty ratios, i.e., to (the basic duty ratio+α) and (the basic duty ratio−α), respectively, or to (the basic duty ratio−α) and (the basic duty ratio+α), respectively. If a target ON time depending on the basic duty ratio is referred to as a target ON time A, then the respective ON times depending on the prior and subsequent duty ratios are referred to as respective ON times B and C, which differ from the target ON time A by a time corresponding to α. As a result, the arm switching devices $81u, 81v, 81w, 82u, 82v, 82w$ are successively turned on for respective ON times A, B, C, A, B, C, . . . , for example. The secondary voltage V2 thus is effectively prevented from fluctuating.

Furthermore, when the converter controller 54 repeatedly sets the prior duty ratio, the basic duty ratio, and the subsequent duty ratio in succession, the converter controller 54 sets one of the prior and subsequent duty ratios to (the basic duty ratio+α) and the other to (the basic duty ratio−α). If the target ON time depending on the basic duty ratio is referred to as a target ON time A, the ON time depending on one of the prior and subsequent duty ratios is referred to as an ON time B, and the ON time depending on the other of the prior and subsequent duty ratios is referred to as an ON time C, then the arm switching devices $81u, 81v, 81w, 82u, 82v, 82w$ are successively turned on for respective ON times A, B, A, C, A, B, . . . , for example. The secondary voltage V2 thus also is effectively prevented from fluctuating.

According to the present embodiment, when the converter controller 54 turns on the three U-, V-, W-phase arms UA, VA, WA of the DC/DC converter 36, the converter controller 54 alternately turns on the three U-, V-, W-phase arms UA, VA, WA. More specifically, the converter controller 54 turns on the upper arm switching device $81u$ of the U-phase arm UA (see FIGS. 5 through 7), thereafter turns on the lower arm switching device $82u$ of the U-phase arm UA (see FIG. 7), thereafter turns on the upper arm switching device $81v$ of the V-phase arm VA (see FIGS. 5 through 7), and thereafter turns on the lower arm switching device $82v$ of the V-phase arm VA (see FIG. 7). In this manner, the converter controller 54 rotates the switching timings.

Specifically, according to a rotation switching process in which the three U-, V-, W-phase arms UA, VA, WA are turned on in a rotating pattern from the U-phase arm UA to the V-phase arm VA, to the W-phase arm WA, and to the U-phase arm UA, . . . , one of the upper and lower arm switching devices 81, 82 is turned on at a time. Therefore, if the upper and lower arm switching devices 81, 82 are disposed on a heat radiating plate, since there is no overlapping heat radiation path (i.e., no overlapping surface area of the heat radiating plate), the heat radiating capability of the DC/DC converter 36 is increased. As a result, the 6-in-1 module, which was referred to above, may be reduced in size and weight.

Consequently, since the upper arm switching devices 81 (81u, 81v, 81w) and the lower arm switching devices 82 (82u, 82v, 82w) are not simultaneously turned on, and the different U-, V-, W-phase arms UA, VA, WA are not simultaneously turned on, at most only one arm switching device is turned on at a time. Therefore, the DC/DC converter 36 has an excellent heat radiating capability, and can easily be designed to effect a desired heat radiation.

According to the present embodiment, when the converter controller 54 alternately turns on the three U-, V-, W-phase arms UA, VA, WA, the converter controller 54 turns on either one of the upper arm switching devices 81 (either one of 81u, 81v, 81w), or either one of the lower arm switching devices 82 (either one of 82u, 82v, 82w).

When the converter controller 54 turns on the U-, V-, W-phase arms UA, VA, WA for respective ON times A, B, A, C, A, B, . . . , the ON times of the U-, V-, W-phase arms UA, VA, WA are uniformly distributed. As a result, a temperature distribution of the U-, V-, W-phase arms UA, VA, WA is prevented from becoming localized, due to varying minimum ON and OFF times of the upper arm switching devices 81 (81u, 81v, 81w) and the lower arm switching devices 82 (82u, 82v, 82w).

When the converter controller 54 alternately turns on the three U-, V-, W-phase arms UA, VA, WA, the converter controller 54 alternately turns on one of the upper arm switching devices 81u, 81v, 81w and one of the lower arm switching devices 82u, 82v, 82w, occurring in a certain phase at random, and thereafter alternately turns on one of the upper arm switching devices 81u, 81v, 81w and one of the lower arm switching devices 82u, 82v, 82w within a subsequent phase at random. If the converter controller 54 alternately turns on the three U-, V-, W-phase arms UA, VA, WA, the converter controller 54 may alternately turn the phase arms on, each in one switching period $2\pi$. Such a turning-on pattern makes the control process of the converter controller 54 easier. Alternatively, the converter controller 54 may alternately turn on the three U-, V-, W-phase arms UA, VA, WA, each in two switching periods $4\pi$.

As a result, even if the minimum ON and OFF times of the upper arm switching devices 81 (81u, 81v, 81w) and the lower arm switching devices 82 (82u, 82v, 82w) vary from each other, the duty ratios may be set in view of the varying minimum ON and OFF times, and the upper arm switching devices 81u, 81v, 81w and the lower arm switching devices 82u, 82v, 82w may be turned on in the above sequence based on the set duty ratios, for thereby enabling the DC/DC converter 36 to convert voltage in a stable manner.

The upper arm switching devices 81 (81u, 81v, 81w) and/or the lower arm switching devices 82 (82u, 82v, 82w) may be turned on a plurality of times within one switching period $2\pi$.

The converter controller 54 may secure a certain one of the U-, V-, W-phase arms UA, VA, WA as a phase arm to be driven for an ON time corresponding to the basic duty ratio, whereas the other phase arms are driven for ON times corresponding to the different duty ratios, i.e., the prior and subsequent duty ratios represented by (the basic duty ratio+α) and (the basic duty ratio−α). Thus, when the phase arms UA, VA, WA are successively turned on for respective ON times A, B, C, A, B, C, . . . , for example, the converter controller 54 can easily secure the phases to be turned on for the ON times A, B, C.

Although the duty ratios before and after the basic duty ratio are made different as (the basic duty ratio+α) and (the basic duty ratio−α) in the above explanation, the present embodiment is not limited thereto.

That is, the switching devices 81u, 81v, 81w, 82u, 82v, 82w have only to be driven based on the basic duty ratio, the first duty ratio and the second duty ratio, wherein two of the basic duty ratio, the first duty ratio and the second duty ratio are the maximum duty ratio and the minimum duty ratio for driving the switching devices 81u, 81v, 81w, 82u, 82v, 82w, and the remaining one of the duty ratios is a ratio between the maximum and minimum duty ratios.

As long as the three duty ratios of the basic duty ratio, the first duty ratio and the second duty ratio are used for driving the switching devices 81u, 81v, 81w, 82u, 82v, 82w, the same advantages as those mentioned above can be achieved easily.

Figure 26:
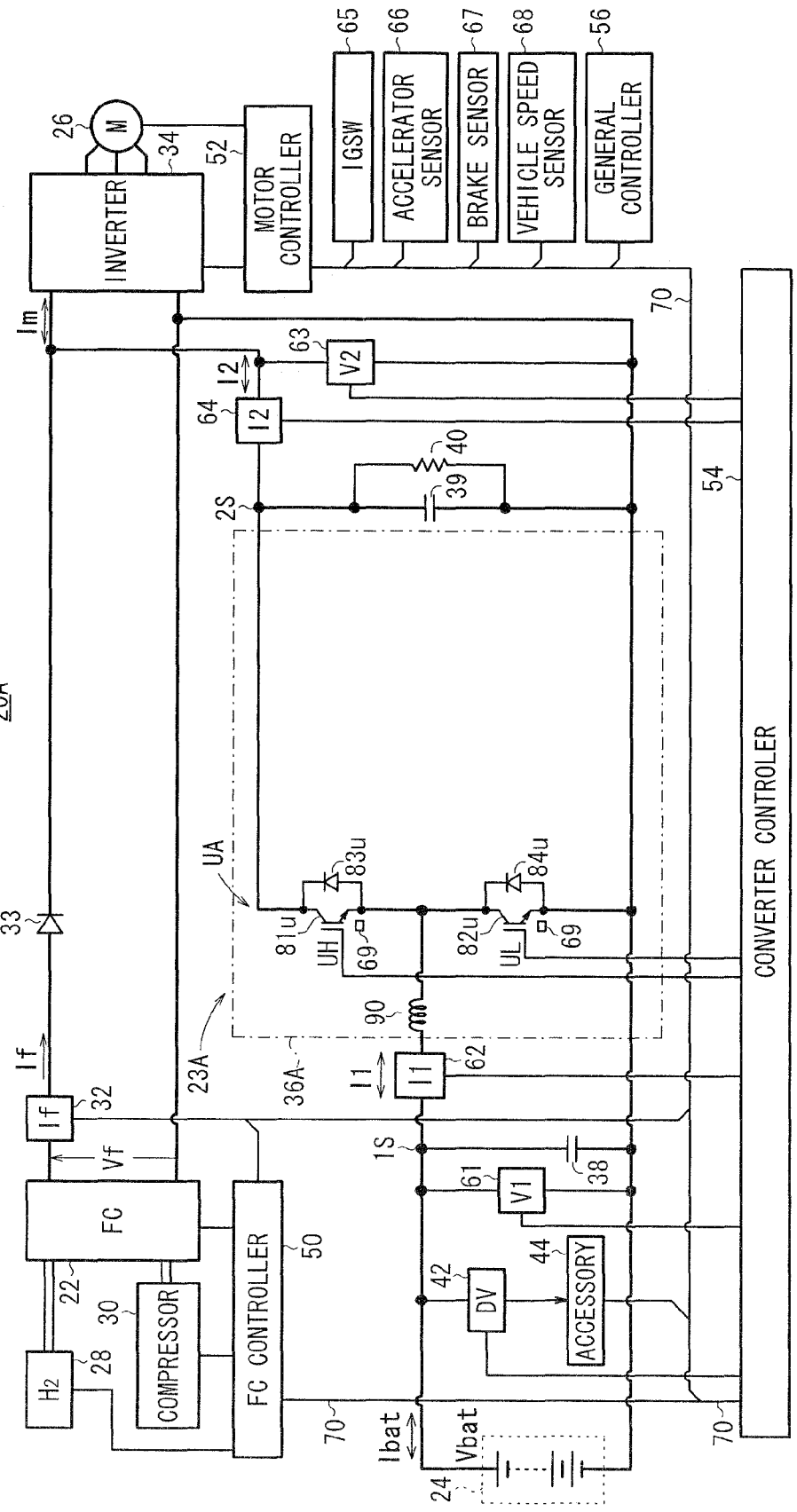
FIG. 26 is a circuit diagram, partly in block form, of a fuel cell vehicle incorporating a single-phase DC/DC converter apparatus.

The principles of the present invention are also applicable to a fuel cell vehicle 20A as shown in FIG. 26, which includes a single-phase DC/DC converter 36A, rather than the three-phase DC/DC converter 36.

Figure 27:
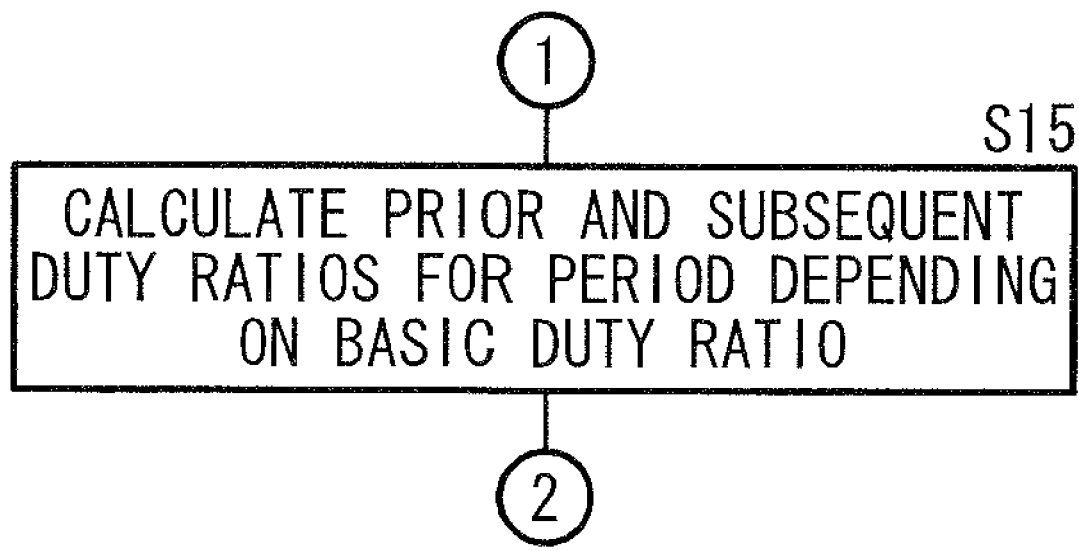
FIG. 27 is a flowchart of a process for setting the duty ratio of a gate drive signal in a converter controller of the DC/DC converter apparatus shown in FIG. 26.

For controlling the single-phase DC/DC converter 36A in the above duty ratio range, the converter controller 54 sets one of the prior and subsequent duty ratios as (the basic duty ratio+α), and sets the other duty ratio as (the basic duty ratio−α). Alternatively, in the above duty ratio range, the converter controller 54 sets one of the prior and subsequent duty ratios as (the basic duty ratio−α), and sets the other duty ratio as (the basic duty ratio+α). Such settings are performed in step S15 shown in FIG. 27, instead of in step S11 shown in FIG. 12.

FIG. 28A is a timing chart of the gate drive signal UH or UL at a time when the process in step S15 is not performed, i.e., when there are no varying duty ratios. FIGS. 28B and 28C are timing charts of the gate drive signal UH or UL at a time when the process in step S15 is performed, i.e., when there are varying duty ratios, in the first process.

According to the timing chart of the gate drive signal UH or UL shown in FIG. 28A, if the duty ratio of the gate drive signal UH or UL is within the duty ratio range close to the directly coupled state, then when the gate drive signal UH or UL having the same duty ratio is supplied to the arm switching devices 81u, 82u, the secondary voltage V2 suffers from voltage fluctuations, as shown in FIGS. 10A and 10C.

As shown in FIG. 28B, for the duty ratio of the gate drive signal UH or UL, a certain duty ratio is set as the basic duty ratio, whereas the duty ratio prior to the basic duty ratio is set as (the basic duty ratio+α), and the duty ratio subsequent to the basic duty ratio is set as (the basic duty ratio−α). Alternatively, as shown in FIG. 28C, a certain duty ratio is set as the basic duty ratio, whereas the duty ratio prior to the basic duty ratio is set as (the basic duty ratio−α), and the duty ratio subsequent to the basic duty ratio is set as (the basic duty ratio+α). In this manner, the secondary voltage V2 output from the single-phase DC/DC converter 36A is prevented from fluctuating, similar to the case of the three-phase DC/DC converter 36.

FIG. 29A is a timing chart of the gate drive signal UH or UL, at a time when the process in step S15 is not performed, i.e., when there are no varying duty ratios. FIGS. 29B and 29C are timing charts of the gate drive signal UH or UL at a time the process in step S15 is performed, i.e., when there are varying duty ratios, in the second process.

According to the timing chart of the gate drive signal UH or UL, as shown in FIG. 29A, if the duty ratio of the gate drive signal UH or UL is within a duty ratio range close to the directly coupled state, then when the gate drive signal UH or UL at the same duty ratio is supplied to the arm switching devices 81u, 82u, the secondary voltage V2 suffers from voltage fluctuations, as shown in FIGS. 10A and 10C.

As shown in FIG. 29B, for the duty ratio of the gate drive signal UH or UL, a certain duty ratio is set as the basic duty ratio, whereas the duty ratio prior to the basic duty ratio is set as (the basic duty ratio+α), and the duty ratio subsequent to the basic duty ratio is set as (the basic duty ratio−α). Alternatively, as shown in FIG. 29C, a certain duty ratio is set as the basic duty ratio, whereas the duty ratio prior to the basic duty ratio is set as (the basic duty ratio−α), and the duty ratio subsequent to the basic duty ratio is set as (the basic duty ratio+α). In this manner, the secondary voltage V2 output from the single-phase DC/DC converter 36A is prevented from fluctuating, similar to the case of the three-phase DC/DC converter 36.

Figure 30:
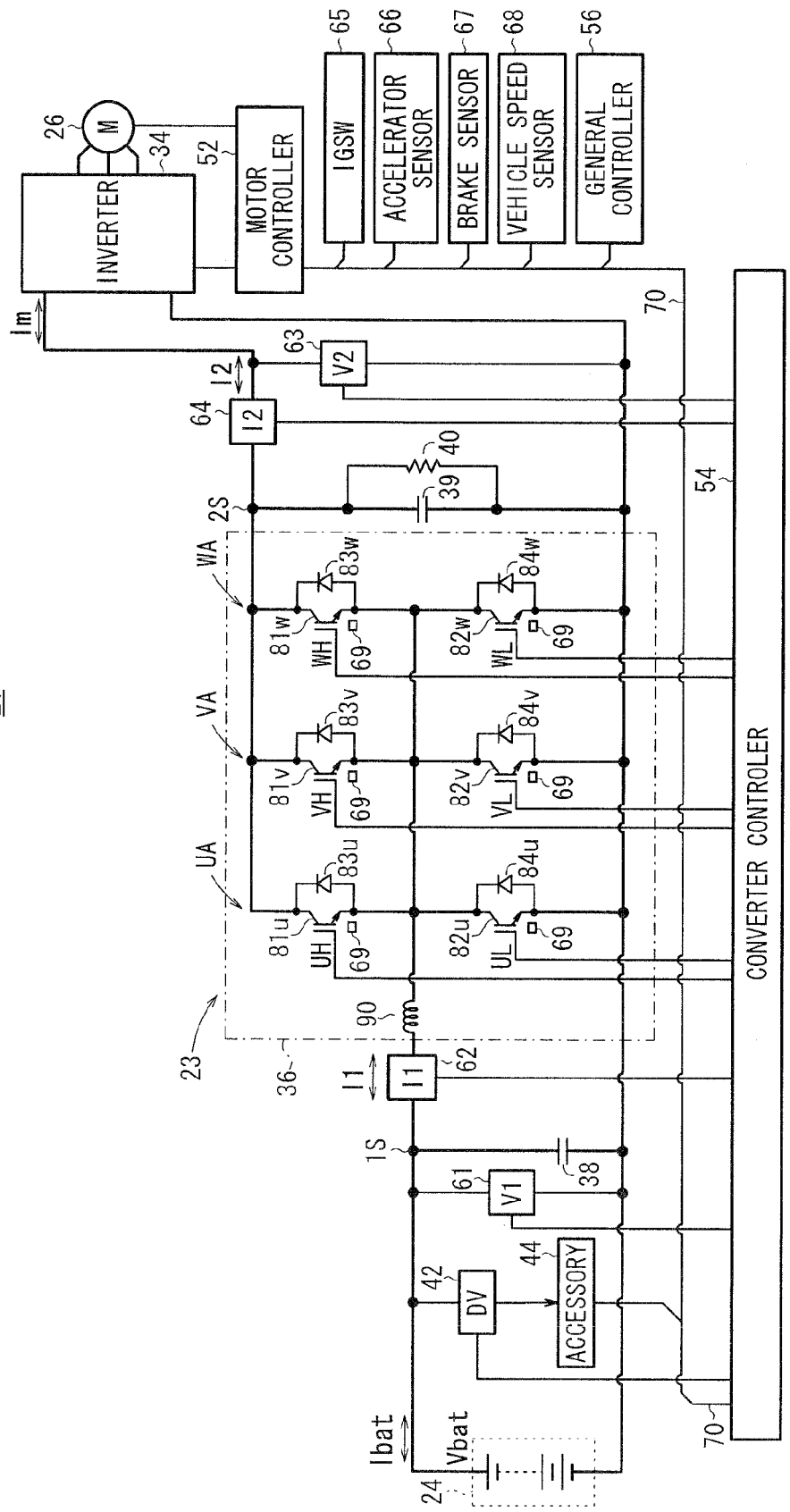
FIG. 30 is a circuit diagram, partly in block form, of a battery-powered vehicle.

The principles of the present invention also are applicable to a battery-driven vehicle (electric vehicle) 21 as shown in FIG. 30, in addition to the fuel cell vehicles 20, 20A. The principles of the present invention further are applicable to a parallel or series hybrid vehicle, which incorporates an engine, a battery, and a motor therein.

The motor 26 is not limited to motors used in vehicles, but may be a motor used in other machinery, such as elevators or the like.

Figure 31:
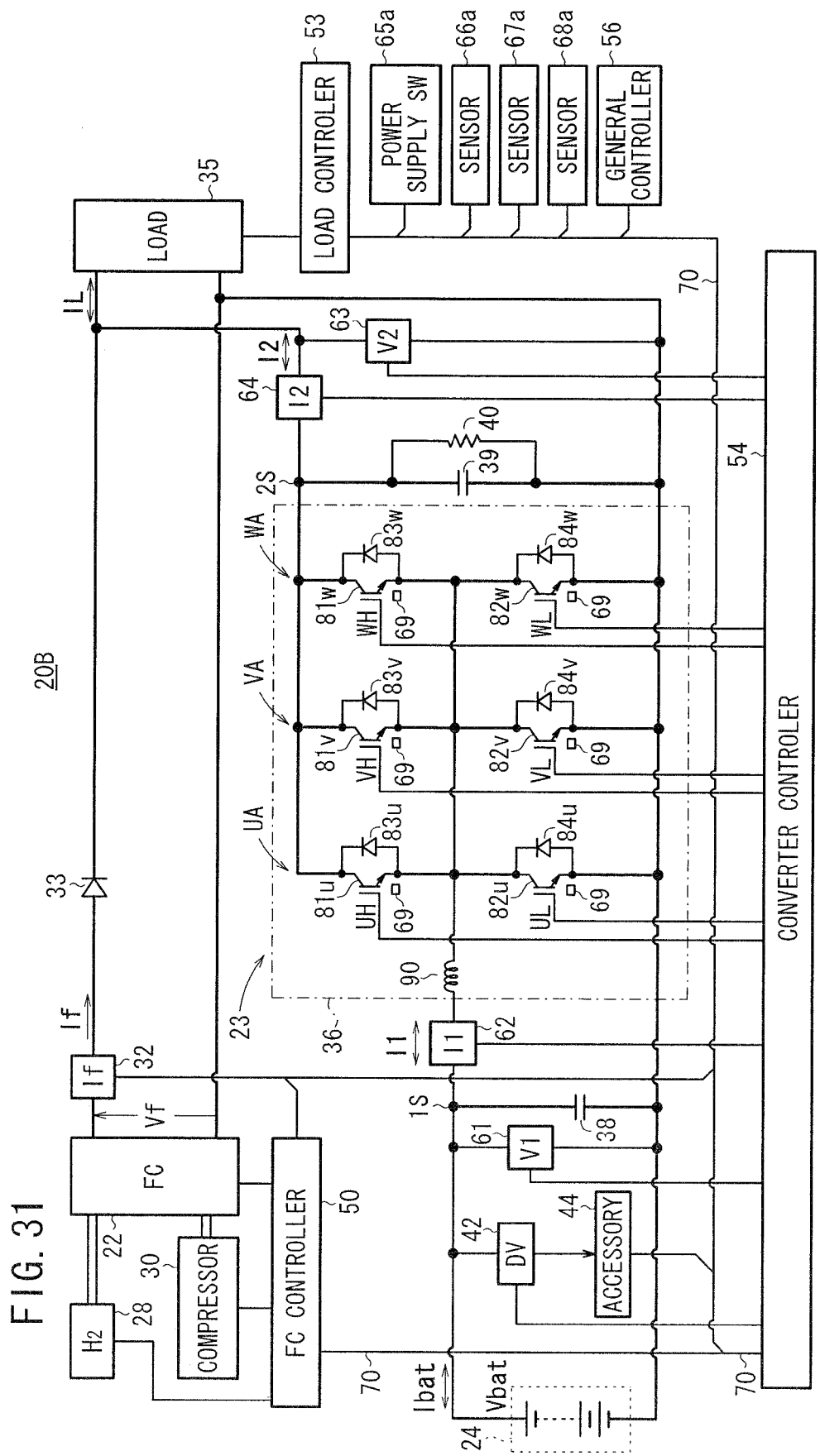
FIG. 31 is a circuit diagram, partly in block form, of a fuel cell system.

As shown in FIG. 31, the principles of the present invention also are applicable to a fuel cell system 20B, which employs a single-phase load 35 instead of the inverter 34, a load controller 53 instead of the motor controller 52, a power supply switch 65a instead of the ignition switch 65, and various sensors 66a, 67a, 67b instead of the sensors 66, 67, 68. The general controller 56 controls the VCU 23 through the converter controller 54, for thereby controlling the load current IL.

Figure 32:
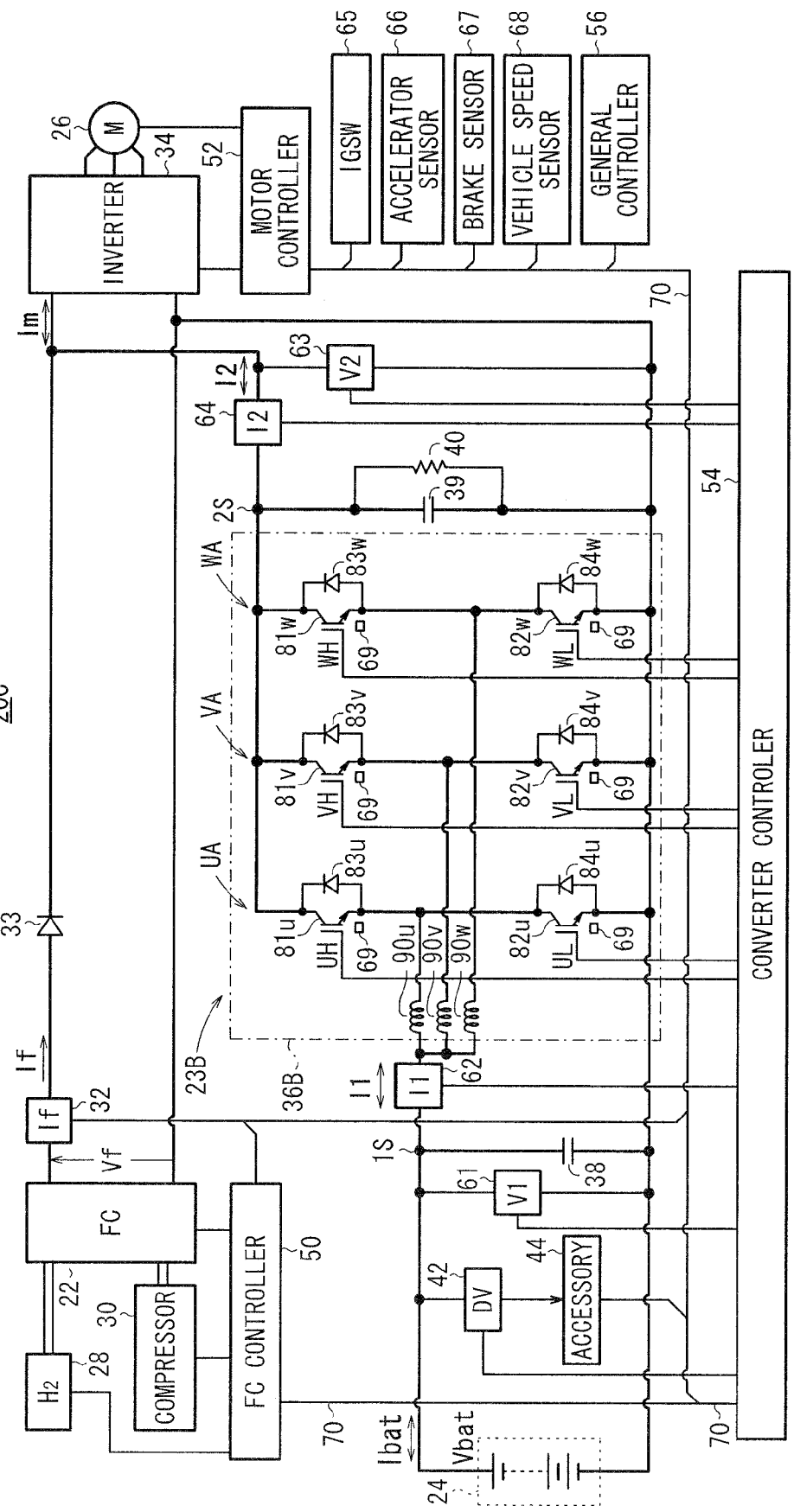
FIG. 32 is a circuit diagram, partly in block form, of a fuel cell vehicle incorporating a DC/DC converter apparatus having three reactors.

As shown in FIG. 32, the principles of the present invention also are applicable to a fuel cell vehicle 20C incorporating a DC/DC converter 36B, which includes three reactors 90u, 90v, 90w connected to the respective midpoints of the U-, V-, W-phase arms UA, VA, WA.

Moreover, the principles of the present invention also are applicable to a fuel cell vehicle 20, in which the DC/DC converter 36 comprises a series-connected circuit made up of an upper arm switching device 81u and a diode 84u, so that the DC/DC converter apparatus 23 operates only in the voltage reducing mode, or to a fuel cell vehicle 20 in which the DC/DC converter 36 comprises a series-connected circuit made up of a diode 83u and a lower arm switching device 82u and a diode 84u, so that the DC/DC converter apparatus 23 operates only in the voltage increasing mode.

Although certain preferred embodiments of the present invention have been shown and described in detail, it should be understood that various changes and modifications may be made to the embodiments without departing from the scope of the appended claims.

What is claimed is:

1. A method of driving a chopper-type DC/DC converter including at least one reactor, at least one switching device and three parallel phase arms, each of the three phase arms comprising an upper arm switching device and a lower arm switching device, the method comprising the steps of:
   setting a target duty ratio;
   setting a first duty ratio and a second duty ratio based on the target duty ratio;
   driving said switching device for ON times corresponding respectively to the target duty ratio, the first duty ratio and the second duty ratio;
   allotting the target duty ratio, the first duty ratio, and the second duty ratio to the three phase arms, respectively; and
   turning on each of the three phase arms with the duty ratio allotted thereto, wherein
   one of the duty ratios is the maximum duty ratio and another one of the duty ratios is the minimum duty ratio, and
   the remaining one of the duty ratios is a ratio between the maximum duty ratio and the minimum duty ratio.

2. A method according to claim 1, wherein said at least one switching device is driven repeatedly with the first duty ratio, the target duty ratio, and the second duty ratio in this order.

3. A method according to claim 1, wherein said at least one switching device is driven repeatedly with the target duty ratio, the first duty ratio, the target duty ratio, and the second duty ratio, in this order.

4. A method of controlling a DC/DC converter apparatus by applying a method according to claim 1 to the DC/DC converter apparatus, which includes the DC/DC converter and a controller for driving said at least one switching device, the method comprising the steps of:
   setting, with the controller, said target duty ratio,
   setting, with the controller, the first and second duty ratios using the target duty ratio; and
   driving, with the controller, said at least one switching device for ON times corresponding respectively to the target duty ratio, and the first and second duty ratios.

5. A method according to claim 4, wherein the DC/DC converter comprises a plurality of parallel phase arms connected between a first electric power device and a second electric power device, each of the phase arms comprising an upper arm switching device and a lower arm switching device, said method comprising the steps of:
   alternately turning on, with the controller, the phase arms; and
   when the controller turns on one of the phase arms, turning on either the upper arm switching device or the lower arm switching device, or alternately turning on the upper arm switching device and the lower arm switching device.

6. A method according to claim 5, further comprising the steps of:
   when the controller alternately turns on the phase arms, alternately turning on the upper arm switching device and the lower arm switching device of one of the phase arms; and
   thereafter alternately turning on the upper arm switching device and the lower arm switching device of a next one of the phase arms.

7. A method according to claim 6, further comprising the steps of:
   when the controller alternately turns on the phase arms, turning on the upper arm switching device of the one of the phase arms;
   thereafter turning on the lower arm switching device of the one of the phase arms;
   thereafter turning on the upper arm switching device of the next one of the phase arms; and
   thereafter turning on the lower arm switching device of the next one of the phase arms.

8. A method according to claim 5, wherein the phase arms are alternately turned on, each in one switching period.

9. A method according to claim 5, further comprising the steps of:
when the controller alternately turns on the upper arm switching devices and the lower arm switching devices, alternately turning on the upper arm switching devices and the lower arm switching devices with a dead time interposed therebetween, and alternately turning on the phase arms a dead time interposed therebetween.

10. A method according to claim 5, wherein the phase arms have respective midpoints connected to each other, and
wherein the DC/DC converter comprises a reactor or as many reactors as the number of phases inserted between the connected midpoints and the first electric power device or the second electric power device, the reactors having respective terminals connected to the midpoints, respectively, and other terminals connected to each other and to the first electric power device or the second electric power device.

11. A method according to claim 5, wherein the controller drives predetermined one of the phase arms for the ON time corresponding to the target duty ratio only, while driving the other phase arms for ON times corresponding to the prior and subsequent duty ratios only.

12. A method according to claim 4, wherein the DC/DC converter is connected between an electricity storage device serving as a first electric power device and a fuel cell serving as a second electric power device for driving a propulsive motor, which is energizable by an inverter for producing a regenerative voltage; and
wherein the DC/DC converter increases a voltage of the electricity storage device and applies the increased voltage to the inverter, and reduces the regenerative voltage from the inverter and applies the reduced voltage to the electricity storage device when the propulsive motor is in a regenerative mode.

13. A method of controlling a driving operation of a vehicle by applying a method according to claim 12 to a vehicle having the DC/DC converter apparatus, the electricity storage device, the propulsive motor, and the fuel cell.

14. A method of controlling a driving operation of a vehicle by applying a method according to claim 4 to a vehicle having the DC/DC converter apparatus, a propulsive motor energizable by an inverter for producing a regenerative voltage, and an electricity storage device, the propulsive motor and the electricity storage device being connected to the DC/DC converter apparatus.

15. A method of controlling a fuel cell system by applying a method according to claim 4 to a fuel cell system having the DC/DC converter apparatus, a fuel cell connected to a load, and an electricity storage device, the fuel cell and the electricity storage device being connected to the DC/DC converter apparatus.

16. A method of driving a DC/DC converter for use between an electricity storage device and a fuel cell, the DC/DC converter comprising at least one switching device and three parallel phase arms, each of the three phase arms comprising an upper arm switching device and a lower arm switching device, said method comprising the steps of:
setting a target duty ratio depending on an ON time shorter than a minimum ON time of said switching device;
setting a first duty ratio and a second duty ratio based on the target duty ratio such that at least one of the first and second duty ratios corresponds to an ON time longer than the minimum ON time of said switching device;
driving said switching device for ON times corresponding respectively to the target duty ratio, the first duty ratio and the second duty ratio, in a duty ratio range close to a directly coupled state, in which voltages at an end of the DC/DC converter connected to the electricity storage device and at another end of the DC/DC converter connected to the fuel cell are substantially equal to each other;
allotting the target duty ratio, the first duty ratio, and the second duty ratio to the three phase arms, respectively; and
turning on each of the three phase arms with the duty ratio allotted thereto, wherein
one of the duty ratios is the maximum duty ratio and another one of the duty ratios is the minimum duty ratio; and
the remaining one of the duty ratios is a ratio between the maximum duty ratio and the minimum duty ratio.

* * * * *